US011671950B2

(12) United States Patent
Oizumi et al.

(10) Patent No.: US 11,671,950 B2
(45) Date of Patent: *Jun. 6, 2023

(54) COMMUNICATION APPARATUS AND COMMUNICATION METHOD

(71) Applicant: Sun Patent Trust, New York, NY (US)

(72) Inventors: Toru Oizumi, Kanagawa (JP); Daichi Imamura, Kanagawa (JP); Akihiko Nishio, Osaka (JP); Hidetoshi Suzuki, Kanagawa (JP)

(73) Assignee: Sun Patent Trust, New York, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/182,662

(22) Filed: Feb. 23, 2021

(65) Prior Publication Data

US 2021/0176750 A1      Jun. 10, 2021

Related U.S. Application Data

(63) Continuation of application No. 16/854,640, filed on Apr. 21, 2020, now Pat. No. 10,973,024, which is a
(Continued)

(30) Foreign Application Priority Data

Jul. 13, 2011   (JP) ................................. 2011-154890
Jan. 27, 2012   (JP) ................................. 2012-015257

(51) Int. Cl.
*H04W 72/0446*   (2023.01)
*H04W 72/23*   (2023.01)
(Continued)

(52) U.S. Cl.
CPC ....... *H04W 72/0446* (2013.01); *H04L 1/1854* (2013.01); *H04L 1/1861* (2013.01);
(Continued)

(58) Field of Classification Search
CPC ........... H04W 72/0446; H04W 72/042; H04W 72/1289; H04W 84/042; H04W 88/02;
(Continued)

(56) References Cited

U.S. PATENT DOCUMENTS 9,184,896 B2   11/2015   Oizumi et al.
9,461,781 B2   10/2016   Oizumi et al.
(Continued)

FOREIGN PATENT DOCUMENTS

EP      3 200 365 A1      8/2017
JP      2010-252257 A     11/2010
(Continued)

OTHER PUBLICATIONS

3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)," Mar. 2011, 103 pages.
(Continued)

*Primary Examiner* — Peter G Solinsky
(74) *Attorney, Agent, or Firm* — Seed IP Law Group LLP

(57) ABSTRACT

The purpose of the present invention is to inhibit an increase in the amount of A/N resources, without changing the timing at which the error detection result of an SCell is notified when UL-DL configurations to be configured for each of the unit bands are different, from the timing at which the error detection result is notified when just a single unit band is configured. A control unit transmits, using a first unit band, a response signal including error detection results about data received with both the first unit band and a second unit band. In a first composition pattern set for the first unit band, an uplink communication subframe is set to be the same timing as at least an uplink communication subframe of a second composition pattern set for the second unit band.

8 Claims, 31 Drawing Sheets

Related U.S. Application Data continuation of application No. 16/453,763, filed on Jun. 26, 2019, now Pat. No. 10,667,261, which is a continuation of application No. 16/109,300, filed on Aug. 22, 2018, now Pat. No. 10,375,692, which is a continuation of application No. 15/592,023, filed on May 10, 2017, now Pat. No. 10,085,257, which is a continuation of application No. 15/250,679, filed on Aug. 29, 2016, now Pat. No. 9,716,570, which is a continuation of application No. 14/874,114, filed on Oct. 2, 2015, now Pat. No. 9,461,781, which is a continuation of application No. 14/114,705, filed as application No. PCT/JP2012/004246 on Jun. 29, 2012, now Pat. No. 9,184,896.

(51) Int. Cl.
*H04L 1/1829* (2023.01)
*H04L 5/00* (2006.01)
*H04W 88/02* (2009.01)
*H04W 84/04* (2009.01)

(52) U.S. Cl.
CPC ............ *H04L 5/001* (2013.01); *H04L 5/0085* (2013.01); *H04W 72/23* (2023.01); *H04W 84/042* (2013.01); *H04W 88/02* (2013.01)

(58) Field of Classification Search
CPC ..... H04L 1/1854; H04L 1/1861; H04L 5/001; H04L 5/0085
USPC ........................................................ 370/329
See application file for complete search history.

(56) References Cited

U.S. PATENT DOCUMENTS

| | | | |
|---|---|---|---|
| 9,716,570 | B2 | 7/2017 | Oizumi et al. |
| 10,085,257 | B2 | 9/2018 | Oizumi et al. |
| 10,375,692 | B2 | 8/2019 | Oizumi et al. |
| 10,667,261 | B2 | 5/2020 | Oizumi et al. |
| 10,973,024 | B2 * | 4/2021 | Oizumi ............. H04W 72/0446 |
| 2012/0002631 | A1 | 1/2012 | Nishio et al. |
| 2012/0263087 | A1 | 10/2012 | Aiba et al. |
| 2013/0223296 | A1 | 8/2013 | Zeng et al. |
| 2013/0294423 | A1 | 11/2013 | Wang et al. |
| 2013/0315135 | A1 | 11/2013 | Lee et al. |
| 2013/0322343 | A1 | 12/2013 | Seo et al. |
| 2014/0105076 | A1 | 4/2014 | Yang et al. |

FOREIGN PATENT DOCUMENTS

| | | |
|---|---|---|
| WO | 2010/106786 A1 | 9/2010 |
| WO | 2011/065440 A1 | 6/2011 |
| WO | 2012/145922 A1 | 11/2012 |
| WO | 2012/175030 A1 | 12/2012 |

OTHER PUBLICATIONS

3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.

3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.

Catt, "HARQ and Cross-carrier Scheduling for Different TDD Configurations," R2-112798, 3GPP TSG RAN WG2 Meeting #74, Agenda Item: 7.1.2, Barcelona, Spain, May 9-13, 2011, 3 pages.

Ericsson, ST-Ericsson, "A/N transmission in the uplink for carrier aggregation," R1-100909, 3GPP TSG-RAN WG1 #60, Agenda Item: 7.1.6, San Francisco, USA, Feb. 22-26, 2010, 4 pages.

Extended European Search Report dated Nov. 14, 2014, for corresponding EP Application No. 12810857.8-1851 /2693799, 7 pages.

Extended European Search Report, dated Sep. 13, 2018, for corresponding European Application No. 18174530.8-1219, 10 pages.

Huawei, HiSilicon, "BS Demodulation performance requirements for eIMTA," R4-141691, 3GPP TSG-RAN WG4 Meeting #70bis, Agenda Item: 7.6.5, San Jose del Cabo, Mexico, Mar. 31-Apr. 4, 2014, 6 pages.

Intel Corporation, "Support of Mixed Inter-Band TDD Configurations in Rel-11 CA," R2-113216, 3GPP TSG RAN2#74 meeting, Agenda Item: 7.1.2, Barcelona, Spain, May 9-13, 2011, 3 pages.

International Search Report dated Aug. 21, 2012, for corresponding International Application No. PCT/JP2012/004246, 2 pages.

LG Electronics, "Summary of email discussion on DL HARQ timing for TDD-FDD carrier aggregation with self-carrier scheduling," R1-140315, 3GPP TSG RAN WG1 Meeting #76, Agenda Item: 7.2.3.1, Prague, Czech Republic, Feb. 10-14, 2014, 7 pages.

LG Electronics, "DL HARQ timing for TDD-FDD carrier aggregation with self-carrier scheduling," R1-140310, 3GPP TSG RAN WG1 Meeting #76, Agenda Item: 7.2.3.1, Prague, Czech Republic, Feb. 10-14, 2014, 8 pages.

Nakao et al., "Performance enhancement of E-UTRA uplink control channel in fast fading environments," IEEE 69th Vehicular Technology Conference, VTC Spring 2009, Conference Date: Apr. 26-29, 2009, 5 pages.

Panasonic, "UL ACK/NACK transmission on PUCCH for carrier aggregation," R1-091744, 3GPP TSG-RAN WG1 Meeting #57, Agenda Item: 15.4, San Francisco, USA, May 4-8, 2009, 3 pages.

Renesas Mobile Europe, "Operation Principles of CC specification TDD Configuration," R2-112938, 3GPP TSG-RAN WG2 Meeting #74, Agenda Item: 7.1.2, Barcelona, France, May 9-13, 2011, 3 pages.

Samsung, "Trade-off Considerations for CA Enhancements," R1-112495, 3GPP TSG RAN WG1 #66, Athens, Greece, May 22-26, 2011, 4 pages.

Zte, "Uplink Control Channel Design for LTE-Advanced," R1-091702, TSG-RAN WG1 #57, Agenda Item: 15.4, San Francisco, USA, May 4-8, 2009, 6 pages.

* cited by examiner

FIG. 15A

TABLE OF CORRESPONDENCE

| UL-DL Configuration | GROUP NUMBER |
|---|---|
| 0 | 1 |
| 1 | 1 |
| 2 | 1 |
| 3 | 2 |
| 4 | 2 |
| 5 | 1 |
| 6 | 1 |

INDICATE GROUP NUMBER (1bit/Config)

FIG. 15B

INDICATE TABLE OF CORRESPONDENCE NUMBER (2bits) → #3

TABLE OF CORRESPONDENCE #0

| UL-DL Configuration | GROUP NUMBER |
|---|---|
| 0 | 1 |
| 1 | 1 |
| 2 | 1 |
| 3 | 2 |
| 4 | 2 |
| 5 | 1 |
| 6 | 1 |

TABLE OF CORRESPONDENCE #1

| UL-DL Configuration | GROUP NUMBER |
|---|---|
| 0 | 1 |
| 1 | 2 |
| 2 | 2 |
| 3 | 1 |
| 4 | 1 |
| 5 | 2 |
| 6 | 1 |

TABLE OF CORRESPONDENCE #2

| UL-DL Configuration | GROUP NUMBER |
|---|---|
| 0 | 1 |
| 1 | 1 |
| 2 | 2 |
| 3 | 2 |
| 4 | 2 |
| 5 | 2 |
| 6 | 1 |

TABLE OF CORRESPONDENCE #3

| UL-DL Configuration | GROUP NUMBER |
|---|---|
| 0 | 1 |
| 1 | 2 |
| 2 | 2 |
| 3 | 1 |
| 4 | 1 |
| 5 | 2 |
| 6 | 1 |

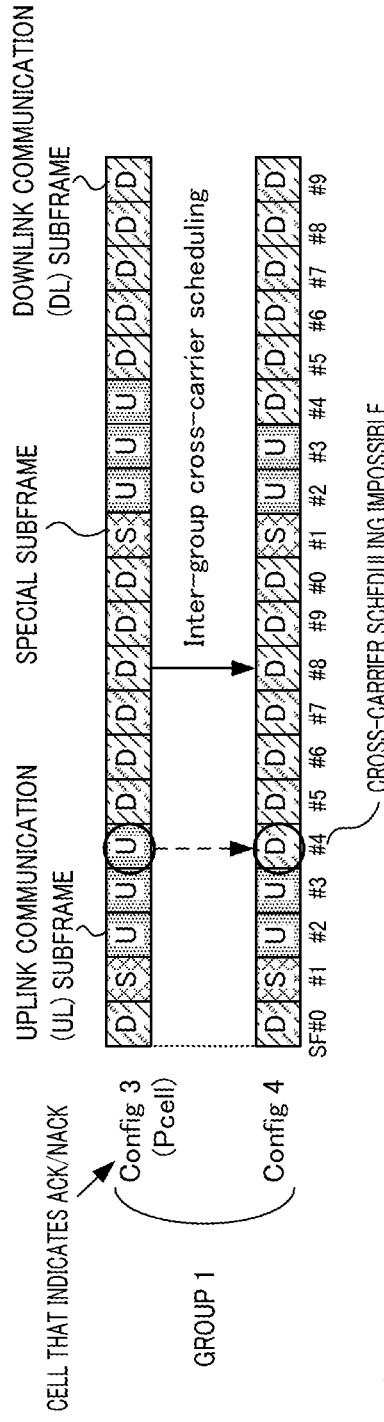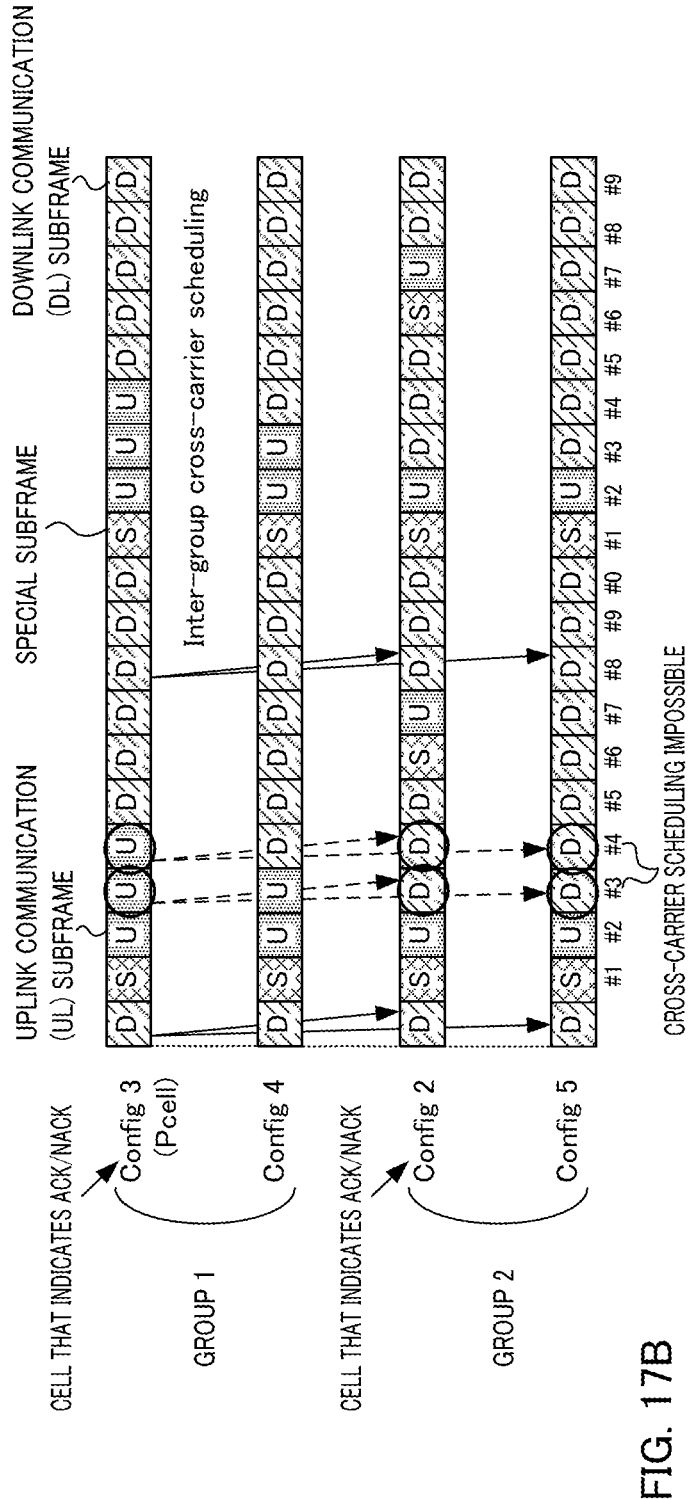
FIG. 17A
FIG. 17B

| PCELL SIB-1 UL-DL CONFIG | UL-DL CONFIG OF SCELL USED BY TERMINAL |
|---|---|
| 0 | 0-6 |
| 1 | 1, 2, 4, 5 |
| 2 | 2, 5 |
| 3 | 3-5 |
| 4 | 4, 5 |
| 5 | 5 |
| 6 | 1-6 |

FIG. 24

| PCELL SIB-1 UL-DL CONFIG | SCELL SIB-1 UL-DL CONFIG | | | | | | |
|---|---|---|---|---|---|---|---|
| | 0 | 1 | 2 | 3 | 4 | 5 | 6 |
| 0 | 0-6 | 1, 2, 4, 5 | 2, 5 | 3-5 | 4, 5 | 5 | 1-6 |
| 1 | 1, 2, 4, 5 | 1, 2, 4, 5 | 2, 5 | 4, 5 | 4, 5 | 5 | 1, 2, 4, 5 |
| 2 | 2, 5 | 2, 5 | 2, 5 | 5 | 5 | 5 | 2, 5 |
| 3 | 3-5 | 4, 5 | 5 | 3-5 | 4, 5 | 5 | 3-5 |
| 4 | 4, 5 | 4, 5 | 5 | 4, 5 | 4, 5 | 5 | 4, 5 |
| 5 | 5 | 5 | 5 | 5 | 5 | 5 | 5 |
| 6 | 1-6 | 1, 2, 4, 5 | 2, 5 | 3-5 | 4, 5 | 5 | 1-6 |

FIG. 26

| PCELL SIB-1 UL-DL CONFIG | UL-DL CONFIG OF SCELL USED BY TERMINAL |
|---|---|
| 0 | 0 |
| 1 | 1 |
| 2 | 2 |
| 3 | 3 |
| 4 | 4 |
| 5 | 5 |
| 6 | 6 |

FIG. 28

| SIB1 UL-DL Config | RRC or dynamic UL-DL Config |
|---|---|
| 0 | 0-6 |
| 1 | 1, 2, 4, 5 |
| 2 | 2, 5 |
| 3 | 3-5 |
| 4 | 4, 5 |
| 5 | 5 |
| 6 | 1-6 |

FIG. 30

COMMUNICATION APPARATUS AND COMMUNICATION METHOD

TECHNICAL FIELD

The present invention relates to a terminal apparatus and a transmission method.

BACKGROUND ART

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literatures (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of pieces of control information included in the received PDCCH signal (i.e., Downlink (DL) Assignment Control Information: also referred to as Downlink Control Information (DCI)). To put it more specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part reports that the CRC operation is OK, the piece of control information is determined as being intended for the terminal.

Moreover, in 3GPP LTE, Automatic Repeat Request (ARQ) is applied to downlink data to terminals from a base station. To put it more specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2 control channels (L1/L2 CCH). Each L1/L2 CCH consists of one or more Control Channel Elements (CCE). To put it more specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. Furthermore, "component carrier" may also be abbreviated as CC(s).

In the Time Division Duplex (TDD) system, a downlink component carrier and an uplink component carrier have the same frequency band, and downlink communication and uplink communication are realized by switching between the downlink and uplink on a time division basis. For this reason, in the case of the TDD system, the downlink component carrier can also be expressed as "downlink communication timing in a component carrier." The uplink component carrier can also be expressed as "uplink communication timing in a component carrier." The downlink component carrier and the uplink component carrier are switched based on a UL-DL configuration as shown in FIG. 3. In the UL-DL configuration shown in FIG. 3, timings are configured in subframe units (that is, 1 msec units) for downlink communication (DL) and uplink communication (UL) per frame (10 msec). The UL-DL configuration can construct a communication system capable of flexibly meeting a downlink communication throughput requirement and an uplink communication throughput requirement by changing a subframe ratio between downlink communication and uplink communication. For example, FIG. 3 illustrates UL-DL configurations (Config 0 to 6) having different subframe ratios between downlink communication and uplink communication. In addition, in FIG. 3, a downlink communication subframe is represented by "D," an uplink communication subframe is represented by "U" and a special subframe is represented by "S." Here, the special subframe is a subframe at the time of switchover from a downlink communication subframe to an uplink communication subframe. In the special subframe, downlink data communication may be performed as in the case of the downlink communication subframe. In each UL-DL configuration shown in FIG. 3, subframes (20 subframes) corresponding to 2 frames are expressed in two stages: subframes ("D" and "S" in the upper row) used for downlink communication and subframes ("U" in the lower row) used for uplink communication. Furthermore, as shown in FIG. 3, an error detection result corresponding to downlink data (ACK/NACK) is reported in the fourth uplink communication subframe or an uplink communication subframe after the fourth subframe after the subframe to which the downlink data is assigned.

The LTE-A system supports communication using a band obtained by bundling some component carriers, so-called carrier aggregation (CA). Note that while a UL-DL configuration can be set for each component carrier, an LTE-A system compliant terminal (hereinafter, referred to as "LTE-A terminal") is designed assuming that the same UL-DL configuration is set among a plurality of component carriers.

FIGS. 4A and 4B are diagrams provided for describing asymmetric carrier aggregation and a control sequence thereof applicable to individual terminals.

As illustrated in FIG. 4B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communication is set for terminal 2.

Referring to terminal 1, a base station included an LTE-A system (that is, LTE-A system compliant base station (hereinafter, referred to as "LTE-A base station") and an LTE-A terminal included in the LTE-A system transmit and receive signals to and from each other in accordance with the sequence diagram illustrated in FIG. 4A. As illustrated in FIG. 4A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communication with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers does not increase, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, channel selection (also referred to as "multiplexing"), bundling and a discrete Fourier transform spread orthogonal frequency division multiplexing (DFT-S-OFDM) format are available as a method of transmitting a plurality of response signals for the plurality of pieces of downlink data. In channel selection, a terminal causes not only symbol points used for response signals, but also the resources to which the response signals are mapped to vary in accordance with the pattern for results of the error detection on the plurality of pieces of downlink data. Compared with channel selection, in bundling, the terminal bundles ACK or NACK signals generated according to the results of error detection on the plurality of pieces of downlink data (i.e., by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5). For example, a terminal may feed back the response signals (i.e., ACK/NACK) using channel selection, bundling or DFT-S-OFDM according to the number of bits for a pattern for results of error detection. Alternatively, a base station may previously configure the method of transmitting the response signals.

Channel Selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data for each downlink component carrier received on the plurality of downlink component carriers (a maximum of two downlink component carriers) are each an ACK or NACK as illustrated in FIG. 5. Meanwhile, bundling is a technique that bundles ACK/NACK signals for the plurality of pieces of downlink data into a single set of signals and thereby transmits the bundled signals using one predetermined resource (see, NPLs 6 and 7). Hereinafter, the set of the signals formed by bundling ACK/NACK signals for a plurality of pieces of downlink data into a single set of signals may be referred to as "bundled ACK/NACK signals."

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is mapped in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously indicate a PUCCH resource to each terminal from a base station (i.e., explicit signaling) (hereinafter, method 2). To put it differently, each terminal transmits response signals using the PUCCH resource previously indicated by the base station in method 2.

Furthermore, as shown in FIG. 5, the terminal transmits response signals using one of two component carriers. A component carrier that transmits such response signals is called "primary component carrier (PCC) or primary cell (PCell)." The other component carrier is called "secondary component carrier (SCC) or secondary cell (SCell)." For example, the PCC (PCell) is a component carrier that transmits broadcast information on a component carrier that transmits response signals (e.g., system information block type 2 (SIB2)).

In method 2, PUCCH resources common to a plurality of terminals (e.g., four PUCCH resources) may be previously indicated to the terminals from a base station. For example, terminals may employ a method to select one PUCCH resource to be actually used, on the basis of a transmit power control (TPC) command of two bits included in DCI in SCell. In this case, the TPC command is also called an ACK/NACK resource indicator (ARI). Such a TPC command allows a certain terminal to use an explicitly signaled PUCCH resource in a certain subframe while allowing another terminal to use the same explicitly signaled PUCCH resource in another subframe in the case of explicit signaling.

Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 5) is assigned (implicit signaling).

Here, ARQ control using channel selection when the above asymmetric carrier aggregation is applied to a terminal will be described with reference to FIG. 5 and FIGS. 6A and 6B.

For example, in FIG. 5, a component carrier group (may be referred to as "component carrier set" in English) consisting of component carrier 1 (PCell) and component carrier 2 (SCell) is set for terminal 1. In this case, after downlink resource assignment information is transmitted to terminal 1 from the base station via a PDCCH of each of component carriers 1 and 2, downlink data is transmitted using the resource corresponding to the downlink resource assignment information.

Furthermore, in channel selection, response signals representing error detection results corresponding to a plurality of pieces of downlink data in component carrier 1 (PCell) and error detection results corresponding to a plurality of pieces of downlink data in component carrier 2 (SCell) are mapped to PUCCH resources included in PUCCH region 1 or PUCCH region 2. The terminal uses two types of phase points (Binary Phase Shift Keying (BPSK) mapping) or four types of phase points (Quadrature Phase Shift Keying (QPSK) mapping) as response signals thereof. That is, in channel selection, it is possible to express a pattern for results of error detection corresponding to a plurality of pieces of downlink data in component carrier 1 (PCell) and the results of error detection corresponding to a plurality of pieces of downlink data in component carrier 2 (SCell) by a combination of PUCCH resources and phase points.

Here, FIG. 6A shows a method of mapping a pattern for results of error detection when the number of component carriers is two (one PCell, one SCell) in a TDD system.

Note that FIG. 6A assumes a case where the transmission mode is set to one of (a), (b) and (c) below.

(a) A transmission mode in which each component carrier supports only one-CW transmission in downlink (b) A transmission mode in which one component carrier supports only one-CW transmission in downlink and the other component carrier supports up to two-CW transmission in downlink (c) A transmission mode in which each component carrier supports up to two-CW transmission in downlink Furthermore, FIG. 6A assumes a case where number M is set in one of (1) to (4) below, M indicating how many downlink communication subframes per component carrier (hereinafter, described as "DL (DownLink) subframes," "D" or "S" shown in FIG. 3) of results of error detection need to be reported to the base station using one uplink communication subframe (hereinafter, described as "UL (UpLink) subframe," "U" shown in FIG. 3). For example, in Config 2 shown in FIG. 3, since results of error detection of four DL subframes are reported to the base station using one UL subframe, M=4.

(1) M=1
(2) M=2
(3) M=3
(4) M=4

That is, FIG. 6A illustrates a method of mapping a pattern for results of error detection when (a) to (c) above are combined with (1) to (4) above. The value of M varies depending on UL-DL configuration (Config 0 to 6) and subframe number (SF #0 to SF #9) in one frame as shown in FIG. 3. Furthermore, in Config 5 shown in FIG. 3, M=9 in subframe (SF) #2. However, in this case, in the LTE-A TDD system, the terminal does not apply channel selection and reports the results of error detection using, for example, a DFT-S-OFDM format. For this reason, in FIG. 6A, Config 5 (M=9) is not included in the combination.

In the case of (1), the number of error detection result patterns is $2^2 \times 1 = 4$ patterns, $2^3 \times 1 = 8$ patterns and $2^4 \times 1 = 16$ patterns in order of (a), (b) and (c). In the case of (2), the number of error detection result patterns is $2^2 \times 2 = 8$ patterns, $2^3 \times 2 = 16$ patterns, $2^4 \times 2 = 32$ patterns in order of (a), (b) and (c). The same applies to (3) and (4).

Here, it is assumed that the phase difference between phase points to be mapped in one PUCCH resource is 90 degrees at minimum (that is, a case where a maximum of 4 patterns per PUCCH resource are mapped). In this case, the number of PUCCH resources necessary to map all error detection result patterns is $2^4 \times 4 \pm 4 = 16$ in (4) and (c) when the number of error detection result patterns is a maximum ($2^4 \times 4 = 64$ patterns), which is not realistic. Thus, the TDD system intentionally reduces the amount of information on the results of error detection by bundling the results of error detection in a spatial region or further in a time domain if necessary. In this way, the TDD system limits the number of PUCCH resources necessary to report the error detection result patterns.

In the LTE-A TDD system, in the case of (1), the terminal maps 4 patterns, 8 patterns and 16 patterns of results of error detection in order of (a), (b) and (c) to 2, 3 and 4 PUCCH resources respectively without bundling the results of error detection (Step3 in FIG. 6A). That is, the terminal reports an error detection result using 1 bit per component carrier in which a transmission mode (non-MIMO) supporting only one-codeword (CW) transmission in downlink and reports error detection results using 2 bits per component carrier in which a transmission mode (MIMO) supporting up to two-CW transmissions in downlink.

In the LTE-A TDD system, in the cases of (2) and (a), the terminal maps eight patterns of results of error detection to four PUCCH resources without bundling the results of error detection (Step3 in FIG. 6A). In that case, the terminal reports error detection results using 2 bits per downlink component carrier.

In the LTE-A TDD system, in the cases of (2) and (b) (the same applies to (2) and (c)), the terminal bundles the results of error detection of component carriers in which a transmission mode supporting up to two-CW transmission in downlink is set in a spatial region (spatial bundling) (Step1 in FIG. 6A). In the spatial bundling, when the result of error detection corresponding to at least one CW of two CWs of the results of error detection is NACK, the terminal determines the results of error detection after the spatial bundling to be NACK. That is, in spatial bundling, Logical And of the results of error detection of two CWs is taken. The terminal then maps error detection result patterns after spatial bundling (8 patterns in the cases of (2) and (b), 16 patterns in the cases of (2) and (c)) to four PUCCH resources (Step3 in FIG. 6A). In that case, the terminal reports error detection results using 2 bits per downlink component carrier.

In the LTE-A TDD system, in the cases of (3) or (4), and (a), (b) or (c), the terminal performs bundling in the time domain (time-domain bundling) after the spatial bundling (Step1) (Step2 in FIG. 6A). The terminal then maps the error detection result patterns after the time-domain bundling to four PUCCH resources (Step3 in FIG. 6A). In that case, the terminal reports results of error detection using 2 bits per downlink component carrier.

Next, an example of more specific mapping methods will be described with reference to FIG. 6B. FIG. 6B shows an example of a case where the number of downlink component carriers is 2 (one PCell, one SCell) and a case where "(c) a transmission mode in which each component carrier supports up to two-CW transmission in the downlink" is set and a case with "(4) M=4."

In FIG. 6B, the results of error detection of a PCell are (ACK (A), ACK), (ACK, ACK), (NACK (N), NACK) and (ACK, ACK) in order of (CW0, CW1) in four DL subframes (SF1 to 4). In the PCell shown in FIG. 6B, M=4, and therefore the terminal spatially bundles these subframes in Step1 in FIG. 6A (portions enclosed by a solid line in FIG. 6B). As a result of the spatial bundling, ACK, ACK, NACK and ACK are obtained in that order in four DL subframes of the PCell shown in FIG. 6B. Furthermore, in Step2 in FIG. 6A, the terminal applies time-domain bundling to the 4-bit error detection result pattern (ACK, ACK, NACK, ACK) after spatial bundling obtained in Step1 (portions enclosed by broken line in FIG. 6B). In this way, a 2-bit error detection result of (NACK, ACK) is obtained in the PCell shown in FIG. 6B.

The terminal likewise applies spatial bundling and time-domain bundling also for the SCell shown in FIG. 6B and thereby obtains a 2-bit error detection result (NACK, NACK).

The terminal then combines the error detection result patterns using 2 bits each after time-domain bundling of the PCell and SCell in Step3 in FIG. 6A in order of the PCell, SCell to bundle them into a 4-bit error detection result pattern (NACK, ACK, NACK, NACK). The terminal determines a PUCCH resource (in this case, h1) and a phase point (in this case, −j) using the mapping table shown in Step3 in FIG. 6A from this 4-bit error detection result pattern.

CITATION LIST

Non-Patent Literatures

NPL 1
3GPP TS 36.211 V10.1.0, "Physical Channels and Modulation (Release 9)," March 2011
NPL 2
3GPP TS 36.212 V10.1.0, "Multiplexing and channel coding (Release 9)," March 2011
NPL 3
3GPP TS 36.213 V10.1.0, "Physical layer procedures (Release 9)," March 2011
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
Ericsson and ST-Ericsson, "A/N transmission in the uplink for carrier aggregation," R1-100909, 3GPP TSG-RAN WG1 #60, February 2010
NPL 6
ZTE, 3GPP RAN1 meeting #57, R1-091702, "Uplink Control Channel Design for LTE-Advanced," May 2009
NPL 7
Panasonic, 3GPP RAN1 meeting #57, R1-091744, "UL ACK/NACK transmission on PUCCH for Carrier aggregation," May 2009

SUMMARY OF INVENTION

Technical Problem

As described above, LTE-A terminals are designed on the assumption that the same UL-DL configuration is set among a plurality of component carriers. This is because carrier aggregation among a plurality of component carriers (e.g., a certain 20 MHz bandwidth and a different 20 MHz bandwidth in a 2 GHz band, for example) in one frequency band (e.g., 2 GHz band) (so-called intra-band carrier aggregation) is conventionally assumed. When uplink communication and downlink communication are simultaneously performed between different component carriers in the same frequency band, a terminal in downlink communication receives large interference from a terminal carrying out uplink communication. On the other hand, there is a large frequency gap in carrier aggregation among component carriers of a plurality of frequency bands (e.g., 2 GHz band and 800 MHz band) (e.g., a certain 20 MHz bandwidth in a 2 GHz band and a certain 20 MHz bandwidth in an 800 MHz band) (so-called inter-band carrier aggregation). Thus, interference received by a terminal in downlink communication using a component carrier of a certain frequency band (e.g., 20 MHz bandwidth in a 2 GHz band) from another terminal in uplink communication in another frequency band (e.g., 20 MHz bandwidth in an 800 MHz band) is small.

Incidentally, studies are being carried out, for a case where a communication carrier providing an LTE-A TDD system newly assigns a frequency band to an LTE-A service, on a possibility of varying a UL-DL configuration of the newly assigned frequency band from a UL-DL configuration of an existing frequency band depending on a service to which the communication carrier attaches greater importance. To be more specific, a communication carrier that attaches greater importance to downlink communication throughput uses a UL-DL configuration having a greater ratio of DL subframes to UL subframes in a new frequency band (e.g., Config 3, 4 or 5 or the like in FIG. 3). This allows a more flexible system to be constructed.

However, no studies have been carried out so far on a method of bundling results of error detection when a UL-DL configuration varies between component carriers, that is, when the value of "M" varies from one component carrier to another.

FIG. 7A and FIG. 7B illustrate an example of a method of reporting results of error detection when a UL-DL configuration varies between component carriers. For example, in FIG. 7A and FIG. 7B, a component carrier (frequency f1) in which Config 2 is set is a PCell and a component carrier (frequency f2) in which Config 3 is set is an SCell.

FIG. 7A illustrates a method of reporting results of error detection using component carriers of the PCell and SCell independently. According to the method in FIG. 7A, since the terminal can independently report results of error detection for each component carrier, the degree of complexity is low. However, in FIG. 7A, resources (A/N resources) to transmit results of error detection (response signals) are required for each of the two component carriers. Moreover, in FIG. 7A, a base station needs to perform a decoding processing on results of error detection of the two component carriers in parallel (that is, 2-parallel). That is, in FIG. 7A, A/N resources and decoding processing two times as large as those of 3GPP Release 10 (Rel-10) in which only one component carrier (1 CC) is set for a terminal are required.

Furthermore, when a terminal is configured with a maximum of 5 CCs, A/N resources corresponding to a maximum of 5 CCs are required. Furthermore, the base station requires decoding processing on results of error detection in a maximum of 5 CCs in-parallel (1 CC error detection result/1 parallel). Here, when a UL-DL configuration is always the same among component carriers, UL subframe timings are the same among the component carriers. Thus, even when a terminal is configured with a maximum of 5 CCs of component carriers, the required A/N resource amount is only A/N resources corresponding to 1 CC. Moreover, decoding processing on results of error detection in the base station required is also only a 1-parallel process (process on 1-CC error detection result) when up to 5 CCs are set. In contrast, when a UL-DL configuration varies among component carriers, a maximum of quintuple A/N resources and decoding processing amount are required.

On the other hand, FIG. 7B illustrates a method of reporting results of error detection of the component carriers always bundled in a PCell. That is, in FIG. 7B, results of error detection of both the PCell and SCell are transmitted in UL subframes of the PCell. Since the terminal always reports results of error detection from the PCell in the method in FIG. 7B, A/N resources used are only ones corresponding to 1 CC of the PCell. Furthermore, decoding processing on results of error detection required in the base station is also only a 1-parallel process (up to 5-CC error detection results/1 parallel).

However, timing of reporting results of error detection of the SCell may vary compared to the case with 1 CC depending on a combination of UL-DL configurations respectively set in the PCell and SCell. For example, in FIG. 7B, the earliest indication timing for an error detection result of data in subframe #0 of the SCell in which Config 3 is set is subframe #7 of the PCell. However, as shown in FIG. 3, when Config 3 is set only in a single component carrier (1 CC), the indication timing corresponding to the results of error detection for data in subframe #0 is subframe #4. Thus, when the timing of reporting results of error detection varies depending on the combination of UL-DL configurations, processes becomes very complicated and the number of test cases increases.

An object of the present invention is to provide, when ARQ is applied to communication using an uplink component carrier and a plurality of downlink component carriers associated with the uplink component carrier and when a UL-DL configuration (ratio between UL and DL subframes) set for each component carrier varies, a terminal apparatus and a transmission method capable of suppressing increases in the A/N resource amount used and the amount of decoding processing on results of error detection in a base station without changing timing of reporting results of error detection of an SCell from timing of reporting results of error detection when only a single component carrier is set.

Solution to Problem

A terminal apparatus according to an aspect of the present invention is configured to communicate with a base station apparatus using a plurality of component carriers in each of which a configuration pattern of subframes forming one frame is set, the configuration pattern including a downlink communication subframe used for downlink communication and an uplink communication subframe used for uplink communication, the terminal apparatus including: a receiving section that receives downlink data pieces using the plurality of component carriers, respectively; an error detection section that detects an error of each of the downlink data pieces; a generating section that generates a response signal using an error detection result of each of the downlink data pieces obtained by the error detection section; and a control section that transmits the response signal to the base station apparatus, in which: the control section transmits, using a first component carrier, a response signal including error detection results for the data pieces respectively received using the first component carrier and a second component carrier among the plurality of component carriers; and in a first configuration pattern that is set in the first component carrier, at least an uplink communication subframe is set at a timing identical to that of an uplink communication subframe of a second configuration pattern that is set in the second component carrier.

A transmission method according to an aspect of the present invention is used in a terminal apparatus configured to communicate with a base station apparatus using a plurality of component carriers in each of which a configuration pattern of subframes forming one frame is set, the configuration pattern including a downlink communication subframe used for downlink communication and an uplink communication subframe used for uplink communication, the method including: receiving downlink data pieces using the plurality of component carriers, respectively; detecting an error of each of the downlink data pieces; generating a response signal using an error detection result of each of the downlink data pieces to be obtained; and transmitting the response signal to the base station apparatus, in which: the control section transmits, using a first component carrier, a response signal including error detection results for the data pieces respectively received using the first component carrier and a second component carrier among the plurality of component carriers; and in a first configuration pattern that is set in the first component carrier, at least an uplink communication subframe is set at a timing identical to that of an uplink communication subframe of a second configuration pattern that is set in the second component carrier.

Advantageous Effects of Invention

According to the present invention, when ARQ is applied to communication using an uplink component carrier and a plurality of downlink component carriers associated with the uplink component carrier, and when a UL-DL configuration (ratio between UL subframes and DL subframes) set for each component carrier varies, it is possible to suppress increases in the A/N resource amount used and the amount of decoding processing on results of error detection in a base station without changing timing of reporting results of error detection of an SCell from timing of reporting results of error detection when only a single component carrier is set.

BRIEF DESCRIPTION OF DRAWINGS

FIGS. 15A and 15B illustrate a group number signaling method according to Embodiment 2 of the present invention (setting method 1);

FIGS. 17A and 17B are diagrams provided for describing problems according to Embodiment 3 of the present invention;

FIG. 24 illustrates UL-DL configuration settings that satisfy condition (1) according to Embodiment 4 of the present invention;

FIG. 26 illustrates UL-DL configuration settings that satisfy condition (1) and condition (2) according to Embodiment 4 of the present invention;

FIG. 28 illustrates UL-DL configuration settings that satisfy condition (3) according to Embodiment 4 of the present invention;

FIG. 30 illustrates UL-DL configuration settings that satisfy condition (2) according to Embodiment 5 of the present invention.

DESCRIPTION OF EMBODIMENTS

Figure 1:
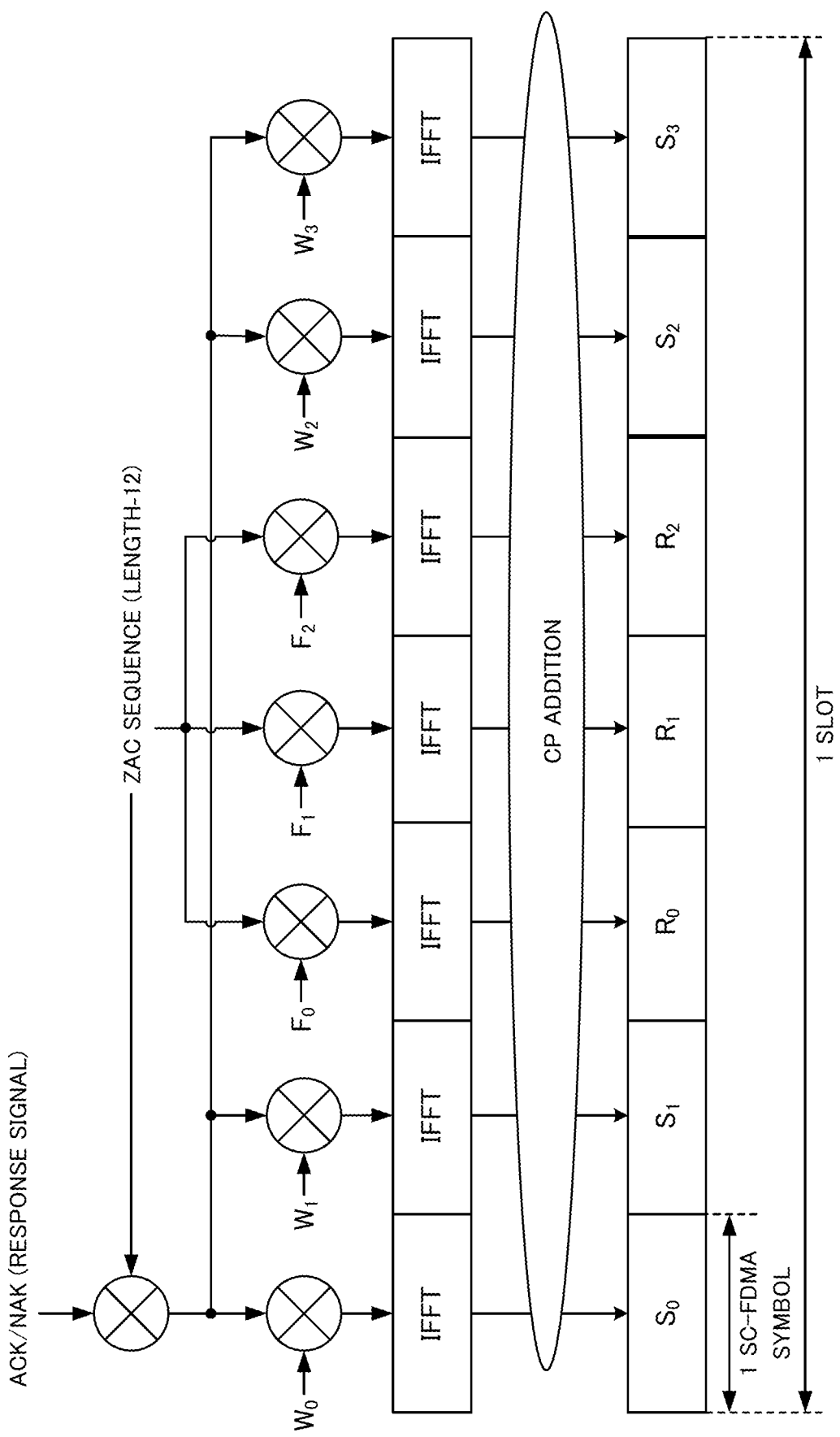
FIG. 1 is a diagram illustrating a method of spreading response signals and reference signals.
Figure 2:
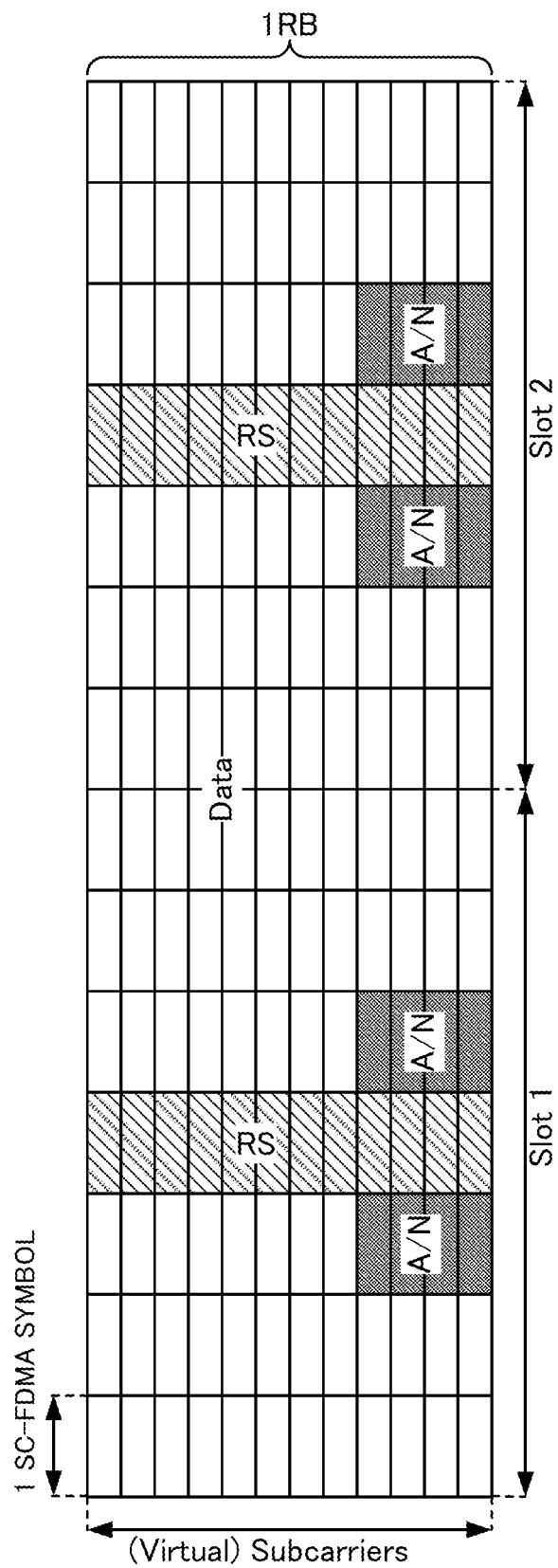
FIG. 2 is a diagram illustrating an operation related to a case where TDM is applied to response signals and uplink data on PUSCH resources.

Hereinafter, embodiments of the claimed invention will be described in detail with reference to the accompanying drawings. Throughout the embodiments, the same elements are assigned the same reference numerals and any duplicate description of the elements is omitted.

Embodiment 1

Figure 8:
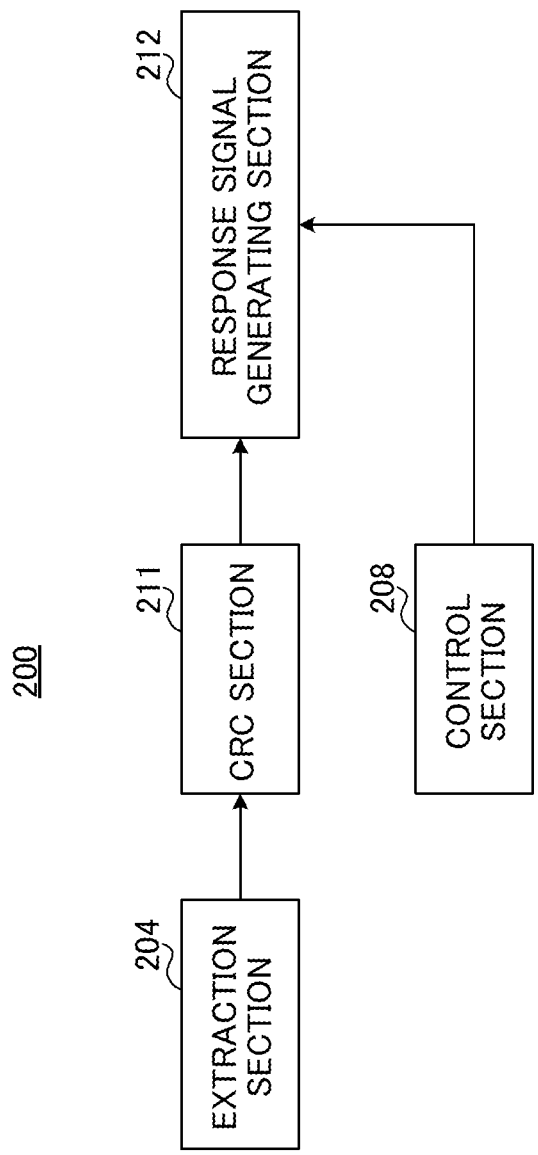
FIG. 8 is a block diagram illustrating a main configuration of a terminal according to Embodiment 1 of the present invention.

FIG. 8 is a main configuration diagram of terminal 200 according to the present embodiment. Terminal 200 communicates with base station 100 using a plurality of component carriers including a first component carrier and a second component carrier. Furthermore, as a configuration pattern of subframes making up one frame, the configuration pattern including downlink communication subframes (DL subframes) used for downlink communication and uplink communication subframes (UL subframes) used for uplink communication (DL-UL Configuration) is set in each component carrier set for terminal 200. In terminal 200, extraction section 204 receives downlink data using a plurality of component carriers; CRC section 211 detects an error of each piece of downlink data; response signal generating section 212 generates a response signal using the result of error detection of each piece of downlink data obtained in CRC section 211; and control section 208 transmits the response signal to base station 100. However, in the UL DL configuration (first configuration pattern) set in a first component carrier, UL subframes are configured at the same timings as those of UL subframes of the UL DL configuration (second configuration pattern) set in at least a second component carrier. Furthermore, control section 208 transmits, using the first component carrier, response signals including results of error detection corresponding to data received by each of the first component carrier and second component carrier.

(Configuration of Base Station)

Figure 9:
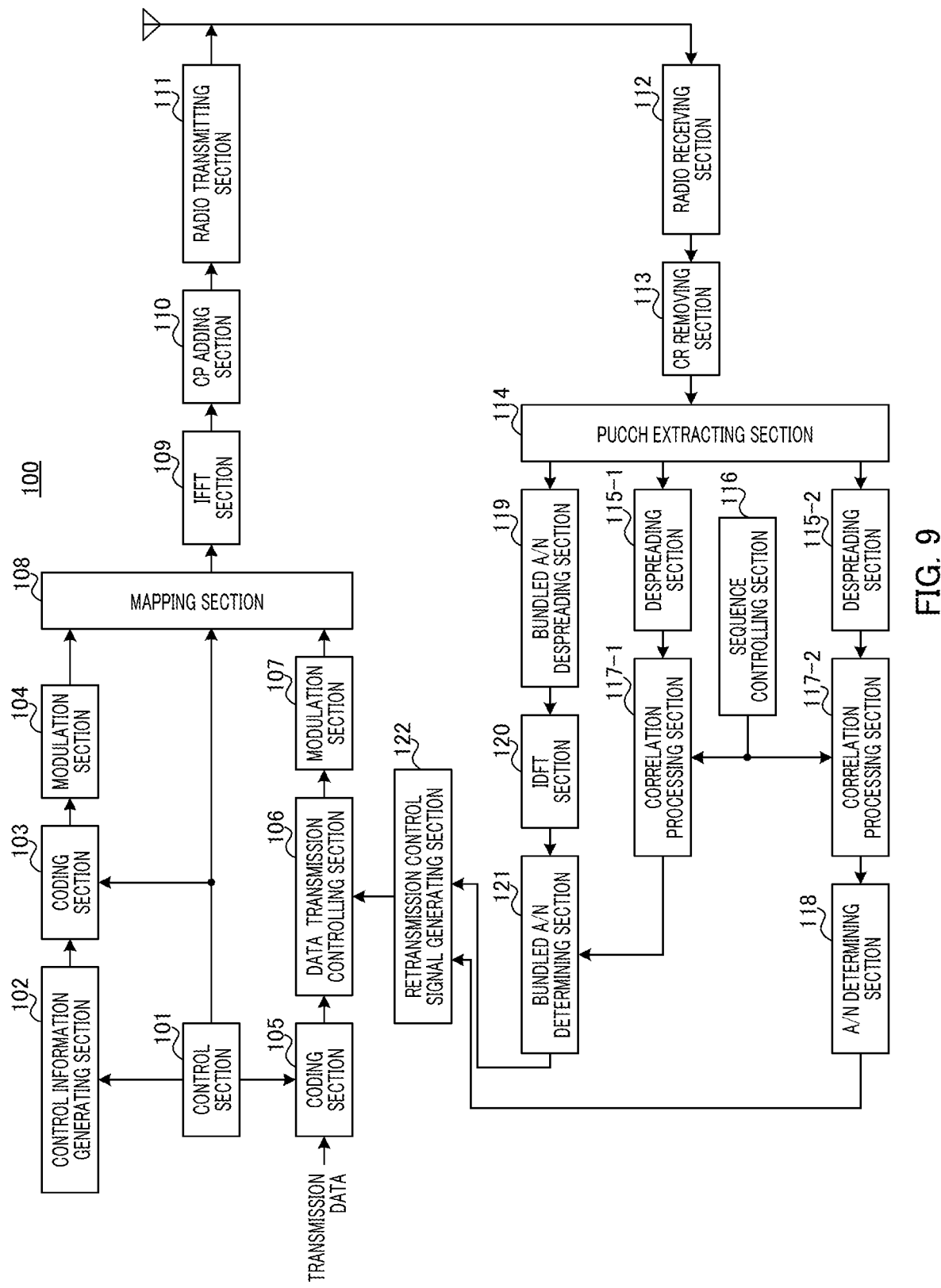
FIG. 9 is a block diagram illustrating a configuration of a base station according to Embodiment 1 of the present invention.

FIG. 9 is a configuration diagram of base station 100 according to Embodiment 1 of the claimed invention. In FIG. 9, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence control section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. To put it more specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106. The details of the method of grouping component carriers in retransmission control signal generating section 122 will be described, hereinafter.

(Configuration of Terminal)

Figure 10:
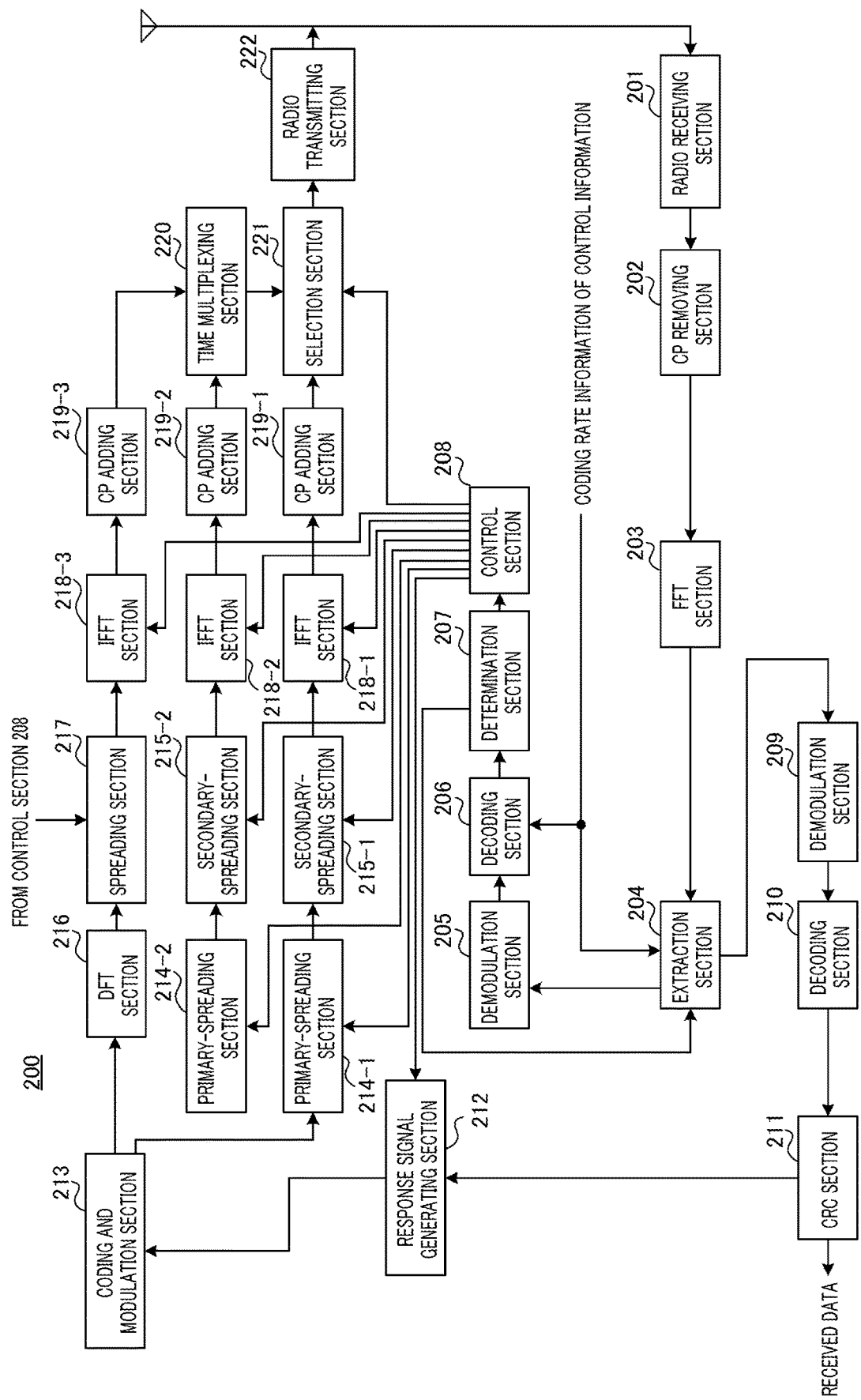
FIG. 10 is a block diagram illustrating a configuration of a terminal according to Embodiment 1 of the present invention.

FIG. 10 is a block diagram illustrating a configuration of terminal 200 according to Embodiment 1. In FIG. 10, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. To put it more specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Demodulation section 209 demodulates the downlink data received from extraction section 204 and outputs the demodulated downlink data to decoding section 210. Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier inputted from CRC section 211 and information indicating a predetermined group number. To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213. The details of the method of grouping component carriers in response signal generating section 212 will be described, hereinafter.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Operations of base station 100 and terminal 200 having the above-described configurations will be described.

In the present embodiment, terminal 200 groups component carriers for each identical UL-DL configuration and reports results of error detection corresponding to data received in a plurality of component carriers in each group using a specific one component carrier in the group.

Figure 11:
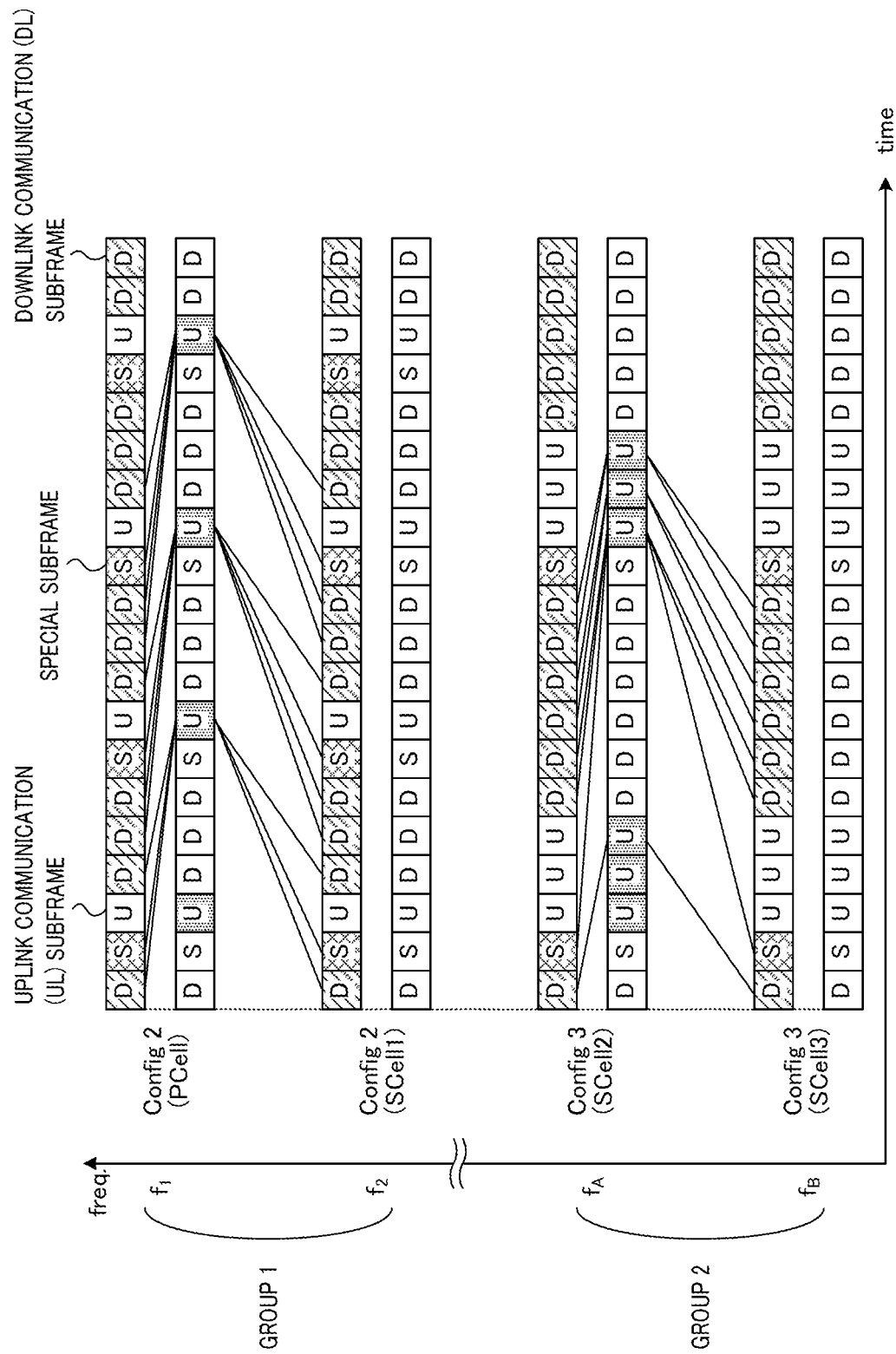
FIG. 11 illustrates a method of grouping component carriers according to Embodiment 1 of the present invention.

FIG. 11 illustrates an example of a method of reporting results of error detection in the present embodiment. In FIG. 11, terminal 200 is configured with four or more component carriers including component carriers of frequencies $f_1$, $f_2$, $f_A$ and $f_B$. In FIG. 11, the component carrier of frequency $f_1$ is a PCell and the component carriers of $f_2$, $f_A$ and $f_B$ are SCells 1 to 3, respectively. In FIG. 11, Config 2 is set as a UL-DL configuration for the PCell and SCell 1 and Config 3 is set as a UL-DL configuration for SCell 2 and SCell 3.

That is, in FIG. 11, the same UL-DL configuration (Config 2) is set for the PCell and SCell 1 and the same UL-DL configuration (Config 3) is set for SCell 2 and SCell 3.

Thus, response signal generating section 212 of terminal 200 puts together the PCell and SCell 1 for which the same UL-DL configuration (Config 2) is set into one group (group 1) and puts together SCell 2 and SCell 3 for which the same UL-DL configuration (Config 3) is set into one group (group 2).

Figure 6B:
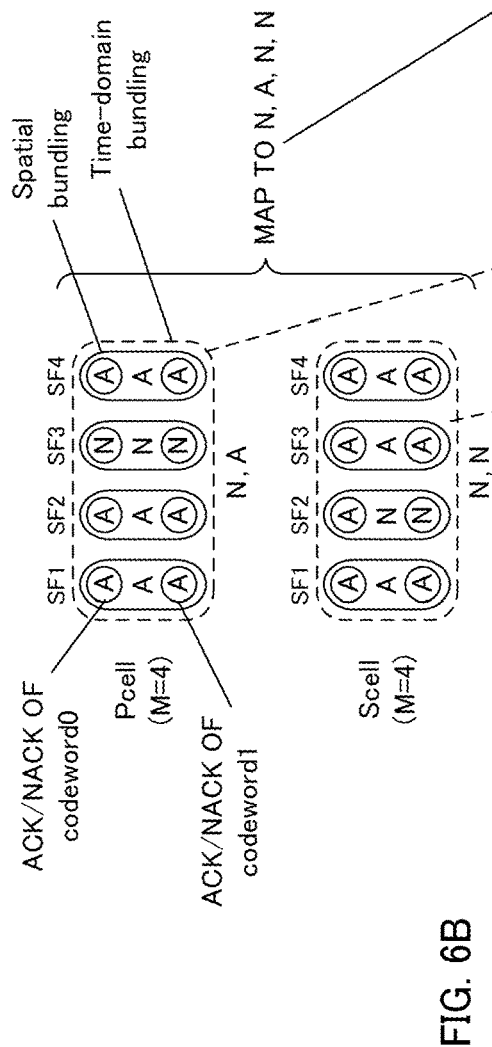
FIGS. 6A and 6B are diagrams provided for describing a bundling method and a mapping method in TDD.
Figure 6A:
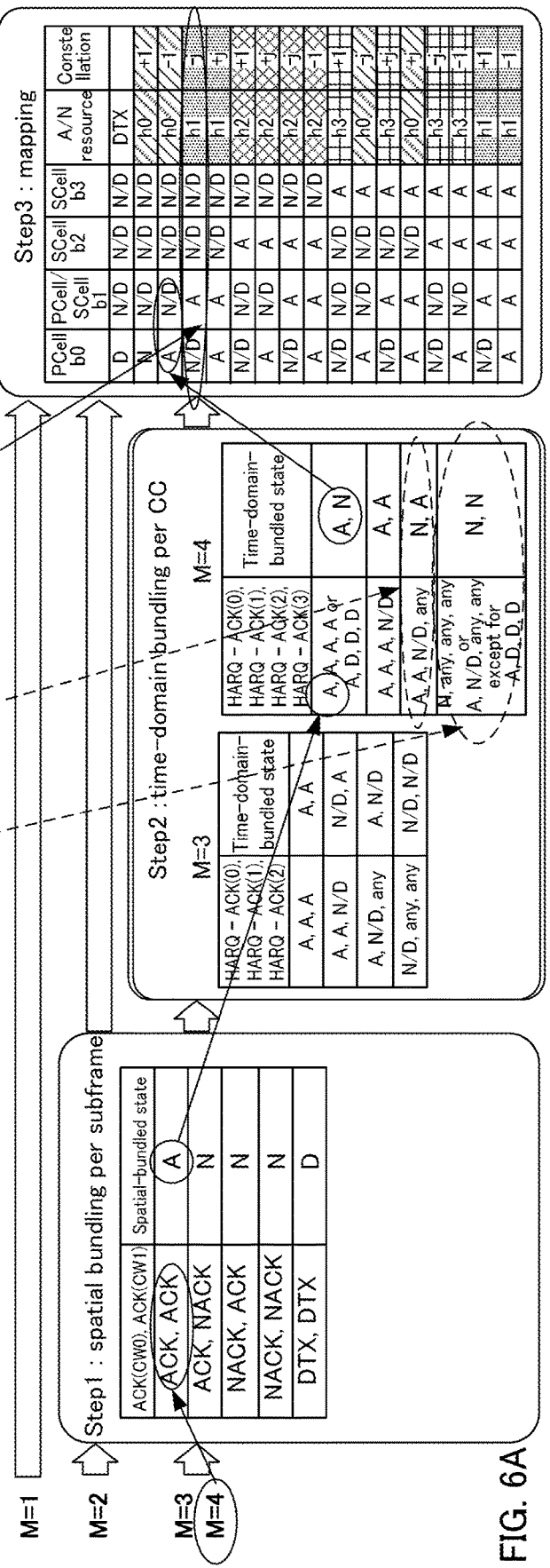

Response signal generating section 212 generates one response signal indicating results of error detection of a plurality of component carriers in each group. For example, response signal generating section 212 may perform spatial bundling and time-domain bundling on error detection result bits of each component carrier in the group to generate one response signal as shown in FIG. 6.

Thus, in FIG. 11, one response signal is generated which reports results of error detection corresponding to the data signals respectively received in the PCell and SCell 1 in group 1. Furthermore, in FIG. 11, one response signal is generated which reports results of error detection corresponding to the data signals respectively received in SCell 2 and SCell 3 in group 2.

Next, control section 208 selects one specific component carrier for one group as a component carrier to report the response signal generated in each group. For example, as group 1 shown in FIG. 11, when a PCell is included in a group, control section 208 may always select the PCell as a specific component carrier to report a response signal. On the other hand, as group 2 shown in FIG. 11, when no PCell is included in a group (when the group is formed of only SCells), control section 208 may select an SCell having a smallest index among SCells in the group as a specific component carrier to report a response signal. That is, in group 2 shown in FIG. 11, SCell 2 is selected as the specific component carrier to report a response signal.

Thus, in FIG. 11, in group 1, the response signals indicating results of error detection corresponding to all component carriers in group 1 are reported in UL subframes of the PCell. Furthermore, in group 2, the response signals indicating results of error detection corresponding to all component carriers in group 2 are reported in UL subframes of SCell 2.

When base station 100 and terminal 200 have different recognition as to which UL-DL configuration belongs to which group, the results of error detection cannot be reported correctly. That is, it is necessary for base station 100 and terminal 200 to have common recognition regarding a group number indicating to which group (group 1 or 2 shown in FIG. 11) component carriers configured for terminal 200 belong. For this reason, base station 100 may previously set group numbers (not shown) for terminal 200.

Thus, response signal generating section 212 of terminal 200 generates one response signal for each group on the basis of information indicating previously set group numbers. On the other hand, retransmission control signal generating section 122 of base station 100 identifies the group (component carrier) whose result of error detection corresponds to the result of coherent detection in A/N determining section 118 on the basis of the information indicating the group numbers previously set in terminal 200 and determines whether or not to retransmit the data (downlink data) transmitted in each component carrier.

As described above, component carriers in which the same UL-DL configuration is set are grouped into one group as shown in FIG. 11. Therefore, timings of UL subframes and timings of DL subframes coincide with each other among the component carriers in a group. Therefore, for example, in group 1, even when, terminal 200 reports results of error detection in SCell 1 shown in FIG. 11 using the PCell, the timing of reporting the results of error detection in SCell 1 is the same as the timing of reporting the results of error detection in the case of one CC (see FIG. 3).

Figure 3:
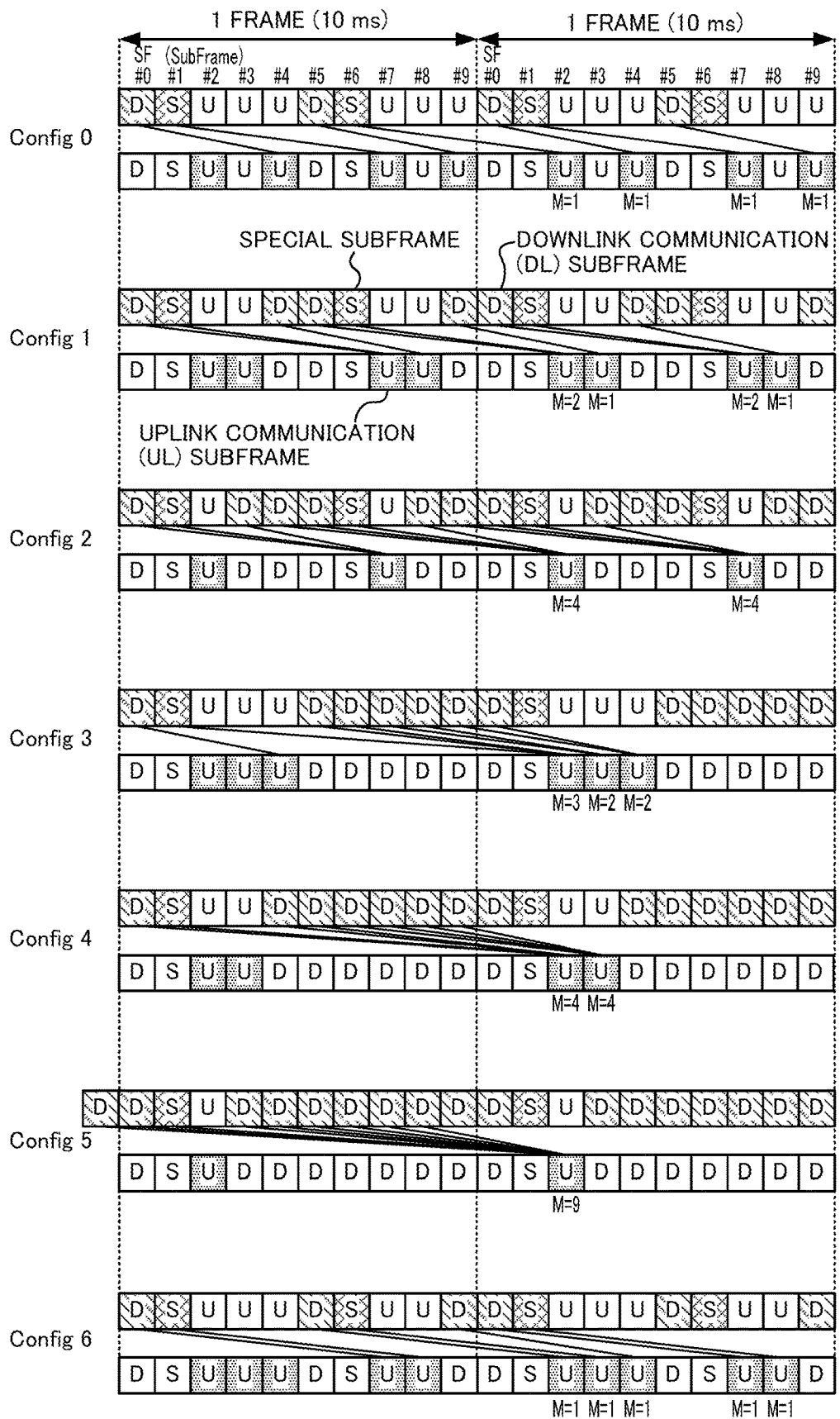
FIG. 3 is a diagram provided for describing a UL-DL configuration in TDD.
Figure 4:
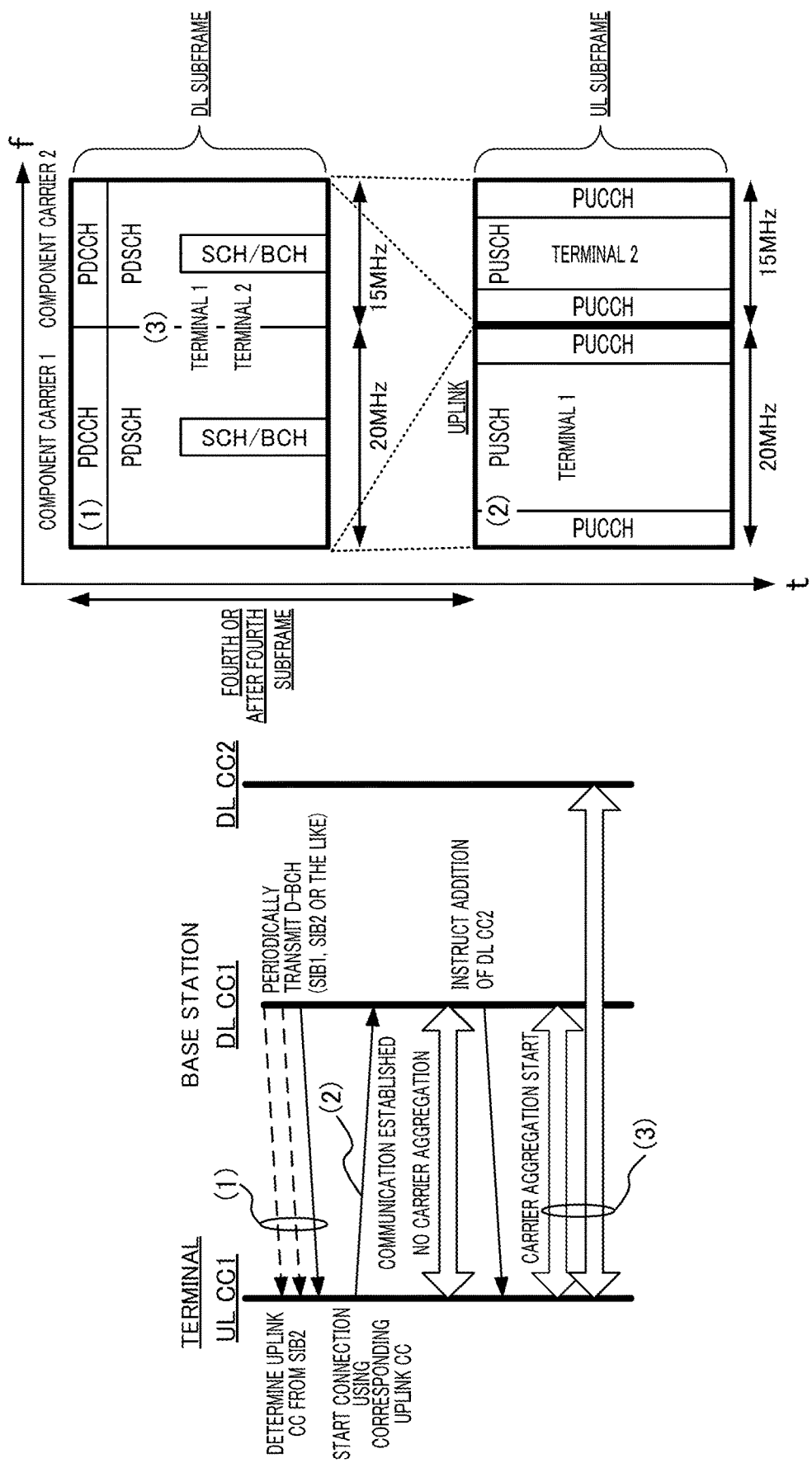
FIGS. 4A and 4B are diagrams provided for describing asymmetric carrier aggregation and a control sequence applied to individual terminals.
Figure 5:
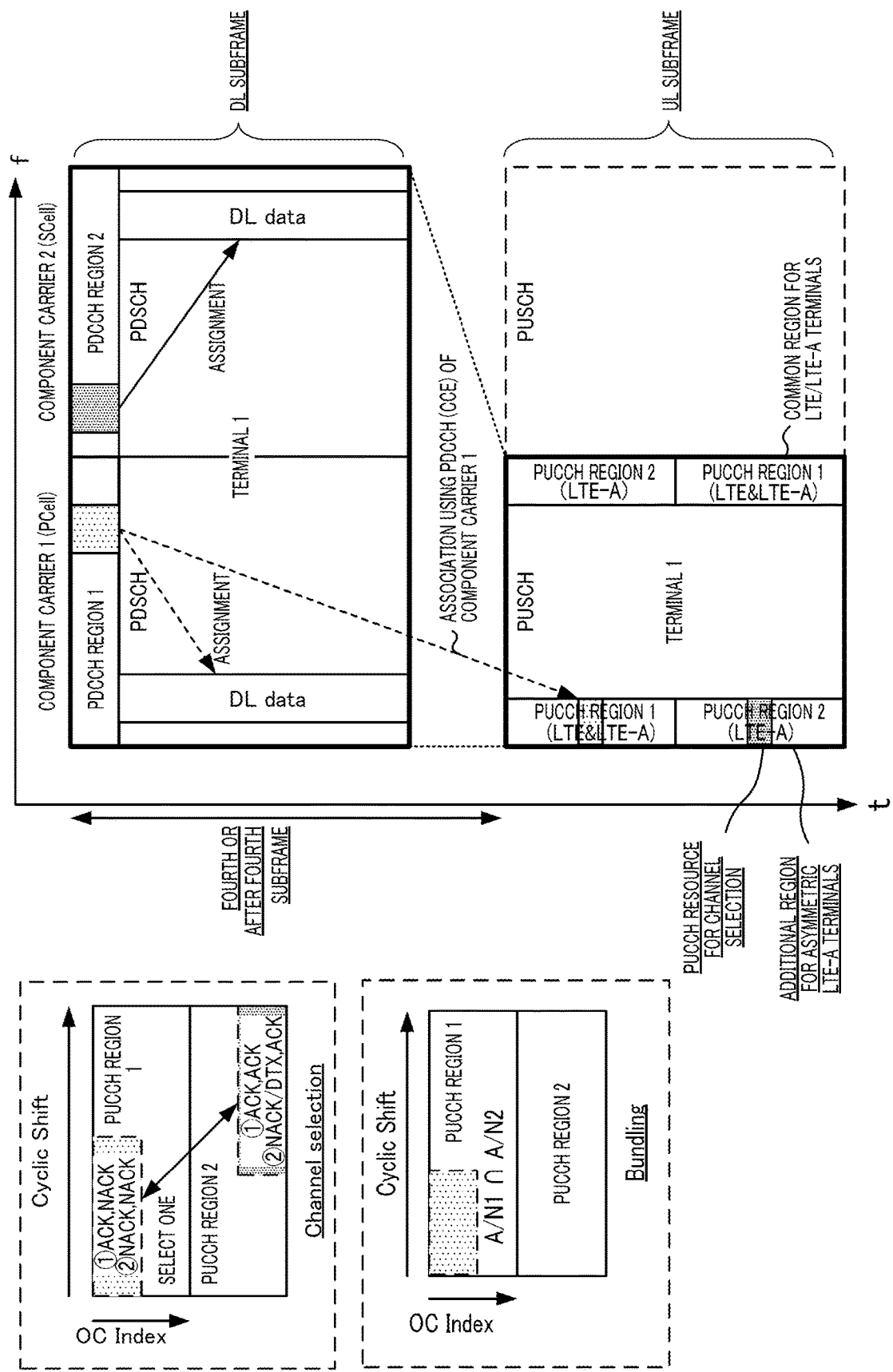
FIG. 5 is a diagram provided for describing channel selection.
Figure 7A:
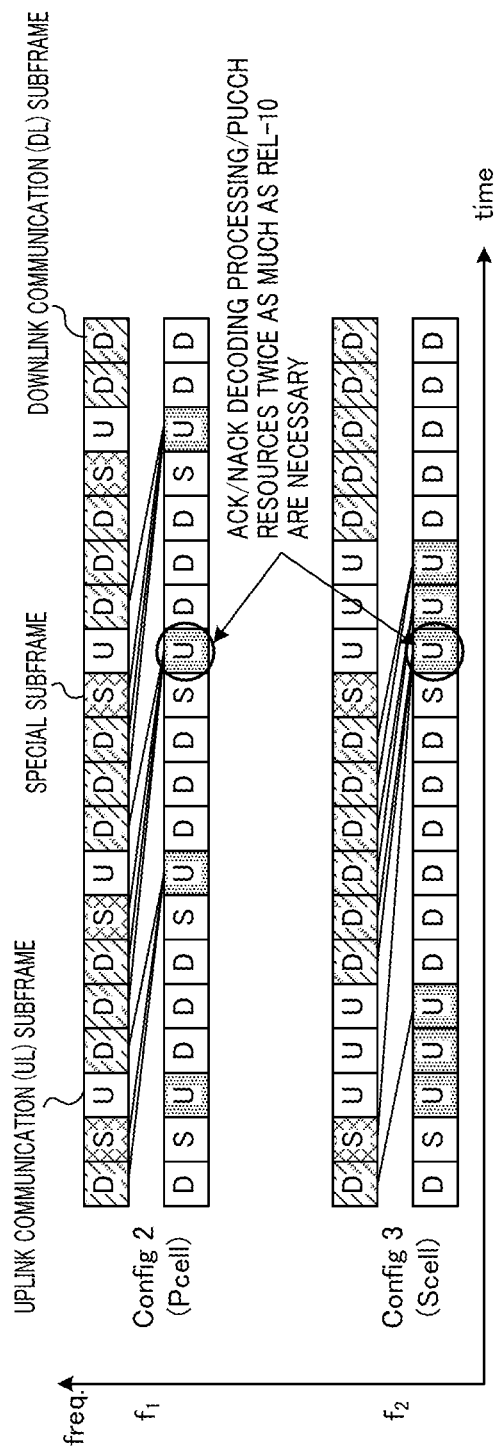
FIGS. 7A and 7B illustrate a method of reporting response signals when a UL-DL configuration varies between component carriers.
Figure 7B:
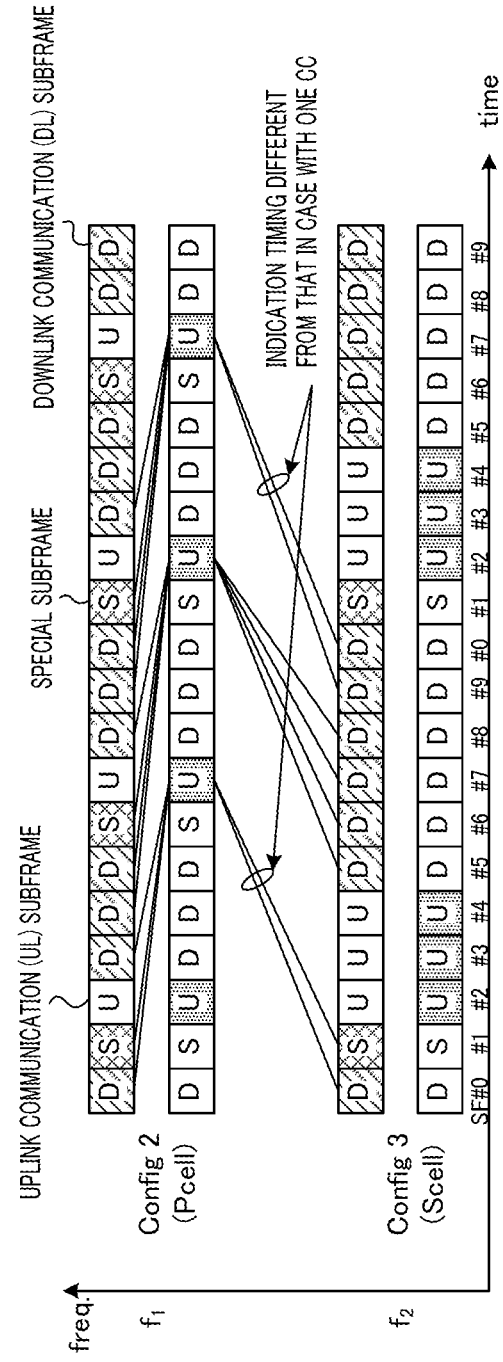

That is, according to the present embodiment, the timing of reporting the results of error detection of each component carrier configured for terminal 200 can always be kept at the same timing as the timing of indication in the case of one CC shown in FIG. 3. That is, as shown in FIG. 7B, it is possible to prevent the timing of reporting the results of error detection from varying depending on the combination of UL-DL configurations set for terminal 200.

Furthermore, according to the present embodiment, a response signal indicating the results of error detection corresponding to the data signal received in each component carrier in the group is indicated by one specific component carrier for each group. For this reason, it is possible to suppress increases in the A/N resource amount and the amount of decoding processing on the results of error detection in base station 100 compared to a case where results of error detection are reported for each component carrier, independently (see FIG. 7A). In FIG. 11, group 1 and group 2 are each formed of two component carriers, so that it is possible to suppress to ½, the A/N resource amount and the amount of decoding processing on the results of error detection in base station 100 compared to a case where results of error detection are reported for each component carrier, independently (see FIG. 7A).

Here, it is assumed that a maximum of five component carriers (5 CCs) can be configured for one terminal 200. That is, there may be a case where five different UL-DL configurations are set respectively for five component carriers (5 CCs) for terminal 200. In this case, the five component carriers set for terminal 200 are grouped into five groups. As described above, terminal 200 reports results of error detection using one component carrier for each group. Therefore, in this case, A/N resources corresponding to a maximum of 5 CCs are necessary for terminal 200. Moreover, base station 100 requires a maximum of 5-parallel (1 group of results of error detection/1 parallel) decoding processing on results of error detection.

However, when actual operation is taken into consideration, even when five component carriers are configured for one terminal 200, there is not much need for increasing the degree of freedom of system settings to an extent that allows for setting of five different UL-DL configurations for component carriers. That is, the realistic number of UL-DL configurations capable of securing an appropriate degree of freedom of system settings may be two to three types. In consideration of this, in the present embodiment, even when a maximum of five component carriers are set for terminal 200, the five component carriers can be grouped into two to three groups. Thus, even when a maximum of five component carriers are configured for terminal 200, only A/N resources corresponding to a maximum of two to three component carriers and 2- to 3-parallel decoding processing on results of error detection in base station 100 are necessary.

As described above, in the present embodiment, when ARQ is applied to communication using an uplink component carrier and a plurality of downlink component carriers associated with the uplink component carrier, and when a UL-DL configuration (ratio between UL subframes and DL subframes) set for each component carrier varies, it is possible to avoid a timing of reporting the results of error detection of the SCell from being changed from a timing of reporting the results of error detection when only a single component carrier is configured, and also to suppress increases in the A/N resource amount used and the amount of decoding processing on the results of error detection in the base station.

Embodiment 2

In the present embodiment, component carriers configured for terminal 200 are grouped with attention focused on inclusion relations of UL subframe timings between UL-DL configurations of respective component carriers set for terminal 200.

Hereinafter, the inclusion relation of UL subframe timings between UL-DL configurations will be described with reference to FIGS. 12A and 12B. Note that Configs 0 to 6 shown in FIGS. 12A and 12B respectively correspond to Configs 0 to 6 shown in FIG. 3. That is, each UL-DL configuration shown in FIGS. 12A and 12B is a configuration pattern of subframes making up one frame (10 msec) and includes DL subframes and UL subframes.

Figure 12A:
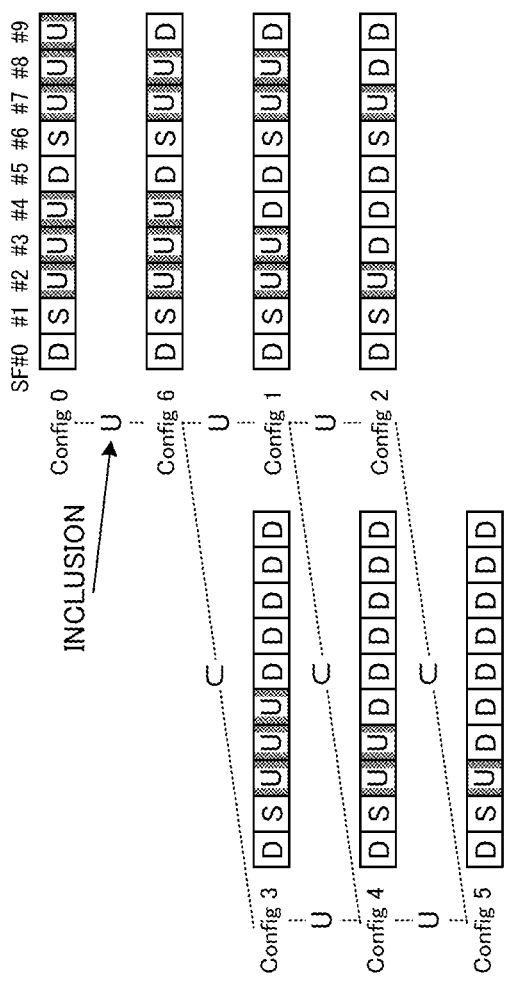
FIGS. 12A and 12B illustrate an inclusion relation between UL-DL configurations according to Embodiment 2 of the present invention.
Figure 12B:
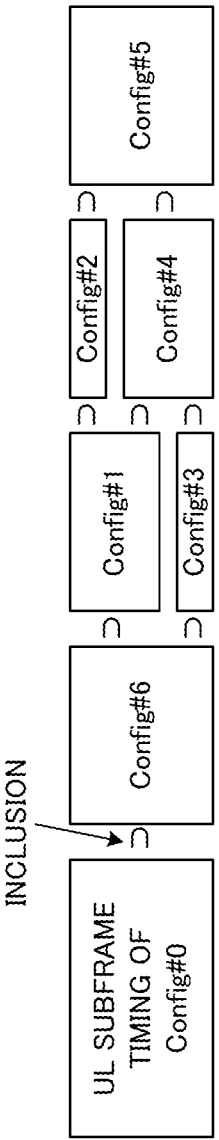

FIG. 12A is a diagram describing an inclusion relation between UL-DL configurations with attention focused on UL subframe timings among timings of DL subframes, UL subframes and special subframes of one frame (10 subframes; subframes #0 to #9). FIG. 12B is a diagram simplifying the description of FIG. 12A and with attention focused only on the inclusion relation.

In FIG. 12A, for example, in Config 0, subframes #2, #3, #4, #7, #8 and #9 correspond to UL subframes, and the proportion of UL subframes in Config 0 is highest in one frame among all UL-DL configurations (Configs 0 to 6).

In FIG. 12A, for example, in Config 6, subframes #2, #3, #4, #7 and #8 correspond to UL subframes.

Here, as shown in FIG. 12A, subframe #2, #3, #4, #7 and #8 correspond to UL subframes in both Config 0 and Config 6. It can also be said that Config 6 is equivalent to Config 0 with subframe #9 assigned as a DL subframe, and Config 0 is equivalent to Config 6 with subframe #9 assigned as a UL subframe.

That is, timings of UL subframes in Config 6 constitute a subset of timings of UL subframes in Config 0. That is, UL subframe timings of Config 6 are included in UL subframe timings of Config 0. Such a relation (inclusion relation) between a set (Config 0) and a subset (Config 6) exists in all two UL-DL configurations except three combinations between Config 1 and Config 3, Config 2 and Config 4 and Config 3 and Config 2 as shown in FIG. 12A and FIG. 12B.

In FIG. 12A and FIG. 12B, among UL-DL configurations having inclusion relations regarding UL subframes, UL-DL configurations having more UL subframes are called "high-order UL-DL configurations" and UL-DL configurations having fewer UL subframes are called "low-order UL-DL configurations." That is, in FIG. 12B, Config 0 is a highest-order UL-DL configuration and Config 5 is a lowest-order UL-DL configuration.

That is, according to FIG. 12A, in a high-order UL-DL configuration, UL subframes are set at least at the same timings as those of UL subframes set in a low-order UL-DL configuration.

Thus, in the present embodiment, among a plurality of component carriers configured for terminal 200, terminal 200 groups component carriers having an inclusion relation among UL subframe timings into one group. In addition, in each group, terminal 200 reports response signals indicating results of error detection of a plurality of component carriers in a group using a component carrier in which a highest-order UL-DL configuration is set in the inclusion relations of UL subframe timings.

Figure 13A:
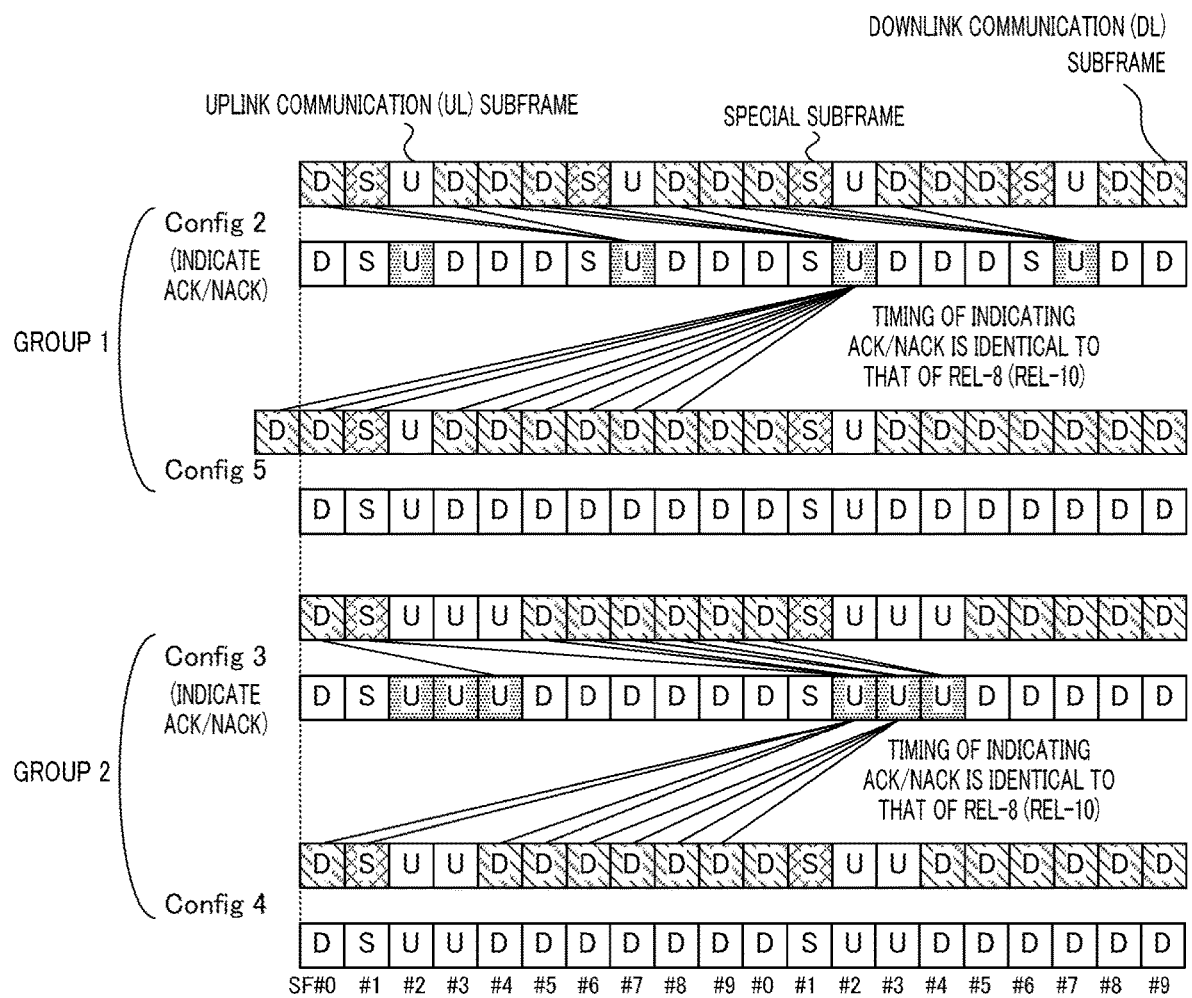
FIGS. 13A and 13B illustrate timing of transmitting response signals according to Embodiment 2 of the present invention.

FIG. 13A illustrates a method of grouping component carriers on the basis of the inclusion relations of UL subframe timings shown in FIGS. 12A and 12B. In FIG. 13A, four component carriers are configured for terminal 200. Moreover, Config 2, Config 5, Config 3 and Config 4 are set respectively for the four component carriers shown in FIG. 13A.

Figure 13B:
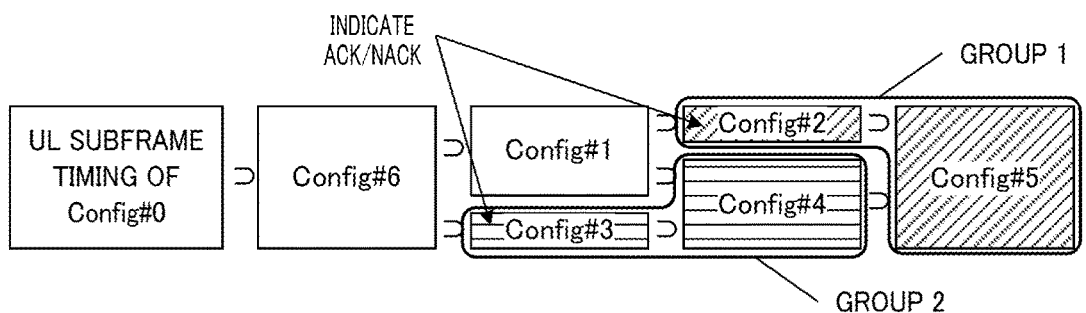

As shown in FIG. 13B, in the inclusion relations of UL subframe timings, Config 2 includes Config 5 and Config 3 includes Config 4. Thus, as shown in FIG. 13A, response signal generating section 212 of terminal 200 groups the component carrier in which Config 2 is set and the component carrier in which Config 5 is set as group 1, and groups the component carrier in which Config 3 is set and the component carrier in which Config 4 is set as group 2.

Next, control section 208 selects a component carrier in which Config 2 including UL subframe timings as the highest-order configuration in group 1 is set as a specific component carrier to report response signals indicating results of error detection of the component carriers in group 1. Similarly, control section 208 selects a component carrier in which Config 3 including UL subframe timings as the highest-order configuration in group 2 is set as a specific component carrier to report response signals indicating results of error detection of the component carriers in group 2. Consequently, in FIG. 13A, results of error detection of all component carriers in group 1 are reported by the component carrier in which Config 2 is set and results of error detection of all component carriers in group 2 are reported by the component carrier in which Config 3 is set.

To be more specific, as shown in FIG. 13A, subframes #2 and #7 in Config 2 correspond to UL subframes and subframe #2 in Config 5 corresponds to a UL subframe. Thus, terminal 200 (control section 208) reports one response signal indicating the results of error detection of the component carrier in which Config 2 is set and the results of error detection of the component carrier in which Config 5 is set using subframe #2 which has the same UL subframe timing as the UL subframe timing of the component carrier in which Config 5 is set in the component carrier in which Config 2 in group 1 shown in FIG. 13A is set. Thus, the results of error detection of the component carrier in which Config 5 is set is reported by the same UL subframe (subframe #2) as that in the case of one CC (see FIG. 3, i.e., 3GPP Release 8 or 10) as shown in FIG. 13A. The same applies to group 2 shown in FIG. 13A.

On the other hand, terminal 200 reports only the results of error detection of the component carrier in which Config 2 is set using subframe #7 (DL subframe in Config 5) of the component carrier in which Config 2 in group 1 shown in FIG. 13A is set.

That is, even when the results of error detection of the component carrier in the same group are transmitted using a specific component carrier, the timing of reporting the results of error detection of each component carrier in the group can be kept at the same timing as that in the case of one CC (see FIG. 3).

In contrast, as shown in FIG. 13B, regarding the inclusion relations of UL subframe timings, there is no inclusion relation between Config 2 and Config 3. That is, Config 2 and Config 3 include UL subframes (subframe #7 of Config 2, subframes #3 and #4 of Config 3) set at least different timings. In FIG. 13A, control section 208 transmits response signals including results of error detection corresponding to data signals received in the component carrier in which Config 3 is set using the component carrier in which Config 3 is set. That is, the results of error detection of the component carrier in which Config 3 having no inclusion relation with Config 2 which is the highest-order UL-DL configuration in group 1 is set are transmitted using component carriers of any group other than group 1 including the component carrier in which Config 2 is set. This makes it possible to keep the timings of reporting the results of error detection of the component carrier in which Config 3 is set to the same timing in the case of one CC (see FIG. 3).

Thus, terminal 200 groups component carriers configured for terminal 200 on the basis of inclusion relations of UL subframe timings. Even when different UL-DL configurations are set for terminal 200, it is thereby possible to maintain the timing of reporting the results of error detection of each component carrier to the same timing as that in the case of one CC (see FIG. 3).

(Number of Groups and PCell Setting Method)

Next, a description will be given of the minimum necessary number of groups in the aforementioned grouping method and the PCell setting method when component carriers (CCs) for terminal 200 are reset (added).

Figure 14A:
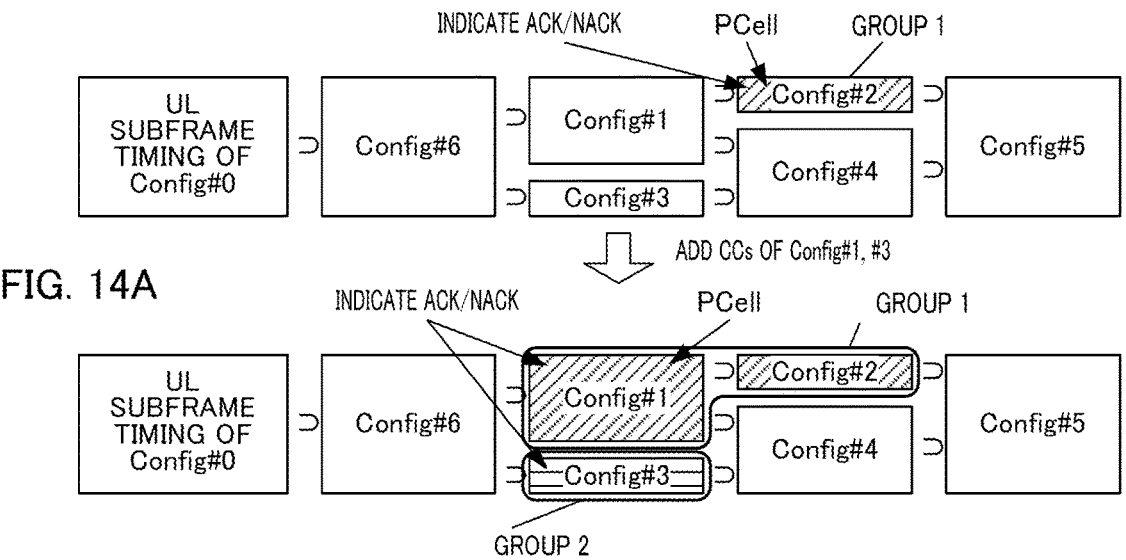
FIGS. 14A to 14C illustrate processes when a component carrier is added to the terminal according to Embodiment 2 of the present invention.
Figure 14B:
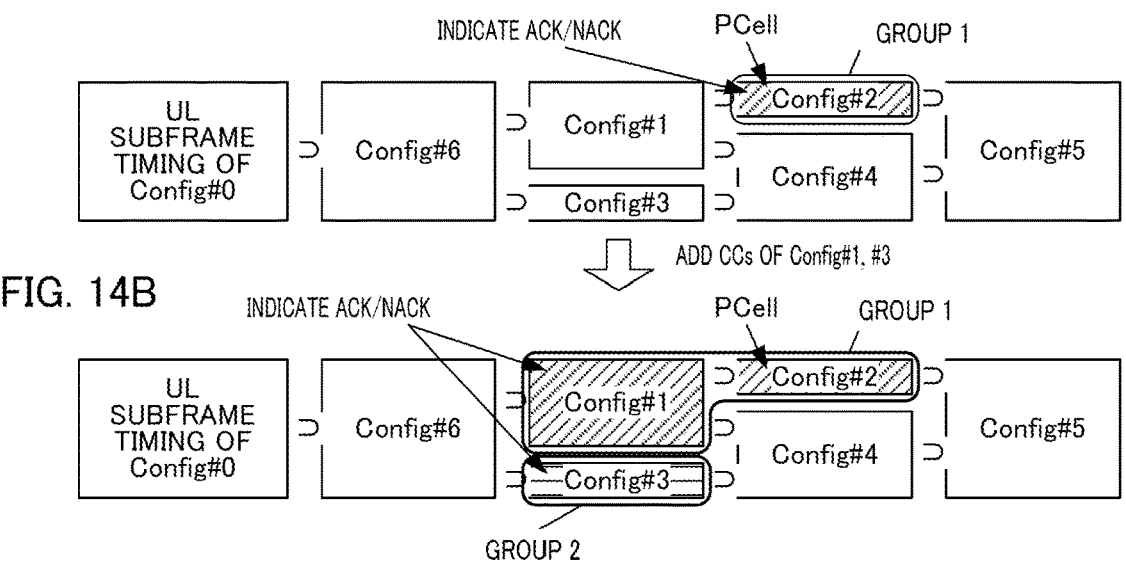
Figure 14C:
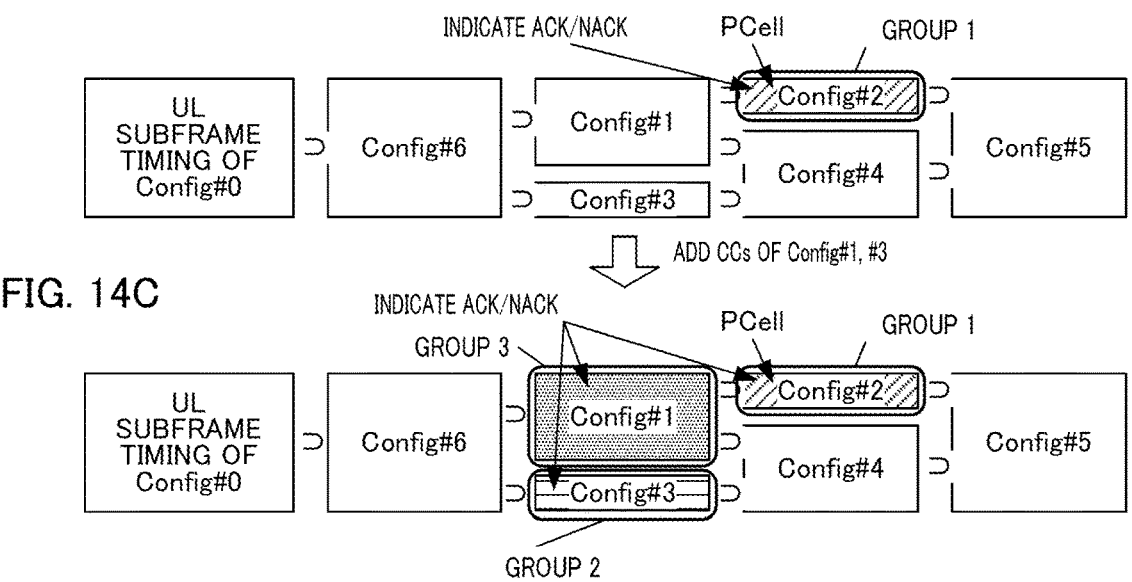

FIGS. 14A to 14C are diagrams provided for describing a case where a PCell is reset when a component carrier (CC) for terminal 200 is newly added (FIG. 14A) and cases where the PCell is not reset (FIGS. 14B and 14C). As to the cases where the PCell is not reset, further details will be given about a case where results of error detection need not always be reported from the PCell (FIG. 14B) and a case where the results of error detection is always reported from the PCell (FIG. 14C).

In FIGS. 14A to 14C, only one component carrier of Config 2 is configured for terminal 200 before resetting component carriers, and the component carrier (that is, PCell) is assumed to be group 1 and the results of error detection are reported from the PCell (upper rows in FIGS. 14A to 14C). In FIGS. 14A to 14C, two component carriers (CCs) of Config 1 and Config 3 are newly added to terminal 200 (lower rows in FIGS. 14A to 14C). Here, Config 1 includes UL subframe timing of Config 2 which is the PCell before the CC is added. On the other hand, Config 3 has no inclusion relation with UL subframe timings of Config 2 which is the PCell before the CC is added.

In FIG. 14A (when the PCell is reset), when two component carriers of Config 1 and Config 3 are added, the component carrier of Config 2 which is the current PCell is no longer the "highest-order component carrier in which a UL-DL configuration including UL subframe timings is set." For this reason, the "component carrier in which the highest UL-DL configuration including UL subframe timings is set" is reset to the PCell. That is, as shown in FIG. 14A, the newly set component carrier of Config 1 is reset to the PCell. In FIG. 14A, the newly set component carrier of Config 3 may also be reset to the PCell.

In FIG. 14A, Config 1 and Config 2 which have an inclusion relation regarding UL subframe timings are grouped as same group 1. The response signals indicating results of error detection corresponding to both component carriers of Config 1 and Config 2 are reported by the highest-order component carrier in group 1 in which Config 1 including UL subframe timings is set. Furthermore, in FIG. 14A, response signals indicating the results of error detection corresponding to the component carrier of Config 3 are reported by the component carrier (group 2) in which Config 3 is set.

In FIG. 14B (the case where the PCell is not reset and the case where the results of error detection need not always be reported from the PCell), when the two component carriers of Config 1 and Config 3 are added, the current PCell is no longer the "highest-order component carrier in which a UL-DL configuration including UL subframe timings is set." However, in FIG. 14B, since results of error detection need not always be reported from the PCell, the component carrier of Config 2 may remain to be set to the PCell. That is, in FIG. 14B, the grouping method and the component carrier whereby response signals in the group are reported are the same as those in FIG. 14A, whereas the component carrier set to the PCell is different from that in FIG. 14A. That is, in group 1 shown in FIG. 14B, the UL-DL configuration (Config 1) for reporting a response signal (results of error detection) may be different from the UL-DL configuration (Config 2) of the component carrier set in the PCell.

FIG. 14C illustrates a case where the PCell is not reset and a case where the results of error detection are always reported from the PCell. In order for the results of error detection to be always reported by the PCell, the PCell needs to be the "highest-order component carrier in which a UL-DL configuration including UL subframe timings is set."

In order for the component carrier of Config 2 which is the current PCell to continue to be the "highest-order component carrier in which a UL-DL configuration including UL subframe timings is set" even when two component carriers of Config 1 and Config 3 shown in FIG. 14C are added, the UL-DL configuration that can belong to the same group needs to be Config 5 (or Config 2). That is, the component carrier that can belong to the same group as that of the PCell needs to be a component carrier in which a UL-DL configuration identical to the UL-DL configuration set in the PCell is set or a component carrier in which a UL-DL configuration set in the PCell is the UL-DL configuration (that is, a lower-order UL-DL configuration) including UL subframe timings.

In contrast, in FIG. 14C, component carriers newly added to terminal 200 are component carriers of Config 1 and Config 3. That is, in FIG. 14C, component carriers newly added to terminal 200 are component carriers in which a high-order UL-DL configuration is set with respect to the PCell (Config 2). For this reason, these component carriers cannot belong to group 1 to which the PCell belongs. Moreover, no inclusion relation of UL subframe timings exists between Config 1 and Config 3. For this reason, these component carriers cannot belong to the same group.

As a result, in FIG. 14C, the component carriers set for terminal 200 are grouped so as to form their respective groups (groups 1 to 3). In each of groups 1 to 3, response signals (results of error detection) are reported by the "highest-order component carrier in which a UL-DL configuration including UL subframe timings is set." That is, the results of error detection are reported by the component carrier (PCell) of Config 2 in group 1 shown in FIG. 14C, the results of error detection are reported by the component carrier of Config 3 in group 2 and the results of error detection are reported by the component carrier of Config 1 in group 3.

The following is the minimum necessary number of groups to support all combinations of UL-DL configurations when component carriers are grouped on the basis of inclusion relations of UL subframe timings, and the results of error detection are reported using the highest-order component carrier in which a UL-DL configuration including UL subframe timings is set for each group. That is, as shown in FIG. 14A, when the PCell is reset as the "highest-order component carrier in which a UL-DL configuration including UL subframe timings is set," the minimum necessary number of groups is two. Furthermore, as shown in FIG. 14B, in the case where the PCell is not reset and in the case where results of error detection need not always be reported from the PCell, the minimum necessary number of groups is two. Furthermore, as shown in FIG. 14C, in the case where the PCell is not reset and in the case where results of error detection are always reported from the PCell, the minimum necessary number of groups is three.

In other words, in the present embodiment, Configs 0 to 6 are grouped into a maximum of two or three groups in accordance with the method of reporting response signals (results of error detection).

The grouping method and the method of reporting results of error detection when the PCell is reset and when the PCell is not reset have been described in detail with reference to FIG. 14. It is also possible to implement a setting that makes it possible to select whether or not to reset the PCell or to select whether or not to always report results of error detection from the PCell in the case where the PCell is not reset.

(Signaling Method)

Next, the method of indicating a group of component carriers configured for terminal 200 (signaling method) will be described.

When component carriers are grouped, the groups are referred to as group 1 and group 2 in FIGS. 13A and 13B and FIGS. 14A to 14C. However, as in the case of Embodiment 1, unless base station 100 and terminal 200 share the same recognition as to which UL-DL configuration belongs to which group, results of error detection cannot be reported correctly. That is, it is necessary for base station 100 and terminal 200 to have common recognition regarding a group number indicating to which group a component carrier configured for terminal 200 belongs. For this reason, base station 100 needs to previously set group numbers for terminal 200.

Thus, the group number setting method and the signaling method will be described in detail with reference to FIGS. 15A and 15B and FIG. 16. Hereinafter, each one of group number setting methods 1 to 4 will be described.

<Setting Method 1>

Setting method 1 is a method whereby group numbers are set respectively for the UL-DL configurations. That is, according to setting method 1, a group number is set for each UL-DL configuration and 1 bit per UL-DL configuration is indicated (1 bit/1 Config).

An example of setting method 1 is a method as shown in FIG. 15A whereby 1 bit (maximum number of groups is two) or 2 bits (maximum number of groups is three or four) per UL-DL configuration is indicated (method 1-1). In FIG. 15A, group number '1' is indicated for Configs 0 to 2, 5 and 6 and group number '2' is indicated for Configs 3 and 4.

On the other hand, another example of setting method 1 is a method as shown in FIG. 15B whereby a plurality of correspondence tables are provided in which UL-DL configurations and group numbers are previously set and a number indicating which correspondence table should be used (correspondence table number) is indicated (methods 1 and 2).

Furthermore, a further example of setting method 1 is a method whereby group numbers are fixedly set for the respective UL-DL configurations (methods 1 to 3). In this case, signaling for indicating group numbers from base station 100 to terminal 200 is unnecessary.

In setting method 1, since group numbers are set for the respective UL-DL configurations, the same UL-DL configuration cannot be set among different groups.

<Setting Method 2>

Setting method 2 is a method whereby a group number is set for each component carrier configured for terminal 200. That is, in setting method 2, a group number is set for each component carrier and 1 bit per component carrier is indicated (1 bit/1 CC).

Figure 16:
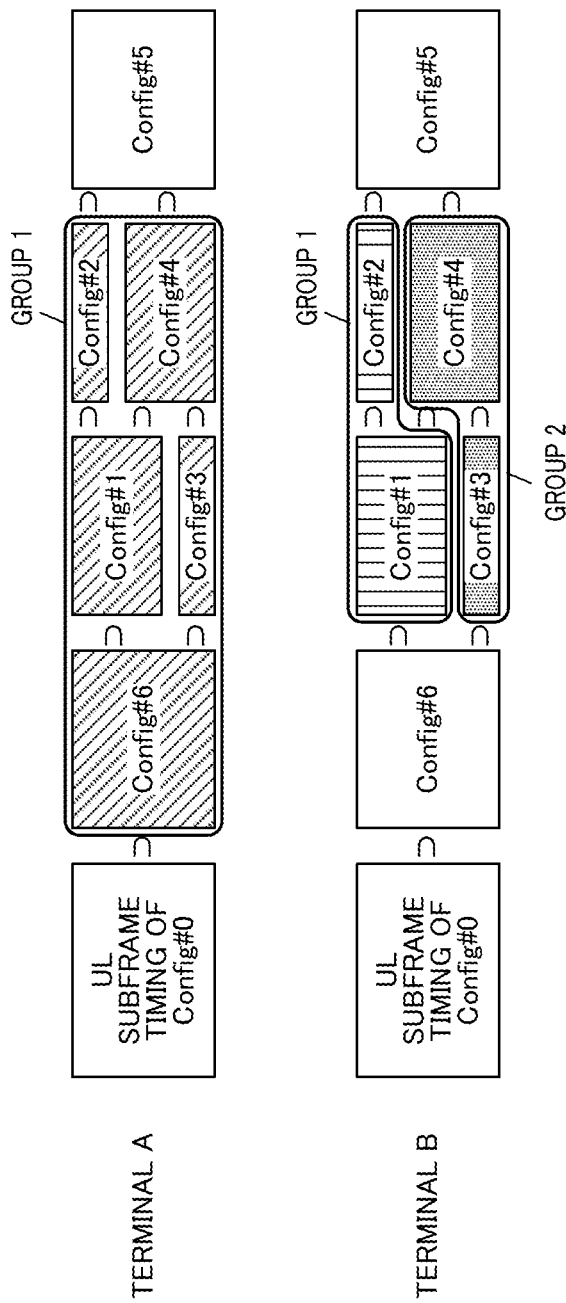
FIG. 16 illustrates a group number signaling method according to Embodiment 2 of the present invention (setting method 2)

For example, as shown in FIG. 16, terminal A groups component carriers in which Configs 1, 2, 3, 4 and 6 are set into one group. That is, group number '1' is set for each of the component carriers in which Configs 1, 2, 3, 4 and 6 are set. Furthermore, as shown in FIG. 16, terminal B groups component carriers in which Configs 1 and 2 are set as group 1 and groups component carriers in which Config 3 and 4 are set as group 2. That is, group number '1' is set for the component carriers in which Configs 1 and 2 are set and group number '2' is set for the component carriers in which Configs 3 and 4 are set.

That is, since base station 100 needs to indicate group numbers set for the component carriers to each terminal 200, the number of bits for signaling increases compared to setting method 1. However, there is no setting limitation illustrated in setting method 1. That is, setting method 2 allows the same UL-DL configuration to be set even among different groups. That is, the same UL-DL configuration can belong to group 1 or belong to group 2 depending on the terminal.

Setting method 2 can further be subdivided into a method (method 2-1) whereby a group number is set for each component carrier configured for terminal 200 and a method (method 2-2) whereby a component carrier for reporting results of error detection is set for each terminal 200. In method 2-2, only a component carrier for reporting results of error detection is indicated to terminal 200. Thus, it is necessary to previously set whether to determine fixedly or changeably by a setting, between base station 100 and terminal 200, which component carrier belongs to the same group as the component carrier to be indicated.

<Setting Method 3>

Setting method 3 is a method of indicating only switching between ON/OFF (whether or not to perform grouping) for each terminal 200. That is, in setting method 3, only 1 bit is indicated. Between base station 100 and terminal 200, setting method 3 may be singly set or setting method 3 may be set in combination with method 1 or setting method 2.

<Setting Method 4>

Setting method 4 is a method whereby only one group is always set for each terminal 200. In setting method 4, such a limitation is provided that a UL-DL configuration that cannot be included in a component carrier of the highest-order UL-DL configuration including UL subframe timings should not be set.

Group number setting methods 1 to 4 have been described so far.

In this way, in the present embodiment, response signal generating section 212 in terminal 200 groups the first component carrier and the second component carrier. Here, in the UL-DL configuration set in the first component carrier, UL subframes are set at the same timings as those of UL subframes of the UL-DL configuration set in at least the above second component carrier. Control section 208 transmits a response signal including results of error detection corresponding to data signals respectively received in the first component carrier and the second component carrier using the first component carrier. To be more specific, control section 208 transmits the above-described one response signal using a UL subframe in the first component carrier which has the same timing as that of UL subframe of the UL-DL configuration set in the second component carrier.

Even when terminal 200 reports results of error detection of all component carriers in a group using a specific component carrier in the group (component carrier in which the highest-order UL-DL configuration in the group including UL subframe timings is set), it is thereby possible to maintain the timing of reporting results of error detection of other component carriers to be the same as the timing of reporting the results of error detection in the case of one CC. That is, the present embodiment can prevent, as shown in FIG. 7B, the timing of reporting the results of error detection from varying depending on the combination of UL-DL configurations set for terminal 200.

Furthermore, according to the present embodiment, Configs 0 to 6 are grouped into a maximum of two or three groups as shown in FIGS. 14A to 14C. That is, it is possible to suppress the A/N resource amount and the amount of decoding processing on results of error detection in base station 100 to a maximum of two- or three-fold increase irrespective of the number of component carriers configured for terminal 200 compared to the case where results of error detection are reported independently for each component carrier (see FIG. 7A).

By so doing, when ARQ is applied to communication using an uplink component carrier and a plurality of downlink component carriers associated with the uplink component carrier and when a UL-DL configuration (ratio between UL subframes and DL subframes) to be set varies for each component carrier, the present embodiment can prevent the timing of reporting the results of error detection of the SCell from changing from the timing of reporting the results of error detection when only a single component carrier is set and suppress increases in the A/N resource amount used and the amount of decoding processing on results of error detection in the base station.

In the present embodiment, it is possible to employ a method that deactivates all component carriers of a group upon deactivation of a component carrier for reporting results of error detection in the group. Alternatively, it is possible to employ a method that does not allow for deactivation (that is, preventing deactivation) of the component carrier for reporting results of error detection in each group.

Furthermore, in the present embodiment, the maximum number of groups corresponding to component carriers configured for terminal 200 may be set for each terminal 200. For example, the maximum number of groups may be set to one for a low-end terminal and the maximum number of groups may be set to two for a high-end terminal. Moreover, an upper limit value of the number of groups is equal to the number of configured component carriers. Adopting the number of groups greater than the minimum necessary number of groups to support all the aforementioned combinations of UL-DL configurations causes the number of bits of results of error detection reported per component carrier to increase, and thus can prevent the estimation accuracy of results of error detection in the base station from decreasing.

Furthermore, in the present embodiment, the method of grouping component carriers is not limited to the example shown in FIGS. 13A and 13B. For example, in the UL-DL configuration shown in FIG. 12B, Config 3, Config 4 and Config 5 may be grouped as group 1, and only Config 2 may be grouped as group 2.

In FIG. 12B, when a higher-order UL-DL configuration including UL subframe timings (e.g., Config 1, Config 6 or Config 0) is set in component carriers in common to Config 2 and Config 4 which have no inclusion relation, the UL-DL configuration, Config 2 and Config 4 may be grouped as the same group.

Furthermore, in the UL-DL configuration shown in FIG. 12B, Config 3 and Config 5 may be grouped as group 1, Config 2 may be grouped as group 2 and Config 4 may be grouped as group 3. That is, as the inclusion relation shown in FIG. 12B, not mutually neighboring UL-DL configurations (e.g., Config 3 and Config 5) may also be grouped as the same group.

That is, terminal 200 may perform grouping so as to prevent groups from being formed only of combinations of UL-DL configurations mutually having no inclusion relation among UL subframe timings (in FIG. 12B, Config 1 and Config 3, Config 2 and Config 3, and Config 2 and Config 4). Alternatively, terminal 200 may also perform grouping so as to prevent groups from being formed of combinations of UL-DL configurations mutually having no inclusion relation among UL subframe timings and lower UL-DL configurations including UL subframe timings than the UL-DL configurations making up the combinations (in FIG. 12B, Config 2, Config 4 or Config 5 for the combination of Config 1 and Config 3, Config 4 or Config 5 for the combination of Config 2 and Config 3, and Config 5 for the combination of Config 2 and Config 4).

In short, terminal 200 can group a combination of UL-DL configurations mutually having no inclusion relation among UL subframe timings only into a group to which a higher-order UL-DL configuration including both of the two UL-DL configurations making up the combination belongs (in FIG. 12B, Config 0 or Config 6 for the combination of Config 1 and Config 3, Config 0 or Config 6 for the combination of Config 2 and Config 3, Config 0, Config 6 or Config 1 for the combination of Config 2 and Config 4).

Moreover, there can also be a case where there are a plurality of component carriers in which a highest-order UL-DL configuration including UL subframe timings is set in the same group. That is, there can also be a case where there are a plurality of component carriers in which the same highest-order UL-DL configuration including UL subframe timings is set. In this case, when one of the component carriers in which the same UL-DL configuration is set is a PCell in the group, the PCell may be configured as the component carrier for reporting results of error detection. On the other hand, when there is no PCell in the group (when the group is only formed of SCells), an SCell having a smaller SCell index may be configured as the component carrier for reporting results of error detection. However, even in the case of a group to which a PCell belongs, results of error detection need not always be reported from the PCell. The component carrier for reporting results of error detection is a "component carrier in which a highest-order UL-DL configuration including UL subframe timings is set" in each group. When the PCell is not a "component carrier in which a highest-order UL-DL configuration including UL subframe timings is set," the PCell may be reconfigured as a "component carrier in which a highest-order UL-DL configuration including UL subframe timings is set."

(Guideline for Grouping)

As described above, the method of grouping component carriers is not limited to one method. For example, in FIG. 13, Config 3, Config 4 and Config 5 may be grouped as group 1 and only Config 2 may be grouped as group 2. Thus, a guideline for determining the grouping method will be described, hereinafter.

An example of a guideline for grouping is a method whereby grouping is performed in such a way that the number of bits of results of error detection becomes uniform among groups. Another guideline for grouping is a method whereby grouping is performed in such a way that the number of component carriers becomes uniform among groups. A further guideline for grouping is a method whereby grouping is performed in such a way that the number of bits of results of error detection becomes uniform among groups with also MIMO and non-MIMO configurations taken into consideration. These guidelines allow energy per bit of results of error detection to be smoothed.

Furthermore, there is a method whereby grouping is performed so as to avoid grouping of UL-DL configurations of 10-msec cycle (e.g., Config 3, 4 and 5) or UL-DL configurations having a high DL subframe ratio. This method can prevent the number of bits of results of error detection to be reported per group from increasing.

Furthermore, grouping may also be adopted so that the number of component carriers per group is two or fewer. This method allows channel selection which is a method of reporting results of error detection that supports only indication of results of error detection for a maximum of two component carriers to be applied to each group. Note that it may also be possible to adopt different methods of reporting results of error detection among groups (channel selection or DFT-S-OFDM). Whether to use channel selection or DFT-S-OFDM may be configurable for each group. Furthermore, the method of reporting results of error detection may be changeable in the group for every subframe on the basis of, for example, the number of bits of results of error detection before bundling and the number of component carriers to which downlink data associated with the results of error detection to be reported is assigned. For example, in FIG. 13, in group 1, component carriers to which downlink data associated with results of error detection to be reported is assigned are both component carriers of Configs 2 and 5 in subframe #2 and only the component carrier of Config 2 in subframe #7. Thus, in group 1 shown in FIG. 13, the method of reporting results of error detection may be changeable between subframe #2 and subframe #7.

Embodiment 3

In LTE-Advanced, cross-carrier scheduling may be applied in which a PDCCH of a PCell indicates a PDSCH of a component carrier (SCell) other than the PCell. That is, in cross-carrier scheduling, the PCell is a "cross-carrier scheduling source (controlling side)" and the SCell is a "cross-carrier scheduling destination (controlled side)."

When UL-DL configurations differ among a plurality of component carriers, cross-carrier scheduling can be performed under the following conditions. That is, when a component carrier of a cross-carrier scheduling destination is a DL subframe or a special subframe, a component carrier of a cross-carrier scheduling source is a DL subframe or special subframe. That is, when a region (PDSCH) for indicating downlink data exists in a component carrier of the cross-carrier scheduling destination, there needs to be a region (PDCCH) for indicating a downlink control signal so as to indicate the downlink data in the component carrier of the cross-carrier scheduling source.

On the other hand, when the component carrier of the cross-carrier scheduling destination is a UL subframe, there is no need to indicate a PDSCH for the component carrier of the cross-carrier scheduling destination. Therefore, the component carrier of the cross-carrier scheduling source may be any one of a UL subframe, DL subframe and special subframe.

FIGS. 17A and 17B illustrate an example of a case where cross-carrier scheduling is performed. FIG. 17A is an example of a case where intra-group cross-carrier scheduling is performed. FIG. 17B is an example of a case where inter-group cross-carrier scheduling is performed.

FIG. 17A illustrates a case where cross-carrier scheduling is performed from a component carrier (PCell) in which Config 3 is set to a component carrier in which Config 4 is set. As shown in FIG. 17A, when subframes in both component carriers become DL subframes, cross-carrier scheduling can be performed since there can be a PDCCH which is a cross-carrier scheduling source and a PDSCH which is a cross-carrier scheduling destination. On the other hand, in subframe #4 shown in FIG. 17A, a subframe in the component carrier (Config 3) which is a cross-carrier scheduling source becomes a UL subframe and a subframe in the component carrier (Config 4) which is a cross-carrier scheduling destination becomes a DL subframe. Therefore, there can be a PDSCH in the cross-carrier scheduling destination, but a PDCCH in the cross-carrier scheduling source cannot be assigned and it is impossible to perform cross-carrier scheduling.

On the other hand, FIG. 17B illustrates a case where a component carrier in which Config 3 is set and a component carrier in which Config 4 is set exist in group 1, and a component carrier in which Config 2 is set and a component carrier in which Config 5 is set exist in group 2. As shown in FIG. 17B, subframes #3 and #4 of a component carrier (Config 3) in group 1 which is a cross-carrier scheduling source become UL subframes, and those in component carriers (Configs 2 and 5) in group 2 which are cross-carrier scheduling destinations become DL subframes. Therefore, although there can be a PDSCH in the cross-carrier scheduling destination, since a PDCCH which becomes a cross-carrier scheduling source cannot be assigned, cross-carrier scheduling cannot be performed.

In the present embodiment, component carriers configured for terminal 200 are grouped with attention focused on inclusion relations of DL subframe timings among UL-DL configurations when performing cross-carrier scheduling.

Hereinafter, the inclusion relations of DL subframe timings among UL-DL configurations will be described with reference to FIGS. 18A and 18B. Note that Configs 0 to 6 shown in FIGS. 18A and 18B respectively correspond to Configs 0 to 6 shown in FIG. 3.

Figure 18A:
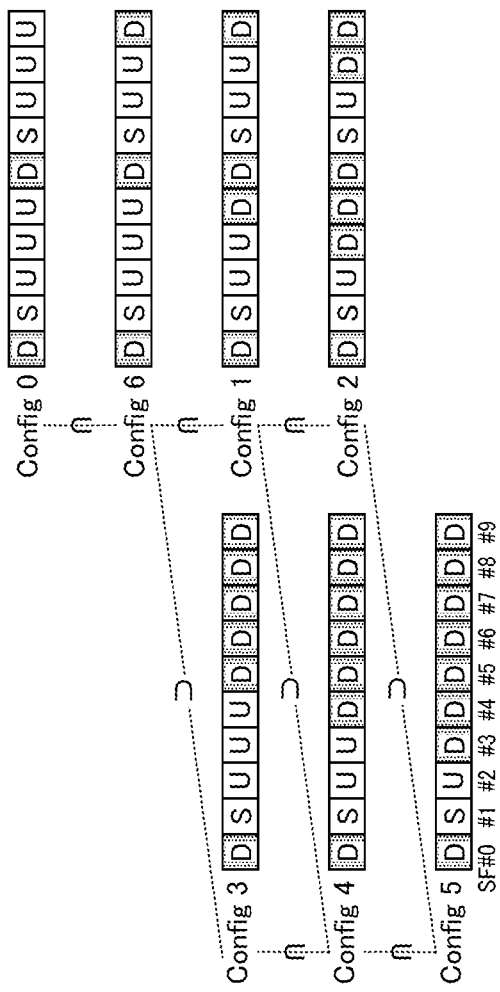
FIGS. 18A and 18B illustrate an inclusion relation between UL-DL configurations according to Embodiment 3 of the present invention.

FIG. 18A is provided for describing inclusion relations among UL-DL configurations with attention focused on DL subframe timings among timings of DL subframes, UL subframes and special subframes corresponding to one frame (10 subframes; subframes #0 to #9). FIG. 18B is provided for describing FIG. 18A with attention focused only on the inclusion relations, by simplifying the illustration of FIG. 18A.

In FIG. 18A, for example, subframes #0, and #3 to #9 in Config 5 become DL subframes, and the proportion of DL subframes per frame in Config 5 is highest among all UL-DL configurations (Configs 0 to 6).

In FIG. 18A, for example, subframes #0, and #4 to #9 in Config 4 become DL subframes.

Here, as shown in FIG. 18A, subframes #0, and #4 to #9 are DL subframes in both Config 5 and Config 4. Furthermore, it can also be said that Config 4 is equivalent to Config 5 with subframe #3 replaced by a UL subframe or Config 5 is equivalent to Config 4 with subframe #3 replaced by a DL subframe.

That is, DL subframe timings in Config 4 are a subset of DL subframe timings in Config 5. That is, the DL subframe timings in Config 4 are included in the DL subframe timings in Config 5. Such a relation (inclusion relation) between a set (Config 5) and a subset (Config 4) exists between all two UL-DL configurations except three combinations of Config 1 and Config 3, Config 2 and Config 4, and Config 3 and Config 2 as shown in FIG. 18A and FIG. 18B.

Figure 18B:
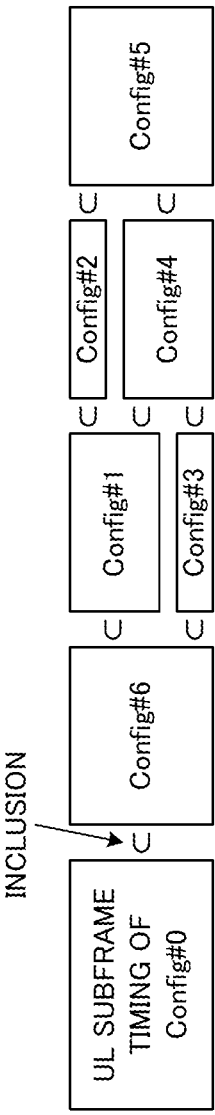

Note that in FIG. 18A and FIG. 18B, among UL-DL configurations having inclusion relations regarding DL subframes, a UL-DL configuration having more DL subframes is called "high-order UL-DL configuration" and a UL-DL configuration having fewer DL subframes is called "low-order UL-DL configuration." That is, in FIG. 18B, Config 5 is the highest-order UL-DL configuration and Config 0 is the lowest-order UL-DL configuration. That is, the inclusion relations of DL subframe timings shown in FIG. 18A and FIG. 18B are diametrically opposite to the inclusion relations of UL subframe timings shown in FIG. 12A and FIG. 12B.

According to FIG. 18A, in a high-order UL-DL configuration, a DL subframe is set at least at the same timing as that of a DL subframe set in a low-order UL-DL configuration. That is, a UL subframe is never set in a high-order UL-DL configuration at the same timing as that of a DL subframe set in a low-order UL-DL configuration.

Thus, the present embodiment gives a condition that a component carrier which becomes a cross-carrier scheduling source in a group (intra-group) is a component carrier in which a "highest-order" UL-DL configuration including "DL" subframe timings in each group is set. In other words, a component carrier which becomes a cross-carrier scheduling source in a group (intra-group) can also be expressed in each group as a component carrier in which a "lowest-order" UL-DL configuration including "UL" subframe timings is set.

On the other hand, the present embodiment gives a condition that a component carrier which becomes a cross-carrier scheduling source among groups (inter-group) is a component carrier in which a highest-order UL-DL configuration including DL subframe timings in all groups is set.

Figures 19A, 19B, 19C:
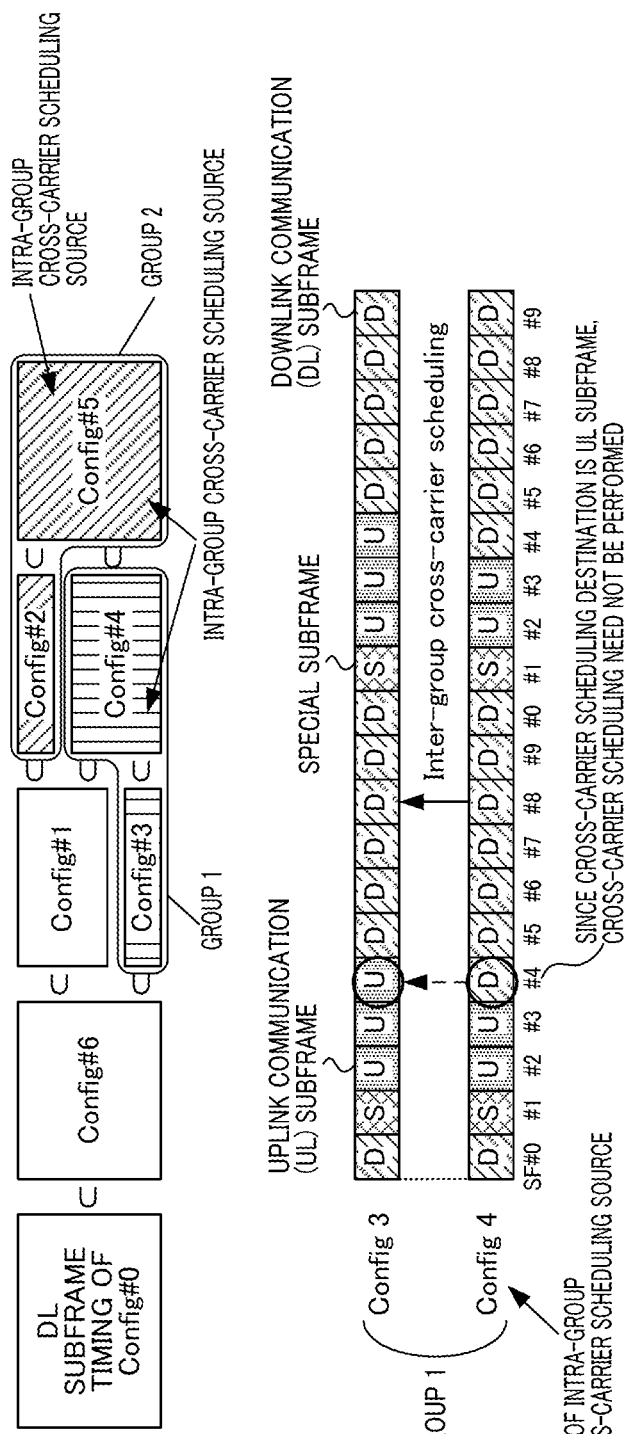
FIGS. 19A to 19C illustrate a method of grouping component carriers according to Embodiment 3 of the present invention.

FIGS. 19A to 19C illustrate a more specific example of a cross-carrier scheduling method in the case where grouping focused on the inclusion relations shown in FIGS. 18A and 18B is performed.

In FIG. 19A, grouping is performed in such a way that component carriers in which Configs 3 and 4 are respectively set are grouped as group 1 and component carriers in which Configs 2 and 5 are respectively set are grouped as group 2. FIG. 19B illustrates (intra-group) cross-carrier scheduling in group 1 and FIG. 19C illustrates (inter-group) cross-carrier scheduling between groups.

As shown in FIG. 19A, in inclusion relations of DL subframe timings among UL-DL configurations, Config 4 is a higher-order UL-DL configuration than Config 3. Thus, in FIG. 19B, the component carrier in which Config 4 is set becomes a cross-carrier scheduling source and the component carrier in which Config 3 is set becomes a cross-carrier scheduling destination. In this way, as shown in FIG. 19B, at the same timing as that of a DL subframe set in the component carrier of the cross-carrier scheduling destination (subframe in which a PDSCH exists), even the cross-carrier scheduling source always becomes the DL subframe (subframe in which a PDCCH exists). Furthermore, as shown in FIG. 19B, in subframe #4, since the component carrier (Config 3) of the cross-carrier scheduling destination is a UL subframe, cross-carrier scheduling need not be performed.

Similarly, as shown in FIG. 19A, in the inclusion relations of DL subframe timings among UL-DL configurations, Config 5 is a higher-order UL-DL configuration than Configs 2 to 4. Thus, in FIG. 19C, the component carrier in which Config 5 is set becomes a cross-carrier scheduling source and the component carriers in which Configs 2 to 4 are set become cross-carrier scheduling destinations. Thus, as shown in FIG. 19C, just like FIG. 19B, at the same timing as that of a DL subframe set in the component carrier of the cross-carrier scheduling destination (subframe in which a PDSCH exists), even the cross-carrier scheduling source always becomes a DL subframe (subframe in which a PDCCH exists). Furthermore, as shown in FIG. 19C, just like FIG. 19B, since the component carrier of the cross-carrier scheduling destination (Config 3 or 4) is a UL subframe in subframe #3 and subframe #4, cross-carrier scheduling need not be performed.

That is, according to the present embodiment, as shown in FIG. 19B and FIG. 19C, there is no such subframe on which cross-carrier scheduling cannot be performed as shown in FIG. 17B. That is, cross-carrier scheduling can be performed on any subframes shown in FIG. 19B and FIG. 19C.

Furthermore, according to the present embodiment, in the inclusion relations of DL subframe timings among UL-DL configurations, a component carrier in which a high-order UL-DL configuration is set is configured as a cross-carrier scheduling source. In other words, a component carrier in which a UL-DL configuration having a higher proportion of DL subframes is set is configured as a cross-carrier scheduling source. Thus, during cross-carrier scheduling, the possibility of a PDCCH becoming insufficient decreases even when a PDCCH indicating a PDSCH of another component carrier is assigned in the component carrier.

(Signaling Method)

Next, the method of indicating (method of signaling) groups of component carriers configured for terminal 200 will be described.

In FIGS. 19A, 19B, and 19C, groups resulting from grouping of component carriers are described as group 1, group 2, and so forth. However, as in the case of Embodiment 2, when base station 100 and terminal 200 have different recognition as to which UL-DL configuration belongs to which group, PDSCH assignment by a PDCCH cannot be correctly indicated. That is, it is necessary for base station 100 and terminal 200 to have common recognition as to group numbers indicating to which group component carriers set for terminal 200 belong. For this reason, base station 100 needs to previously set group numbers for terminal 200.

Hereinafter, group number setting methods 1 to 4 as in the case of Embodiment 2 (FIGS. 15A and 15B and FIG. 16) will be described.

<Setting Method 1>

Setting method 1 is a method whereby a group number is set for each UL-DL configuration. That is, according to setting method 1, a group number is set for each UL-DL configuration and 1 bit per UL-DL configuration is indicated (1 bit/1 Config).

As an example of setting method 1, there is a method as shown in FIG. 15A whereby 1 bit (when the maximum number of groups is two) or 2 bits (when the maximum number of groups is three or four) per UL-DL configuration is/are indicated (method 1-1). In FIG. 15A, group number '1' is indicated for Configs 0 to 2, 5 and 6 and group number '2' is indicated for Configs 3 and 4.

Furthermore, another example of setting method 1 is a method as shown in FIG. 15B whereby a plurality of correspondence tables in which UL-DL configurations and group numbers are previously set are provided and a number indicating which correspondence table is used (number of a correspondence table) is indicated (method 1-2).

Furthermore, a further example of setting method 1 is a method whereby a group number is fixedly set for each UL-DL configuration (method 1-3). In this case, signaling from base station 100 to terminal 200 to indicate the group number is unnecessary.

In setting method 1, since a group number is set for each UL-DL configuration, the same UL-DL configuration cannot be set among different groups.

<Setting Method 2>

Setting method 2 is a method whereby a group number is set for each component carrier set for terminal 200. That is, according to setting method 2, a group number is set for each component carrier and 1 bit per component carrier is indicated (1 bit/1 CC).

That is, since base station 100 needs to indicate the group number set in each component carrier for each terminal 200, the number of bits for signaling increases compared to setting method 1. However, there is no setting limitation shown in setting method 1. That is, according to setting method 2, the same UL-DL configuration can also be set among different groups. That is, the same UL-DL configuration may belong to group 1 or group 2 depending on the terminal.

Setting method 2 can be further subdivided into a method whereby a group number is set for each component carrier set for terminal 200 (method 2-1) and a method whereby a component carrier which becomes an inter-group or intra-group cross-carrier scheduling source is configured for each terminal 200 (method 2-2). In method 2-2, only a component carrier which becomes an inter-group or intra-group cross-carrier scheduling source is indicated to terminal 200. For this reason, it is necessary to previously set whether to determine between base station 100 and terminal 200 which are other component carriers that belong to the same group as that of the indicated component carrier, fixedly or changeably by a setting.

<Setting Method 3>

Setting method 3 is a method whereby switching ON/OFF of grouping (whether or not to perform grouping) is indicated for each terminal 200. That is, setting method 3 indicates only 1 bit. Note that setting method 3 may be singly set between base station 100 and terminal 200 or setting method 3 may be set in combination with setting method 1 or setting method 2.

<Setting Method 4>

Setting method 4 is a method whereby only one group is always set for each terminal 200. In that case, such a limitation is provided that a UL-DL configuration that cannot be included in a component carrier of a highest-order UL-DL configuration including DL subframe timings should not be set.

Group number setting methods 1 to 4 have been described so far.

In this way, in the present embodiment, base station 100 and terminal 200 group a first component carrier and a second component carrier. Here, in a UL-DL configuration set in the first component carrier, a DL subframe is set at least at the same timing as that of a DL subframe of a UL-DL configuration set in the second component carrier. Base station 100 then indicates resource assignment information for both PDSCHs of the first component carrier and the second component carrier to terminal 200 using a PDCCH (downlink control channel) assigned to the first component carrier during cross-carrier scheduling. On the other hand, terminal 200 identifies PDSCH resources received in the first component carrier and second component carrier on the basis of the PDCCH received in the first component carrier. That is, the first component carrier is assumed to be a cross-carrier scheduling source and the second component carrier is assumed to be a cross-carrier scheduling destination.

It is thereby possible to instruct PDSCH assignment at any subframe timing in a specific component carrier (component carrier in which a highest-order UL-DL configuration including DL subframe timings in the group or between groups is set) among a plurality of component carriers set for terminal 200. Moreover, the possibility of a PDCCH becoming insufficient decreases even when the PDCCH indicating a PDSCH of another component carrier in the specific component carrier (component carrier having the highest proportion of DL subframes among component carriers set for terminal 200) during cross-carrier scheduling.

That is, according to the present embodiment, when ARQ is applied to communication using an uplink component carrier and a plurality of downlink component carriers associated with the uplink component carrier, and when the UL-DL configuration set for each component carrier (ratio between UL subframes and DL subframes) varies, it is possible to perform cross-carrier scheduling in any subframe while preventing the PDCCH from becoming insufficient.

In the present embodiment, the component carrier grouping method is not limited to the example shown in FIG. 19A.

For example, in the UL-DL configuration shown in FIG. 18B, Config 3, Config 4 and Config 5 may be grouped as group 1 and only Config 2 may be grouped as group 2.

Furthermore, in FIG. 18B, when higher-order Config 5 including UL subframe timings is set in a component carrier in common to Config 2 and Config 4 which have no inclusion relation, Config 5, Config 2 and Config 4 may be grouped as the same group.

Furthermore, in the UL-DL configuration shown in FIG. 18B, Config 3 and Config 5 may be grouped as group 1, Config 2 may be grouped as group 2 and Config 4 may be grouped as group 3. That is, as the inclusion relations shown in FIG. 18B, mutually not neighboring UL-DL configurations (e.g., Config 3 and Config 5) may be grouped into the same group.

For example, in FIG. 19A, the UL-DL configurations (Config 2, 3, 4, 5) of the component carriers configured for terminal 200 include Config 5 which is the highest-order UL-DL configuration among the UL-DL configurations shown in FIG. 18. Thus, all the UL-DL configurations (Config 2, 3, 4, 5) may be grouped into one group 1.

That is, terminal 200 may perform grouping so as to prevent groups from being formed of only combinations of UL-DL configurations mutually having no inclusion relation of DL subframe timings (Config 1 and Config 3, Config 2 and Config 3, and, Config 2 and Config 4 in FIG. 18B).

Moreover, there can also be a plurality of component carriers in which a highest-order UL-DL configuration including DL subframe timings is set in the same group. That is, there can also be a plurality of component carriers in which the same highest-order UL-DL configuration including DL subframe timings is set. In this case, when there is a PCell in the group, the PCell may be configured as a cross-carrier scheduling source. On the other hand, when there is no PCell in the group (when the group is formed of only SCells), an SCell of a smaller SCell index may be set as a cross-carrier scheduling source. However, the component carrier which becomes a cross-carrier scheduling source between groups (inter-group) need not always be a PCell. Similarly, the component carrier which becomes a cross-carrier scheduling source in a group (intra-group) need not always be a PCell. Moreover, when a PCell is not a component carrier which becomes a cross-carrier scheduling source between groups or in a group, the PCell may be reset as a component carrier which becomes a cross-carrier scheduling source.

A common grouping method or individual grouping methods may be adopted for the method of grouping component carriers relating to a component carrier determining method for reporting results of error detection using inclusion relations of UL subframe timings (see FIG. 12), and the method of grouping component carriers relating to a method of determining a component carrier which becomes a cross-carrier scheduling source between groups or in a group using inter-group or intra-group inclusion relations of DL subframe timings described in the present embodiment (see FIG. 18). When a common grouping method is adopted, the number of bits for signaling from base station 100 to terminal 200 can be reduced using common signaling. Furthermore, adopting the common grouping method can simplify the operation during processing when adding new component carriers as shown in FIG. 14 and can thereby simplify the configurations of base station 100 and terminal 200.

For example, it is assumed that grouping relating to indication of results of error detection (grouping using inclusion relations of UL subframe timings) is used for grouping relating to cross-carrier scheduling for reporting results of error detection and for cross-carrier scheduling, when a common grouping method is adopted. In this case, depending on UL-DL configurations of component carriers to be grouped, there is a possibility that a plurality of UL-DL configurations having no inclusion relation may become the highest-order UL-DL configurations in the group in cross-carrier scheduling. For example, when Configs 1, 2 and 4 are grouped into one group, Config 1 becomes the highest-order UL-DL configuration in the inclusion relations of UL subframe timings (FIG. 12A), whereas Configs 2 and 4 mutually having no inclusion relation become the highest-order UL-DL configurations in the inclusion relations of DL subframe timings (FIG. 18A).

In this case, a component carrier of a UL-DL configuration having more DL subframes (Config 4 in the above example) among a plurality of UL-DL configurations having no inclusion relation may be configured as a component carrier which becomes a cross-carrier scheduling source in the present embodiment. Alternatively, a common grouping method may also be adopted so as not to accept grouping whereby a plurality of UL-DL configurations mutually having no inclusion relation become the highest-order UL-DL configurations for reporting results of error detection and for cross-carrier scheduling.

Embodiment 4

Figures 23A, 23B:
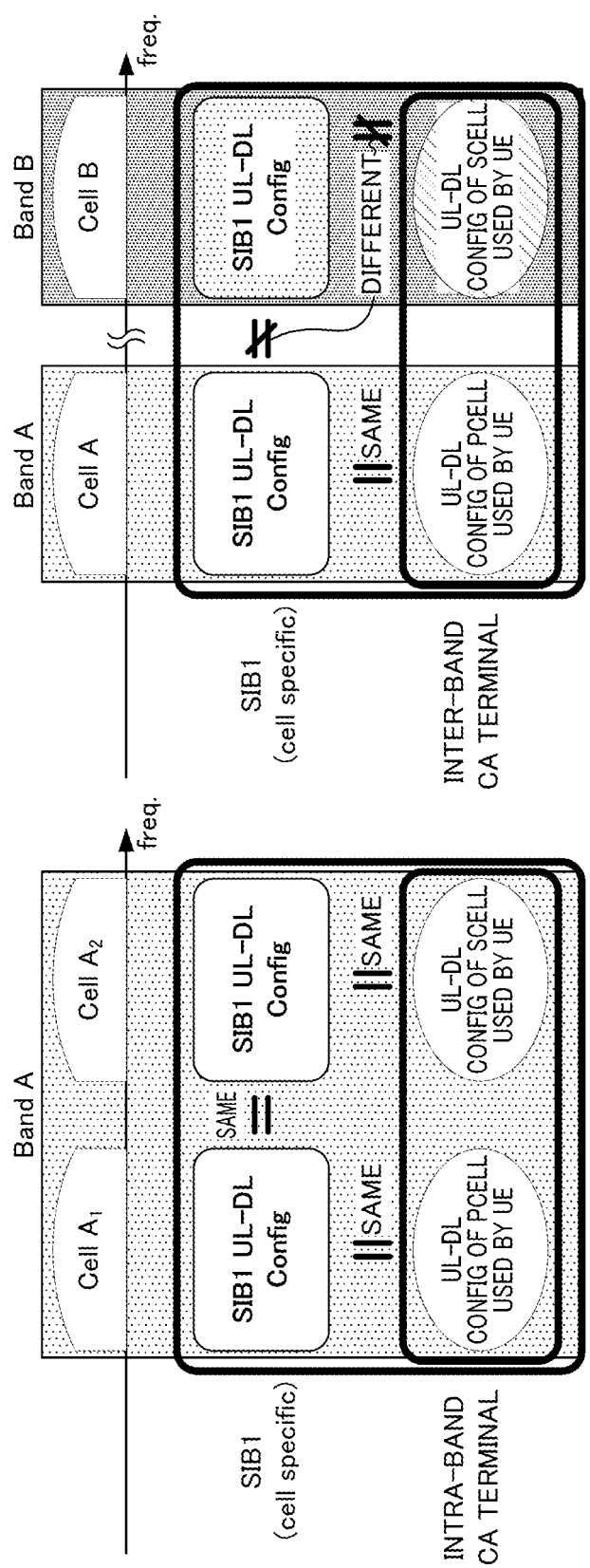
FIGS. 23A and 23B illustrate a UL-DL configuration of a terminal according to Embodiment 4 of the present invention.

FIGS. 23A and 23B illustrate UL-DL configurations of a terminal according to Embodiment 4 of the present invention.

For a terminal in which a certain component carrier (suppose Cell A) is configured as a PCell, a UL-DL configuration set for the PCell is indicated by a broadcast signal (SIB1). For another terminal in which the component carrier (Cell A) is configured as an SCell, a UL-DL configuration set for the SCell is indicated by radio resource control (RRC) which is terminal-specific signaling.

As shown in FIG. 23A, a plurality of component carriers (Cell $A_1$ and Cell $A_2$) in the same frequency band (Band A (e.g., 2-GHz band)) are used in intra-band CA. A case will be described where a base station configures a certain terminal with Cell $A_1$ as a PCell and Cell $A_2$ as an SCell. A UL-DL configuration set in the PCell is indicated by a broadcast signal (SIB1) common (cell specific) to a plurality of terminals in Cell $A_1$. A UL-DL configuration set in the SCell is indicated by RRC which is terminal-specific signaling in Cell $A_1$. However, in intra-band CA, a UL-DL configuration of the SCell (Cell $A_2$) indicated by RRC is set to the same value as that of a UL-DL configuration indicated by a broadcast signal (SIB1) common to a plurality of terminals in Cell $A_2$. Furthermore, in a plurality of component carriers in the same frequency band, the same UL-DL configuration is used to avoid interference between uplink communication and downlink communication. Thus, the terminal operates in expectation that in inter-band CA, the UL-DL configuration in the SCell will be the same UL-DL configuration as that indicated to the terminal using the broadcast signal (SIB1) in the PCell.

As shown in FIG. 23B, in inter-band CA, component carriers (Cell A and Cell B) in different frequency bands (Band A (e.g., 2-GHz band) and Band B (e.g., 800-MHz band)) are used. A case will be described as an example where the base station configures Cell A as the PCell and Cell B as the SCell for a certain terminal. A UL-DL configuration set in the PCell of the terminal is indicated by a broadcast signal (SIB1) common to a plurality of terminals in Cell A. A UL-DL configuration set in the SCell is indicated by RRC which is terminal-specific signaling in Cell A. However, in inter-band CA, studies are underway to set the UL-DL configuration of the SCell (Cell B) indicated by RRC to a value different from that of the UL-DL configuration indicated by a broadcast signal (SIB1) common to a plurality of terminals in Cell B. That is, as UL-DL configurations set in one component carrier, studies are underway to manage one UL-DL configuration indicated by a broadcast signal and a UL-DL configuration indicated by terminal-specific RRC signaling identical to the UL-DL configuration indicated by a broadcast signal thereof, and in addition, a UL-DL configuration indicated by terminal-specific RRC which is different from the UL-DL configuration indicated by the broadcast signal. Furthermore, studies are underway to cause the base station to indicate one UL-DL configuration to a terminal as a UL-DL configuration corresponding to the component carrier using a broadcast signal or RRC on one hand, and cause the base station to change a UL-DL configuration indicated to a terminal from one terminal to another on the other.

In the LTE-A system, studies are also underway to temporally switch a UL-DL configuration indicated by SIB1 in accordance with a variation in the ratio between uplink communication traffic and downlink communication traffic through RRC signaling or dynamic indication.

In relation with Embodiment 2, the present embodiment focuses attention on inclusion relations of UL subframe timings between UL-DL configurations set in each component carrier configured for terminal 200. As UL-DL configurations set in one component carrier, the present embodiment focuses attention on management of one UL-DL configuration indicated by a broadcast signal and a UL-DL configuration indicated by terminal-specific RRC signaling identical to the UL-DL configuration indicated by a broadcast signal thereof, and in addition, a UL-DL configuration indicated by terminal-specific RRC signaling which is different from the UL-DL configuration indicated by the broadcast signal. Moreover, the present embodiment also focuses attention on indication, as UL-DL configurations set in one component carrier, one UL-DL configuration to a terminal using a broadcast signal or RRC signaling, while causing the UL-DL configuration to be indicated to the terminal to vary from one terminal to another.

Although the present embodiment does not limit the number of groups, only a case will be described where the number of groups is one for simplicity of description. That is, response signals indicating results of error detection reported by a terminal to a base station are always reported using only one component carrier (PCell).

FIG. 24 illustrates settings of UL-DL configurations that satisfy condition (1) in Embodiment 4 of the present invention.

Since a terminal always reports a response signal indicating results of error detection using only one component carrier, UL-DL configurations of an SCell used by the terminal corresponding to UL-DL configurations of a PCell indicated by a broadcast signal (SIB1) are as condition (1) shown in FIG. 24. This is none other than the inclusion relations of UL subframe timings in FIG. 12A and FIG. 12B according to Embodiment 2 expressed in the form of a table. For example, it can be read from FIG. 12A and FIG. 12B that UL subframe timings of Config #1 include Config #1, Config #2, Config #4 or Config #5. On the other hand, in FIG. 24, when the UL-DL configuration indicated in the PCell by the base station using a broadcast signal (SIB1) is Config #1, the UL-DL configuration of the SCell used by the terminal is Config #1, Config #2, Config #4 or Config #5, and the terminal always reports a response signal indicating results of error detection using only the PCell. Here, the "UL-DL configuration of the SCell used by the terminal" may be indicated to the terminal in the PCell by terminal-specific RRC or may be dynamically indicated to the terminal individually. The "UL-DL configuration of the SCell used by the terminal" may be different from the UL-DL configuration indicated by the base station to the other terminal using a broadcast signal (SIB1) in the component carrier used by the terminal as the SCell. The same will apply to the description, hereinafter.

A UL-DL configuration is information indicating a relationship as to which subframe corresponds to a UL subframe or DL subframe in one frame (10 subframes) shown in FIG. 3. When a UL-DL configuration is individually indicated to a terminal dynamically, that is, for each subframe, the UL-DL configuration need not always be information indicating a relationship as to which subframe corresponds to a UL subframe or DL subframe in one frame. For example, in this case, the UL-DL configuration may be information indicating a relationship as to which subframe is a UL subframe or DL subframe among a plurality of subframes. Alternatively, the UL-DL configuration may be information indicating which of a UL subframe or DL subframe one subframe corresponds to. The same will apply to the description, hereinafter.

A case will be described with reference to FIGS. 25A and 25B where a UL-DL configuration of an SCell used by a terminal is different from a UL-DL configuration indicated by the base station in the same component carrier using a broadcast signal (SIB1). Particularly, a case will be described in detail where Cell B used as an SCell by a terminal carrying out inter-band CA is used as a PCell by a terminal not carrying out CA.

Figure 25A:
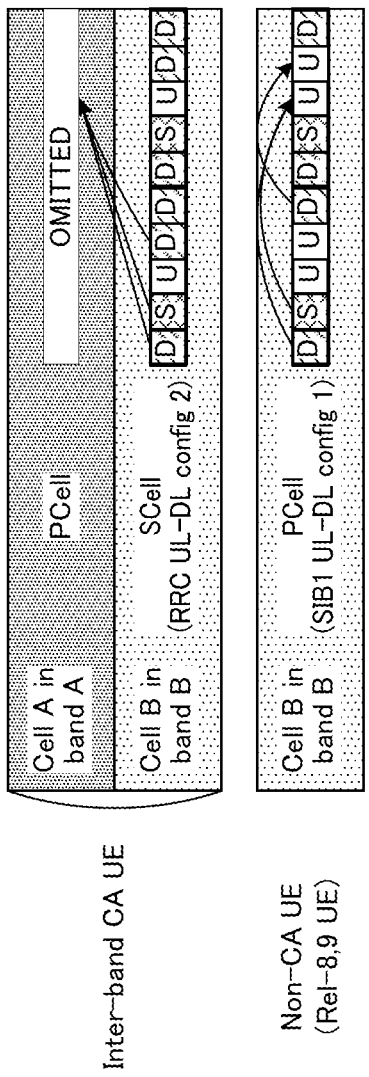
FIGS. 25A and 25B are diagrams provided for describing problems with CRS measurement according to Embodiment 4 of the present invention.
Figure 25B:
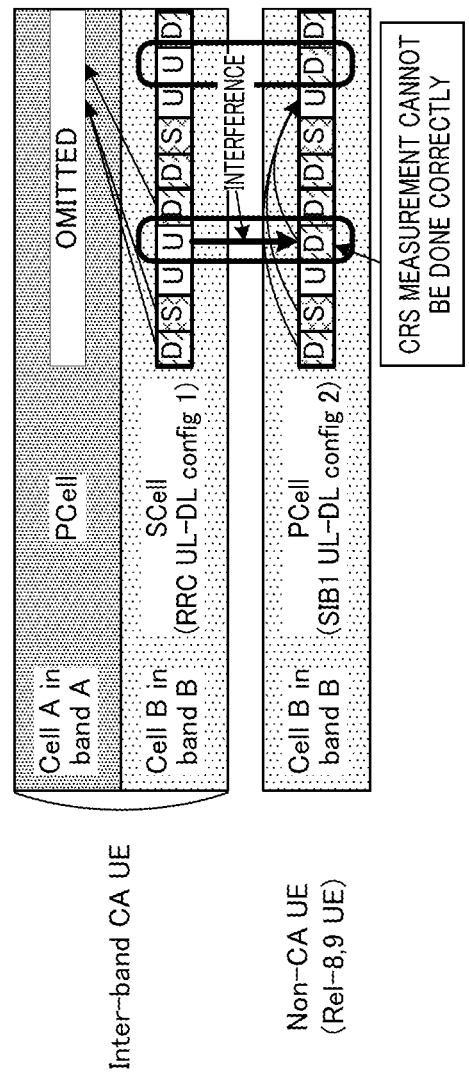

FIGS. 25A and 25B illustrate problems with CRS measurement in the present embodiment. In FIG. 25A, when UL subframe timings of a UL-DL configuration of Cell B indicated by the base station using a broadcast signal (SIB1) include (or may be equal to) UL subframe timings of a UL-DL configuration of an SCell (Cell B) used by the terminal (assumed to be condition (2)), Config #2 is set, for example, in an SCell of an inter-band CA terminal and Config #1 is set in a PCell of a non-CA terminal using Cell B which is the same component carrier. In the same subframe within the same component carrier, a plurality of terminals may recognize different communication directions of subframes. That is, there are subframes in which UL and DL conflict with each other. The base station performs scheduling so that only one of uplink communication and downlink communication occurs. In FIG. 25B, when UL subframe timings of a UL-DL configuration of an SCell (Cell B) used by a terminal include (and are also different from) UL subframe timings of a UL-DL configuration of Cell B indicated by the base station using a broadcast signal (SIB1), for example, Config #1 is set in an SCell of an inter-band CA terminal and Config #2 is set in a PCell of a non-CA terminal using Cell B which is the same component carrier. In this case, a communication direction of a subframe recognized by the terminal in the same subframe within the same component carrier may be different, but as in the case of FIG. 25A, the base station performs scheduling so that only one of uplink communication and downlink communication occurs.

However, in FIG. 25B, the non-CA terminal (especially a legacy terminal that cannot provide a limitation to subframes for measuring a CRS (Cell-specific Reference Signal) (e.g., terminal of Rel-8 or Rel-9)) measures CRS in DL subframes for mobility measurement. That is, in subframes in which UL and DL conflict with each other, even when the base station attempts to prevent downlink communication from occurring to use the subframes as UL subframes, there may be a terminal that performs reception processing in a DL subframe. In this case, inter-band CA terminals carrying out uplink communication provide interference to non-CA terminals that perform CRS measurement. On the other hand, in FIG. 25A, when the non-CA terminal is in a UL subframe, the inter-band CA terminal is in a DL subframe, and CRS measurement may occur. However, since terminals that support inter-band CA are terminals of Rel-11 or later, if the base station provides a limitation to CRS measurement for terminals of Rel-10 or later, this interference can be avoided. Therefore, condition (2) shown in FIG. 25A is necessary to avoid interference to CRS measurement in terminals of Rel-8 or Rel-9.

FIG. 26 illustrates settings of UL-DL configurations that satisfy condition (1) and condition (2) according to Embodiment 4 of the present invention.

In the present embodiment, as shown in FIG. 26, UL-DL configurations of the SCell used by the terminal satisfy condition (1) and condition (2), simultaneously. That is, the base station determines a UL-DL configuration of the SCell used by the terminal on the basis of a UL-DL configuration indicated by the base station using a broadcast signal (SIB1) in a component carrier used by the terminal as the PCell and a UL-DL configuration indicated by the base station using a broadcast signal (SIB1) in a component carrier used by the terminal as the SCell. When different UL-DL configurations are used among a plurality of terminals using the same component carrier, it is possible to avoid interference to mobility measurement (CRS measurement) in legacy terminals while simplifying an RF configuration of the terminals by reporting response signals indicating results of error detection using only one component carrier (PCell).

Under condition (2), it is possible to prevent a non-CA terminal from performing CRS measurement, by setting the subframe, for example, as an MBSFN subframe. Alternatively, interference will no longer occur if a legacy terminal without limitations on CRS measurement is prevented from using the frequency band. Therefore, at least condition (1) may be satisfied.

Figure 27:
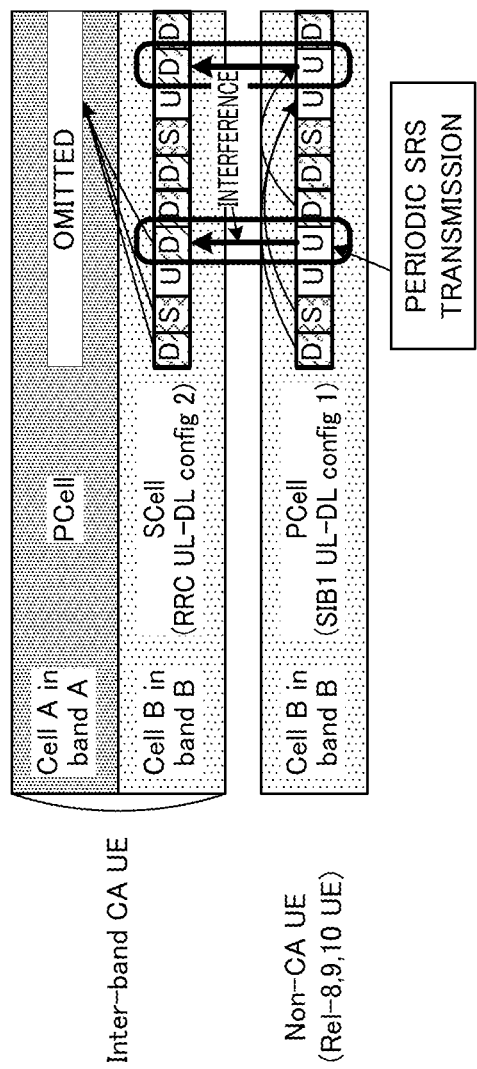
FIG. 27 is a diagram provided for describing problems with SRS transmission according to Embodiment 4 of the present invention.

FIG. 27 illustrates problems with SRS transmission according to the present embodiment.

In FIG. 27, UL subframe timings of a UL-DL configuration of Cell B indicated by the base station using a broadcast signal (SIB1) include (or may be equal to) UL subframe timings of a UL-DL configuration of an SCell (Cell B) used by the terminal (assumed to be condition (2)).

Condition (2) will be described in detail with reference to FIG. 27. As described above, condition (2) makes it possible to prevent an inter-band CA terminal carrying out uplink communication from providing interference to a legacy terminal carrying out CRS measurement. However, according to condition (2), when a subframe in the SCell of an inter-band CA terminal is a DL subframe, a subframe of a non-CA terminal in the same component carrier may be a UL subframe. In this subframe, when the non-CA terminal transmits an SRS (sounding reference signal) (that is, periodic SRS) previously set from the base station so as to be transmitted periodically, UL transmission by the non-CA terminal may provide interference to DL reception in the SCell of the inter-band CA terminal using the same component carrier.

Thus, the base station indicates the subframe in which an SRS is transmitted from another terminal to the inter-band CA terminal using, for example, RRC. The inter-band CA terminal then determines whether or not an SRS has been transmitted from the other terminal in the corresponding subframe on the basis of the information. Since an SRS is always transmitted using only the last two symbols among 14 symbols of one subframe, the terminal receives a maximum of 12 symbols except the last two symbols in the subframe. However, in the subframe, the base station needs to perform both downlink transmission and uplink SRS reception, and fewer than 12 symbols can actually be used for downlink communication when a transmission/reception switching time in the base station or a propagation delay between the base station and the terminal is taken into consideration. The operation is similar to an operation in a special subframe. Therefore, the inter-band CA terminal may regard the subframe as a special subframe.

The form of information as to which subframe is used to transmit an SRS from another terminal may be a bitmap pattern indicating an SRS transmission subframe or SRS non-transmission subframe. The base station and the terminal may store a table of index numbers associated with patterns of SRS transmission subframes in a one-to-one correspondence, and the form of the information as to which subframe is used to transmit the SRS from the other terminal may be an index number thereof. The form of the information may also be a UL-DL configuration for identifying an SRS transmission subframe. In this case, the inter-band CA terminal determines that an SRS is transmitted from the other terminal in a UL subframe indicated by the UL-DL configuration for identifying the SRS transmission subframe. When the UL-DL configuration set for the inter-band CA terminal indicates a DL subframe in the UL subframe indicated by the UL-DL configuration for identifying an SRS transmission subframe, the inter-band CA terminal regards the subframe as a special subframe. In the example in FIG. 27, the base station indicates Config #1 to the inter-band CA terminal using, for example, using RRC as the UL-DL configuration for identifying an SRS transmission subframe. The inter-band CA terminal regards subframe #3 and subframe #8 which become DL subframes in Config #2 used in the inter-band CA terminal and UL subframes in Config #1 as special subframes. In a most preferred embodiment, condition (2) and signaling indicating which subframe is used to transmit an SRS from the other terminal should be applied simultaneously, but any one of these may be applicable.

Interference is provided to mobility measurement (CRS measurement) in the non-CA terminal only when UL transmission is performed in the SCell of the inter-band CA terminal as shown in FIG. 25B. In other words, the above-described interference problem does not occur in a terminal that cannot perform UL transmission from the SCell during inter-band CA for RF configuration-related reasons, for example. Thus, the method of setting the UL-DL configuration of the SCell used by the terminal may be changed on the basis of UE capability (terminal capability) indicated from the terminal to the base station. That is, the base station may set the UL-DL configuration of the SCell used by a terminal that satisfies only condition (1) shown in FIG. 24 for a terminal that cannot perform UL transmission from the SCell and set the UL-DL configuration of the SCell used by a terminal that satisfies condition (1) and condition (2) shown in FIG. 26 for a terminal that can perform UL transmission from the SCell. In this case, the base station determines the UL-DL configuration of the SCell used by a terminal that cannot perform UL transmission from the SCell on the basis of only the UL-DL configuration indicated by the base station using a broadcast signal (SIB1) of the component carrier.

As one of UE capabilities, full duplex and half duplex can be considered in addition to the capability of UL transmission in the SCell. When carrier aggregation (that is, inter-band carrier aggregation) is performed between a component carrier (Cell A) of a certain frequency band (Band A) and a component carrier (Cell B) of a frequency band (Band B) different therefrom, a terminal that can perform UL transmission using the component carrier of one frequency band and perform DL reception using the component carrier of the other frequency band is a full duplex terminal, and a terminal that cannot perform the above transmission and reception simultaneously is a half duplex terminal. The half duplex terminal that can simplify RF is preferred for a low-cost terminal and the full duplex terminal is preferred for a high-end terminal. The above-described UE capability of being unable to perform UL transmission in the SCell is intended for a low-cost terminal and the UE capability of being able to perform UL transmission in the SCell is intended for a high-end terminal. Thus, the base station may set a UL-DL configuration of the SCell used by a terminal that satisfies condition (1) shown in FIG. 24 for a low-cost half duplex terminal and may set a UL-DL configuration of the SCell used by a terminal that satisfies condition (1) and condition (2) shown in FIG. 26 for a high-end full duplex terminal.

Furthermore, when a half duplex terminal performs inter-band CA, if UL-DL configurations set for the terminal differ between component carriers, there are subframes in which UL and DL conflict with each other between the component carriers. In this case, the half duplex terminal can use only UL subframes or DL subframes of the one component carrier in the above-described subframes, so that there is a problem in that the improvement of a peak rate which is the original object of carrier aggregation is not achieved.

FIG. 28 illustrates UL-DL configuration settings that satisfy condition (3) according to Embodiment 4 of the present invention.

As shown in FIG. 28, in order to solve the above-described problem, the base station may set the UL-DL configuration of the SCell used by the half duplex terminal to the same value (that is, condition (3) described in FIG. 28) as that of the UL-DL configuration indicated by a broadcast signal (SIB1) of the component carrier used by the half duplex terminal as the PCell. This allows the communication direction of the PCell to always match that of the SCell, and thus eliminates subframes in which communication is impossible, and can thereby achieve the improvement of a peak rate which is the original object of carrier aggregation. That is, the base station may set, for the full duplex terminal, a UL-DL configuration of the SCell used by the terminal that satisfies condition (1) and condition (2) shown in FIG. 26 and set, for the half duplex terminal, a UL-DL configuration of the SCell used by the terminal that satisfies condition (3). Alternatively, the base station may also set, for a full duplex terminal capable of UL transmission in the SCell, a UL-DL configuration of the SCell used by the terminal that satisfies condition (1) and condition (2) shown in FIG. 26, set, for a full duplex terminal not capable of UL transmission in the SCell, a UL-DL configuration of the SCell used by the terminal that satisfies condition (1) shown in FIG. 24, and set, for a half duplex terminal, a UL-DL configuration of the SCell used by the terminal that satisfies condition (3) shown in FIG. 28. Moreover, the base station may indicate to the terminal, signaling indicating which subframe is used to transmit an SRS from another terminal. It is clear from FIG. 28 and FIG. 24 that condition (3) is included in condition (1).

Here, under condition (3), the UL-DL configuration of the PCell is set so as to be equal to the UL-DL configuration of the SCell and there seems to be no major difference from the case with intra-band CA as shown in FIG. 23A. What condition (3) means is that when the UL-DL configuration indicated by the base station using a broadcast signal (SIB1) in a component carrier used by the terminal as a PCell is different from the UL-DL configuration indicated by the base station using a broadcast signal (SIB1) in a component carrier used by the terminal as an SCell, the UL-DL configuration of the SCell used by the terminal is the same as the UL-DL configuration indicated by the base station using a broadcast signal (SIB1) in the component carrier used by the terminal as the PCell. On the other hand, FIG. 23A means that the UL-DL configuration of the SCell used by the terminal is the same as the UL-DL configuration indicated by the base station using a broadcast signal (SIB1) in the component carrier used by the terminal as the SCell. Condition (3) is different from FIG. 23A in the above respect.

Of condition (1), condition (2) and condition (3) of the present embodiment, condition (1) and condition (3) are limitations on the UL-DL configuration of the PCell and the UL-DL configuration of the SCell set for one terminal. Condition (2) is a limitation on the UL-DL configuration set among a plurality of terminals. The terminal cannot know what kind of UL-DL configuration is set by the base station for other terminals using the same component carrier. For this reason, the terminal cannot determine whether or not to apply condition (2). On the other hand, since the base station naturally knows what kind of UL-DL configuration is set for each terminal, the base station can determine whether or not to apply condition (2). Furthermore, the base station and the terminal can naturally know information on which subframe is used to transmit an SRS from the other terminal because such information is indicated from the base station to the terminal.

As described above, in the present embodiment, there are four conditions corresponding to UL-DL configurations and signaling methods for the terminal as shown below. The following conditions and signaling methods may differ from one terminal to another. For example, the following conditions and signaling methods may be made to vary from one terminal to another on the basis of UE capability.
  1. Only condition (1) is applied.
  2. Only condition (3) is applied.
  3. In addition to the application of only condition (1), information on which subframe is used to transmit an SRS from the other terminal is indicated.
  4. In addition to the application of only condition (3), information on which subframe is used to transmit an SRS from the other terminal is indicated.

Furthermore, in the present embodiment, there are eight conditions corresponding to UL-DL configurations and signaling methods for the base station as shown below. The following conditions and signaling methods may be made to differ from one terminal to another (e.g., on the basis of UE capability) or from one frequency band to another.
  1. Only condition (1) is applied.
  2. Only condition (3) is applied.
  3. In addition to the application of only condition (1), information on which subframe is used to transmit an SRS from the other terminal is indicated.
  4. In addition to the application of only condition (3), information on which subframe is used to transmit an SRS from the other terminal is indicated.
  5. Condition (1) and condition (2) are applied.
  6. Condition (3) and condition (2) are applied.
  7. In addition to the application of condition (1) and condition (2), information on which subframe is used to transmit an SRS from the other terminal is indicated.
  8. In addition to the application of condition (3) and condition (2), information on which subframe is used to transmit an SRS from the other terminal is indicated.

Thus, the present embodiment has focused attention on inclusion relations of UL subframe timings among UL-DL configurations of respective component carriers configured for terminal 200. Furthermore, as UL-DL configurations set in one component carrier, the present embodiment has focused attention on management of one UL-DL configuration indicated by a broadcast signal and a UL-DL configuration indicated by terminal-specific RRC signaling identical to the UL-DL configuration indicated by the broadcast signal, and in addition, a UL-DL configuration indicated by terminal-specific RRC signaling which is different from the UL-DL configuration indicated by the broadcast signal. Moreover, the present embodiment has also focused attention on indicating one UL-DL configuration to a terminal using a broadcast signal or RRC signaling as a UL-DL configuration for the component carrier, meanwhile causing the UL-DL configuration to be indicated to the terminal to vary from one terminal to another. By adding condition (1), condition (2) and condition (3) to the setting of a UL-DL configuration, it is possible to avoid interference to CRS measurement provided for a Rel-8 or Rel-9 terminal while reporting response signals indicating results of error detection to be reported from the terminal to the base station always using only one component carrier (PCell). At the same time, it is possible to avoid interference by periodic SRS transmission by indicating information on which subframe is used to transmit an SRS from the other terminal to the terminal.

Furthermore, condition (1), condition (2) and condition (3) of the present embodiment are based on a premise that the UL-DL configuration of the PCell used by the terminal is the same as the UL-DL configuration indicated by the base station using a broadcast signal (SIB1) in a component carrier used by the terminal as a PCell. Therefore, the base station determines the UL-DL configuration of the SCell used by the terminal on the basis of the UL-DL configuration indicated by the base station using a broadcast signal (SIB1) at least in a component carrier used by the terminal as a PCell. However, what is important is that the UL-DL configuration set in the component carrier used by the terminal as the PCell is not the UL-DL configuration indicated by the base station using a broadcast signal (SIB1) but the UL-DL configuration of the PCell used by the terminal. In short, a similar problem can be solved even when the UL-DL configuration of the SCell used by the terminal is determined based on at least the UL-DL configuration of the PCell used by the terminal. Therefore, the present embodiment can be implemented even when the UL-DL configuration of the PCell used by the terminal is different from the UL-DL configuration indicated by the base station using a broadcast signal (SIB1) in the component carrier used by the terminal as the PCell, for example, when the UL-DL configuration of the PCell used by the terminal is indicated not by SIB1 but RRC or dynamically.

A case has been described in the present embodiment where a UL-DL configuration set for an inter-band CA terminal differs from one component carrier to another. However, the present embodiment is not necessarily limited to inter-band CA. Especially, condition (2) needs only to satisfy a requirement of managing, as UL-DL configurations set in one component carrier, one UL-DL configuration indicated by a broadcast signal and a UL-DL configuration indicated by terminal-specific RRC signaling identical to the UL-DL configuration indicated by a broadcast signal thereof, and in addition, a UL-DL configuration indicated by terminal-specific RRC signaling which is different from the UL-DL configuration indicated by the broadcast signal, and a requirement of indication, as UL-DL configurations set in one component carrier, one UL-DL configuration to a terminal, using a broadcast signal or RRC signaling, while causing the UL-DL configuration to be indicated to the terminal to vary from one terminal to another. The above-described case will be shown in Embodiment 5.

Embodiment 5

The present embodiment will focus attention on the case in Embodiment 4 where only condition (2) is applied. The present embodiment needs only to satisfy a requirement of managing, as UL-DL configurations set in one component carrier, one UL-DL configuration indicated by a broadcast signal and a UL-DL configuration indicated by terminal-specific RRC signaling identical to the UL-DL configuration indicated by a broadcast signal thereof, and in addition, a UL-DL configuration indicated by terminal-specific RRC signaling which is different from the UL-DL configuration indicated by the broadcast signal, and a requirement of indication, as UL-DL configurations set in the component carrier, one UL-DL configuration to a terminal using a broadcast signal or RRC signaling, meanwhile causing the UL-DL configuration to be indicated to the terminal to vary from one terminal to another. Therefore, the present embodiment is not dependent on the presence or absence of inter-band CA.

A case will be described with reference to FIGS. 29A and 29B where two UL-DL configurations: a UL-DL configuration indicated by a base station using SIB1 in one component carrier (PCell) and a UL-DL configuration indicated by RRC signaling or indicated dynamically, are set one by one for different terminals.

Figure 29A:
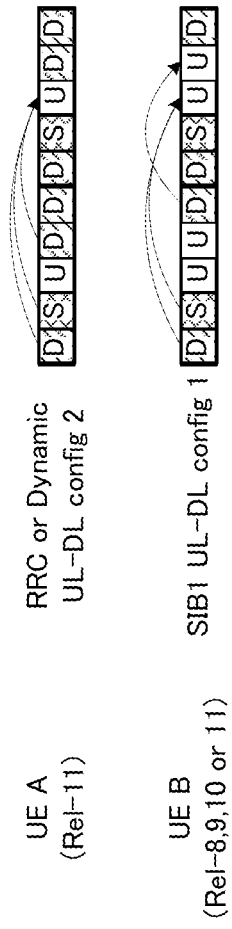
FIGS. 29A and 29B are diagrams provided for describing problems with CRS measurement according to Embodiment 5 of the present invention.
Figure 29B:
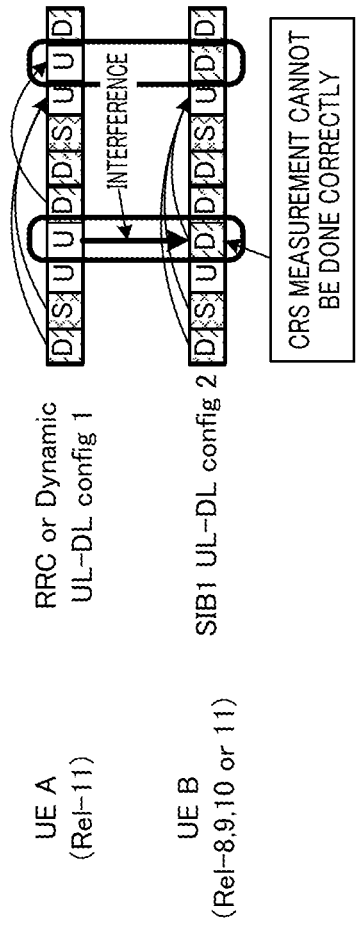

FIGS. 29A and 29B illustrate problems with CRS measurement in the present embodiment.

In FIGS. 29A and 29B, UL subframe timings of a UL-DL configuration indicated by the base station using a broadcast signal (SIB1) include (may also be equal to) UL subframe timings of a UL-DL configuration indicated by the terminal by RRC signaling or indicated dynamically (assumed to be condition (2)).

However, terminals that can set a UL-DL configuration indicated by the base station by RRC signaling or indicated dynamically are terminals of Rel-11 or later and are terminals that can provide a limitation on CRS measurement. On the other hand, terminals that can set a UL-DL configuration indicated by the base station using SIB1 are all terminals of Rel-8 or later, and of those terminals, terminals that can provide a limitation on CRS measurement are terminals of Rel-10 or later.

FIG. 29A illustrates a case where UL subframe timings of a UL-DL configuration indicated by the base station using a broadcast signal (SIB1) include (may also be equal to) UL subframe timings of a UL-DL configuration indicated by the terminal by RRC signaling or indicated dynamically (assumed to be condition (2)). For example, Config #2 is set for Rel-11 terminal A and Config #1 is set for terminal B of Rel-8, 9, 10 or 11 of the same component carrier. In this case, in the same subframe within the same component carrier, the communication direction of a subframe recognized by terminal A and terminal B may differ. That is, there are subframes in which UL and DL conflict with each other. In this case, the base station performs scheduling in such a way that only one of uplink communication and downlink communication occurs. Furthermore, the base station provides a limitation on CRS measurement of terminal A so as to prevent Rel-11 terminal A from performing CRS measurement during UL transmission of terminal B. Next, FIG. 29B illustrates a case where UL subframe timings of a UL-DL configuration indicated by the base station by RRC signaling or indicated dynamically include (and are different from) UL subframe timings of a UL-DL configuration indicated by the base station using a broadcast signal (SIB1). For example, Config #1 is set for Rel-11 terminal A and Config #2 is set for terminal B of Rel-8, 9, 10 or 11 using the same component carrier. In this case, in the same subframe within the same component carrier, the communication direction of a subframe recognized by terminal A and terminal B may differ. That is, there are subframes in which UL and DL conflict with each other. In this case, the base station performs scheduling in such a way that only one of uplink communication and downlink communication occurs.

In FIG. 29B, terminal B of Rel-8 or Rel-9 not subject to a limitation on CRS measurement performs CRS measurement in DL subframes for mobility measurement. That is, in subframes in which UL and DL conflict with each other, even when the base station prevents downlink communication from occurring so that those subframes may be used as UL subframe, there are terminals that perform reception processing in DL subframes. Therefore, at this time, terminal A that performs uplink communication provides interference to terminal B that performs CRS measurement, particularly, a terminal of Rel-8 or Rel-9. Thus, condition (2) shown in FIG. 29A is necessary to avoid interference to CRS measurement in the terminals of Rel-8 or Rel-9. That is, the UL-DL configuration settable by the base station and indicated by RRC signaling or indicated dynamically is determined on the basis of a UL-DL configuration indicated by the base station using a broadcast signal (SIB1).

FIG. 30 illustrates settings of UL-DL configurations that satisfy condition (2) according to Embodiment 5 of the present invention.

UL-DL configurations that can be set by the base station, indicated by RRC signaling or indicated dynamically satisfy FIG. 30.

Figure 31:
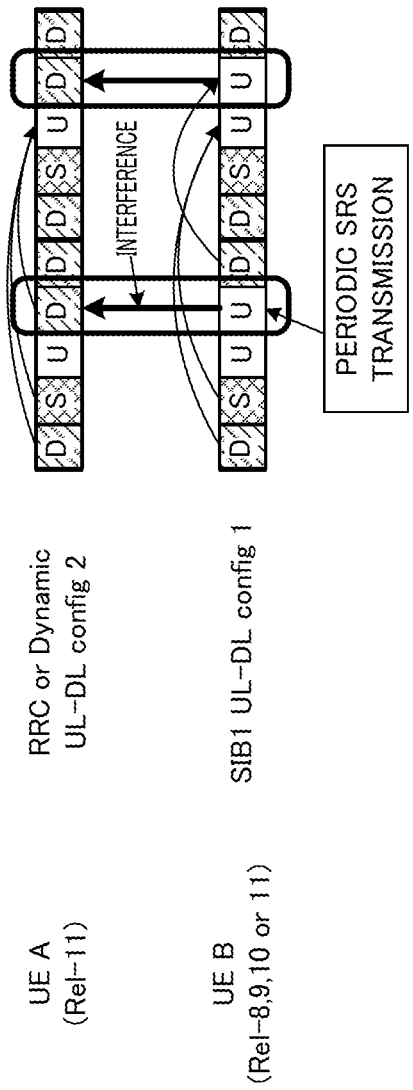
FIG. 31 is a diagram provided for describing problems with SRS transmission according to Embodiment 5 of the present invention.

Furthermore, condition (2) will be described in detail with reference to FIG. 31. FIG. 31 illustrates problems with SRS transmission according to the present embodiment.

As described above, due to condition (2), Rel-11 terminal A that performs uplink communication can prevent interference to Rel-8 or Rel-9 terminal B that performs CRS measurement. However, according to condition (2), when a subframe of Rel-11 terminal A is a DL subframe, a subframe of terminal B using the same component carrier may be a UL subframe. When terminal B transmits an SRS previously set from the base station so as to be transmitted periodically in this UL subframe, UL transmission by terminal B may interfere with DL reception in terminal A using the same component carrier.

Therefore, the base station indicates, for example, by RRC signaling, as to which subframe is used to transmit an SRS from another terminal to a terminal (that is, terminal A)

using a UL-DL configuration indicated by RRC signaling or indicated dynamically. The terminal then determines whether or not the SRS has been transmitted from the other terminal in the corresponding subframe on the basis of the information. Since an SRS is always transmitted only in last two symbols of 14 symbols of one subframe, the terminal receives a maximum of 12 symbols except the last two symbols in the subframe. However, in the subframe, the base station needs to perform both downlink transmission and uplink SRS reception, and fewer than 12 symbols can actually be used for downlink communication when a time of switching between transmission and reception in the base station or a propagation delay between the base station and the terminal is taken onto consideration. Moreover, the operation is similar to an operation in a special subframe. Therefore, the terminal using a UL-DL configuration indicated by RRC signaling or indicated dynamically may regard the subframe as a special subframe. In the most preferred embodiment, condition (2) and signaling indicating which subframe is used to transmit an SRS from another terminal should be applied simultaneously, but any one of these may be applied.

The form of information on which subframe is used to transmit an SRS from the other terminal may be a bitmap pattern indicating an SRS transmission subframe or SRS non-transmission subframe. A table of index numbers associated with patterns of SRS transmission subframes in a one-to-one correspondence may be stored in the base station and terminal, respectively, and the form of information on which subframe is used to transmit an SRS from the other terminal may be an index number thereof. The form of information may also be a UL-DL configuration for identifying an SRS transmission subframe. In this case, the terminal using a UL-DL configuration indicated by RRC signaling or indicated dynamically determines that an SRS is transmitted from the other terminal in a UL subframe indicated by the UL-DL configuration for identifying an SRS transmission subframe. In the UL subframe indicated by the UL-DL configuration for identifying an SRS transmission subframe, when the UL-DL configuration set for the terminal indicates a DL subframe, the terminal regards the subframe as a special subframe. In the example of FIG. 31, the base station indicates Config #1 to terminal A as a UL-DL configuration for identifying an SRS transmission subframe, for example, by RRC signaling. A subframe in terminal A becomes a DL subframe according to Config #2 used by terminal A and becomes a UL subframe according to Config #1 for identifying an SRS transmission subframe and regards subframe #3 and subframe #8 as special subframes.

As described in Embodiment 4, the terminal cannot determine whether or not condition (2) is applicable. On the other hand, the base station can determine whether or not condition (2) is applicable. Furthermore, since the base station indicates the information on which subframe is used to transmit an SRS from the other terminal to the terminal, the base station and the terminal can naturally know the information.

As described above, in the present embodiment, there are two conditions corresponding to UL-DL configurations and SRS-related signaling methods for the terminal as shown below. The following conditions and signaling methods may vary from one terminal to another. For example, the following conditions and signaling methods may vary from one terminal to another on the basis of UE capability.

1. No condition.

2. Information on which subframe is used to transmit an SRS from another terminal is indicated. Furthermore, in the present embodiment, there are three conditions corresponding to UL-DL configurations and SRS-related signaling methods for the base station as shown below. The following conditions and signaling methods may vary from one terminal to another (e.g., on the basis of UE capability) or from one frequency band to another. Terminals that satisfy the conditions and signaling methods shown in Embodiment 4 may be located within the same component carrier.

1. Information on which subframe is used to transmit an SRS from another terminal is indicated.

2. Only condition (2) is applied.

3. In addition to the application of only condition (2), information on which subframe is used to transmit an SRS from another terminal is indicated is indicated.

As described above, the present embodiment manages, as UL-DL configurations set in one component carrier, one UL-DL configuration indicated by a broadcast signal and a UL-DL configuration indicated by terminal-specific RRC signaling identical to the UL-DL configuration indicated by the broadcast signal, and in addition, a UL-DL configuration indicated by terminal-specific RRC signaling which is different from the UL-DL configuration indicated by the broadcast signal. Furthermore, as UL-DL configurations set in the component carrier, when indicating one UL-DL configuration to a terminal using a broadcast signal or RRC signaling, while satisfying a requirement of causing the UL-DL configuration to be indicated to the terminal to vary from one terminal to another, condition (2) is provided between the UL-DL configuration indicated by the base station using a broadcast signal (SIB1) and the UL-DL configuration indicated by the base station by RRC signaling or indicated dynamically. This allows the terminal using the UL-DL configuration indicated by the base station by RRC signaling or indicated dynamically to avoid interference with CRS measurement provided to terminals of Rel-8 or Rel-9 using the UL-DL configuration indicated by the base station using a broadcast signal (SIB1).

Furthermore, in the present embodiment, the base station indicates information on which subframe is used to transmit an SRS from another terminal to a terminal using a UL-DL configuration indicated by RRC signaling or indicated dynamically. This allows the terminal using a UL-DL configuration indicated by the base station using SIB1 to avoid interference by periodic SRS transmission provided to the terminal using a UL-DL configuration indicated by the base station by RRC signaling or indicated dynamically.

The embodiments of the present invention have been described so far.

Figure 20:
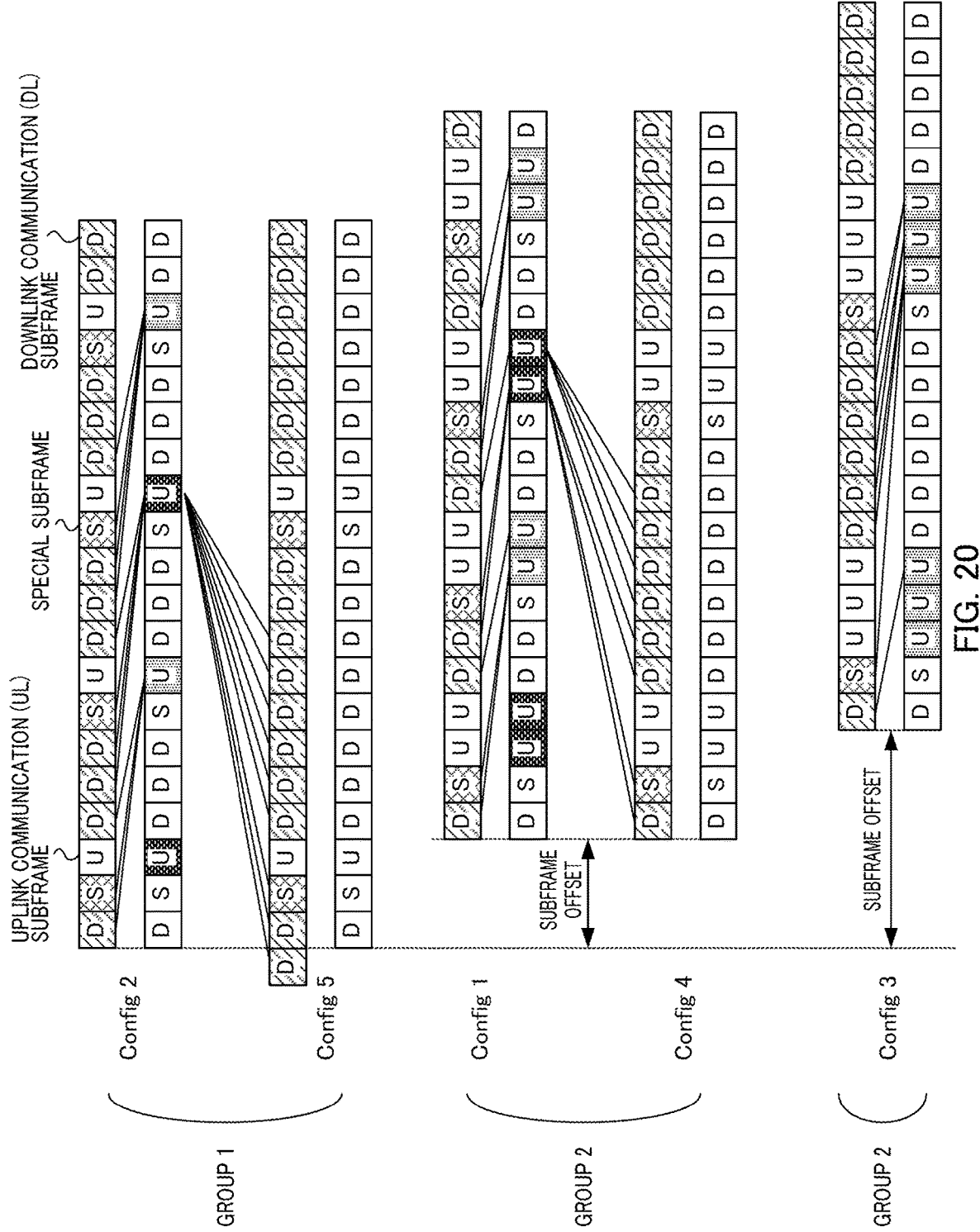
FIG. 20 illustrates another variation of the present invention.

A case has been described in the above embodiments where a common frame starting position is applied among component carriers in which different UL-DL configurations are set. However, the present invention is not limited to this, but the present invention is also applicable to a case where subframe timings are shifted among component carriers (when a subframe offset exists). For example, as shown in FIG. 20, a subframe offset may be set between different groups. That is, as shown in FIG. 20, the frame starting position is kept the same within each group.

Figure 21A:
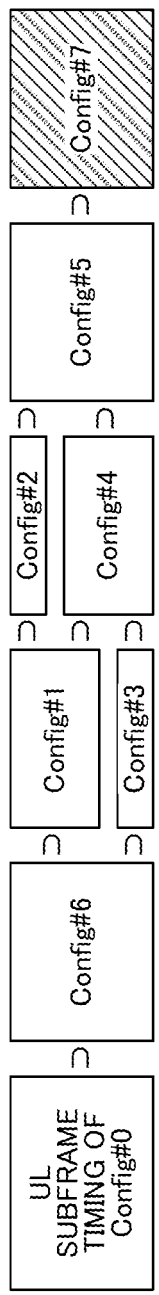
FIGS. 21A and B illustrate a further variation of the present invention.
Figure 21B:
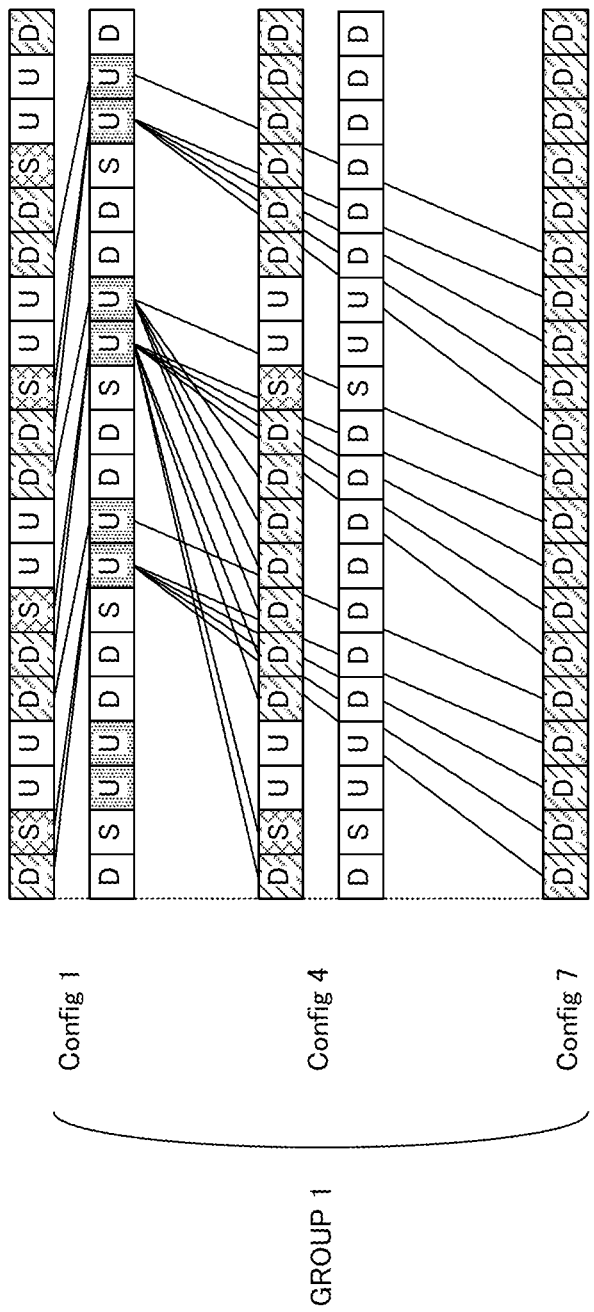

Furthermore, a case has been described in the above embodiments where Configs 0 to 6 shown in FIG. 3 are used as UL-DL configurations. However, the UL-DL configurations are not limited to Configs 0 to 6 shown in FIG. 3. For example, as shown in FIG. 21, a UL-DL configuration (assumed to be Config 7 here) in which all subframes become DL subframes may also be used in addition to Configs 0 to 6 shown in FIG. 3. As shown in FIG. 21A, in inclusion relations of UL subframe timings among UL-DL configurations, Config 7 in which all subframes become DL subframes is a lowest-order UL-DL configuration. In other words, in the inclusion relations of DL subframe timings among UL-DL configurations, Config 7 in which all subframes become DL subframes is a highest-order UL-DL configuration (not shown). Furthermore, as shown in FIG. 21B, a timing of reporting results of error detection of a component carrier set with the UL-DL configuration (Config 7) in which all subframes are DL subframes is a timing at the fourth subframe after a DL subframe in which a PDSCH is received or after the fourth subframe and is an earliest UL subframe timing in a component carrier in which a highest-order UL-DL configuration (Config 1) including UL subframe timings is set.

Figure 22:
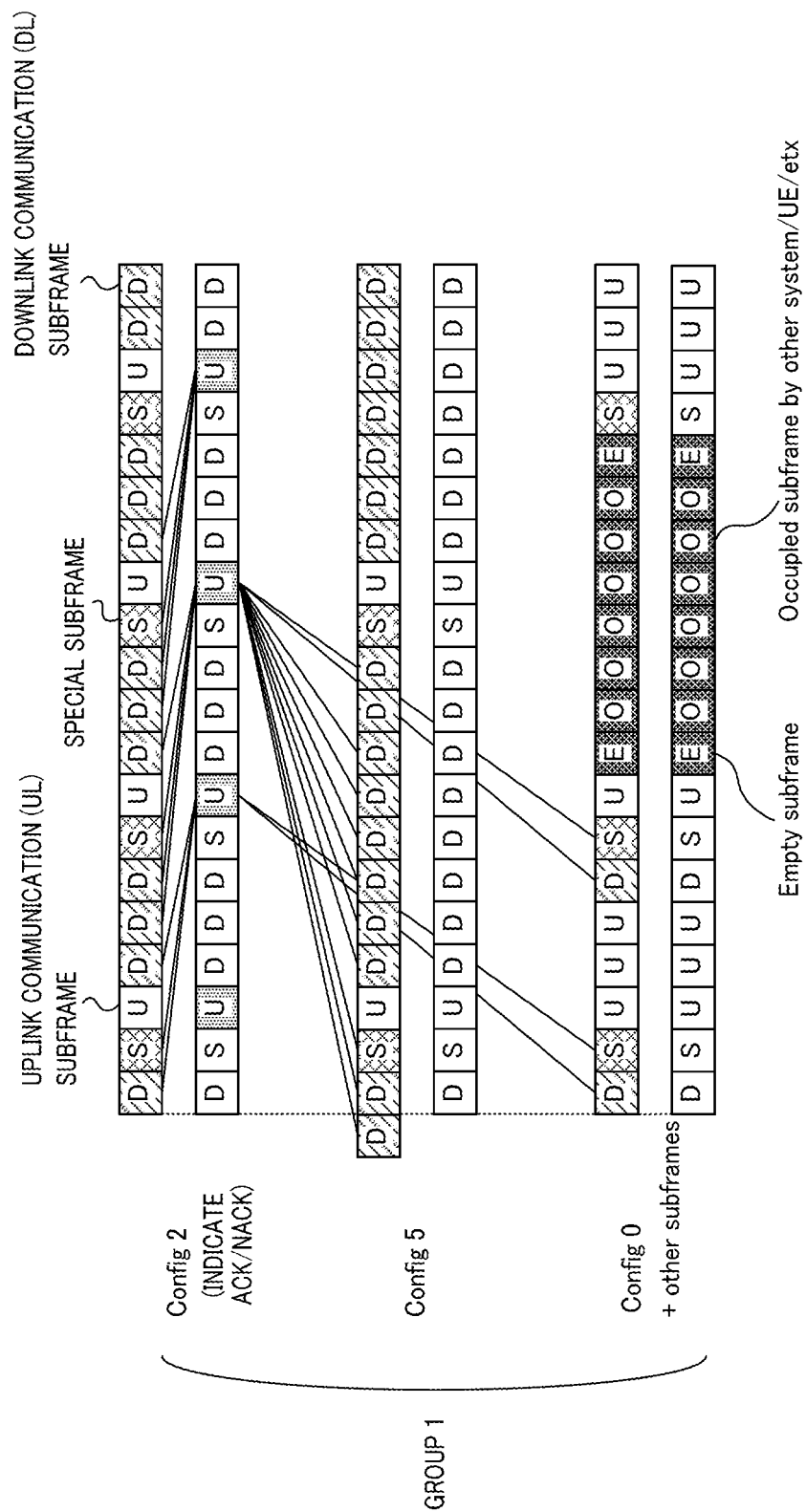
FIG. 22 illustrates a still further variation of the present invention.

In the present embodiment, as shown in FIG. 22, subframes other than UL subframes, DL subframes and special subframes may also be used. In FIG. 22, for example, empty subframes (or blank subframes) in which no transmission/reception is performed to reduce interference to other base stations and terminals (or almost blank subframes (ABS) when channels for transmission/reception are limited to some channels) or occupied subframes occupied by other radio communication systems or the like are used. Thus, for component carriers in which subframes other than UL subframes, DL subframes and special subframes exist, even when a highest-order UL-DL configuration of the component carrier includes UL subframe timings, the component carrier need not always report results of error detection. Likewise, the component carrier need not be configured as a cross-carrier scheduling source. When results of error detection are not reported using the component carrier, the results of error detection may be reported using a component carrier in which a second highest-order UL-DL configuration including UL subframe timings is set. Similarly, when the component carrier is not configured as a cross-carrier scheduling source, the component carrier in which a second highest-order UL-DL configuration including DL subframe timings is set may be configured as a cross-carrier scheduling source. Furthermore, the timing of reporting the results of error detection in component carriers in which there are subframes other than UL subframes, DL subframes and special subframes may be a timing at the fourth subframe after a DL subframe in which a PDSCH is received or after the fourth subframe, and an earliest UL subframe timing in a component carrier in which a highest-order UL-DL configuration including UL subframe timings is set. Alternatively, results of error detection in the component carrier in which subframes other than UL subframes, DL subframes and special subframes exist may be reported at the same timing as the timing of reporting the results of error detection (UL subframe) in the original UL-DL configuration before subframes other than UL subframes, DL subframes and special subframes are added. For example, in FIG. 22, the results of error detection in component carriers (config 0+other subframes) in which subframes other than UL subframes, DL subframes and special subframes exist are reported at the same timing as that of reporting the results of error detection of Config 0 which is the original UL-DL configuration.

Although an antenna has been described in the aforementioned embodiments, the present invention may be similarly applied to an antenna port.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of Japanese Patent Application No. 2011-154890, filed on Jul. 13, 2011 and Japanese Patent Application No. 2012-015257, filed on Jan. 27, 2012, including the specifications, drawings and abstracts are incorporated herein by reference in their entirety.

INDUSTRIAL APPLICABILITY

The present invention is suitable for use in mobile communication systems or the like.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence control section
117 Correlation processing section
118 A/N determining section
119 Bundled A/N despreading section
120 IDFT section
121 Bundled A/N determining section 122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:

1. An integrated circuit comprising:
circuitry, which, in operation, controls:
receiving a higher layer signaling that indicates a reference configuration pattern that is a reference uplink/downlink (UL/DL) configuration, which is one of a plurality of configuration patterns, each configuration pattern defining allocation of one or more first uplink subframe(s) and one or more first downlink subframe(s) within a frame;
receiving a downlink signaling for determining a configuration pattern for a component carrier;
determining, if the downlink signaling is received, the configuration pattern for the component carrier according to the received downlink signaling, wherein when the determined configuration pattern is different from the reference UL/DL configuration, the reference UL/DL configuration defines the allocation of the one or more first uplink subframe(s) that are inclusive of one or more second uplink subframes defined by the determined configuration pattern, and the reference UL/DL configuration defines at least one more uplink subframe than defined by the determined configuration pattern; and
transmitting an uplink signal on an uplink subframe of the component carrier, the uplink subframe being one of the one or more second uplink subframes defined by the determined configuration pattern.

2. The integrated circuit according to claim 1, wherein if the downlink signaling is not received, the reference UL/DL configuration is determined as the configuration pattern for the component carrier.

3. The integrated circuit according to claim 1, wherein the determined configuration pattern is the same as the reference UL/DL configuration.

4. The integrated circuit according to claim 1, wherein a downlink subframe where a Cell-specific Reference Signal (CRS) measurement is allowed is a portion of one or more second downlink subframes that are defined by the determined configuration pattern.

5. The integrated circuit according to claim 1, wherein downlink data on the component carrier is received and a response signal is transmitted, the response signal indicating error detection results of the received downlink data on an uplink subframe defined by the reference UL/DL configuration.

6. The integrated circuit according to claim 1, wherein the configuration pattern for the component carrier is determined according to the received downlink signaling when a communication apparatus including the integrated circuit is a user terminal that supports LTE Release 11 and the reference UL/DL configuration is determined as the configuration pattern for the component carrier when the communication apparatus is a legacy user terminal that does not support the LTE Release 11.

7. The integrated circuit according to claim 1, wherein the configuration pattern for the component carrier for each frame is determined.

8. The integrated circuit according to claim 1, wherein the component carrier is a Primary Cell.

* * * * *